(12) United States Patent
Gondhalekar et al.

(10) Patent No.: US 7,412,532 B2
(45) Date of Patent: Aug. 12, 2008

(54) MULTIMEDIA SCHEDULER

(75) Inventors: Mangesh Madhukar Gondhalekar, Campbell, CA (US); Rajesh Viswanathan, Saratoga, CA (US); Shailesh Prakash, Redmond, WA (US); Stephen Loomis, Redwood City, CA (US); James Patrick Van Huysse, San Francisco, CA (US); Cameo Dawn Carlson, Pleasanton, CA (US)

(73) Assignee: AOL LLC, a Deleware Limited Liability Company, Dulles, VA (US)

( * ) Notice: Subject to any disclaimer, the term of this patent is extended or adjusted under 35 U.S.C. 154(b) by 913 days.

(21) Appl. No.: 10/734,783

(22) Filed: Dec. 12, 2003

(65) Prior Publication Data

US 2004/0215733 A1 Oct. 28, 2004

Related U.S. Application Data

(60) Provisional application No. 60/433,734, filed on Dec. 13, 2002.

(51) Int. Cl.
*G06F 15/16* (2006.01)
(52) U.S. Cl. .................. 709/231; 709/201; 709/226; 709/227; 709/232; 370/264; 370/322; 370/329; 370/341; 370/348; 370/431; 715/963; 725/97
(58) Field of Classification Search ............... 709/203, 709/216, 219, 228, 229, 231, 232, 201, 226, 709/227; 725/97; 715/963; 370/264, 322, 370/329, 341, 348, 431
See application file for complete search history.

(56) References Cited

U.S. PATENT DOCUMENTS 5,325,238 A 6/1994 Stebbings et al.

(Continued)

FOREIGN PATENT DOCUMENTS

EP 1113605 A2 7/1991

(Continued)

OTHER PUBLICATIONS

Narasimha, R. et al. "I/O Issues in a Multimedia System"; Computer, vol. 27, No. 3, p. 69-74, Mar. 1994, USA.

(Continued)

*Primary Examiner*—Michael Won
(74) *Attorney, Agent, or Firm*—Glenn Patent Group; Michael A. Glenn

(57) ABSTRACT

A song and ad scheduler supporting clip-based and stream-based scheduling of multimedia items generates several hours of schedule in advance. Having multiple channel capability, the scheduler uses as inputs: the channel, associated playlists associated, rotation pattern for the channel, and associated programming rules to produce a schedule of multimedia items for the channel. Initially, the scheduler produces a schedule for each channel of predetermined length; then it periodically revisits the channel to add more songs, keeping the schedule to the desired length. Length of the initial playlist is configurable. The scheduler uses a producer-consumer model for distributing work. Producer threads periodically scan the system for work to be done. When a producer thread encounters work to be done, e.g. adding to the schedule of a channel, the producer thread places a work request into a queue. Worker threads consume the work requests by fulfilling the requested work.

43 Claims, 29 Drawing Sheets

U.S. PATENT DOCUMENTS

| | | | |
|---|---|---|---|
| 5,410,343 A * | 4/1995 | Coddington et al. | 725/99 |
| 5,517,672 A | 5/1996 | Reussner et al. | |
| 5,528,513 A | 6/1996 | Vaitzbilt et al. | |
| 5,585,866 A * | 12/1996 | Miller et al. | 725/43 |
| 5,616,876 A | 4/1997 | Cluts | |
| 5,644,715 A | 7/1997 | Baugher | |
| 5,671,195 A * | 9/1997 | Lee | 369/7 |
| 5,734,119 A | 3/1998 | France et al. | |
| 5,761,417 A | 6/1998 | Henley et al. | |
| 5,784,597 A * | 7/1998 | Chiu et al. | 713/401 |
| 5,787,482 A | 7/1998 | Chen et al. | |
| 5,790,174 A * | 8/1998 | Richard et al. | 725/99 |
| 5,792,971 A | 8/1998 | Timis et al. | |
| 5,802,502 A | 9/1998 | Gell et al. | |
| 5,819,160 A | 10/1998 | Foladare et al. | |
| 5,892,900 A | 4/1999 | Ginter et al. | |
| 5,907,827 A * | 5/1999 | Fang et al. | 704/503 |
| 5,910,987 A | 6/1999 | Ginter et al. | |
| 5,913,039 A | 6/1999 | Nakamura | |
| 5,917,912 A | 6/1999 | Ginter et al. | |
| 5,920,861 A | 7/1999 | Hall et al. | |
| 5,930,765 A * | 7/1999 | Martin | 705/14 |
| 5,943,422 A | 8/1999 | Van Wie et al. | |
| 5,944,778 A | 8/1999 | Takeuchi et al. | |
| 5,949,876 A | 9/1999 | Ginter et al. | |
| 5,956,321 A | 9/1999 | Yao et al. | |
| 5,956,491 A | 9/1999 | Marks | |
| 5,959,945 A * | 9/1999 | Kleiman | 381/81 |
| 5,963,914 A | 10/1999 | Skinner et al. | |
| 5,982,891 A | 11/1999 | Ginter et al. | |
| 5,991,867 A * | 11/1999 | Fosmark | 712/16 |
| 5,996,015 A | 11/1999 | Day et al. | |
| 6,029,257 A | 2/2000 | Palmer | |
| 6,031,797 A | 2/2000 | Van Ryzin et al. | |
| 6,041,354 A | 3/2000 | Biliris et al. | |
| 6,044,398 A | 3/2000 | Marullo et al. | |
| 6,061,722 A | 5/2000 | Lipa et al. | |
| 6,067,562 A | 5/2000 | Goldman | |
| 6,088,722 A | 7/2000 | Herz | |
| 6,112,023 A | 8/2000 | Dave et al. | |
| 6,112,181 A | 8/2000 | Shear et al. | |
| 6,138,119 A | 10/2000 | Hall et al. | |
| 6,157,721 A | 12/2000 | Shear et al. | |
| 6,157,940 A | 12/2000 | Marullo et al. | |
| 6,160,812 A * | 12/2000 | Bauman et al. | 370/416 |
| 6,163,683 A | 12/2000 | Dunn et al. | |
| 6,168,481 B1 | 1/2001 | Culbertson et al. | |
| 6,173,325 B1 | 1/2001 | Kukreja | |
| 6,185,683 B1 | 2/2001 | Ginter et al. | |
| 6,185,701 B1 | 2/2001 | Marullo et al. | |
| 6,192,340 B1 | 2/2001 | Abecassis | |
| 6,195,701 B1 | 2/2001 | Kaiserworth et al. | |
| 6,199,076 B1 | 3/2001 | Logan et al. | |
| 6,222,530 B1 | 4/2001 | Sequiera | |
| 6,226,672 B1 | 5/2001 | DeMartin et al. | |
| 6,237,786 B1 | 5/2001 | Ginter et al. | |
| 6,240,185 B1 | 5/2001 | Van Wie et al. | |
| 6,243,328 B1 | 6/2001 | Fenner et al. | |
| 6,243,725 B1 | 6/2001 | Hempleman et al. | |
| 6,247,061 B1 | 6/2001 | Douceir | |
| 6,248,946 B1 | 6/2001 | Dwek | |
| 6,253,193 B1 | 6/2001 | Ginter et al. | |
| 6,262,569 B1 | 7/2001 | Carr et al. | |
| 6,263,313 B1 | 7/2001 | Milsted et al. | |
| 6,263,362 B1 | 7/2001 | Donoho et al. | |
| 6,266,788 B1 | 7/2001 | Othmer et al. | |
| 6,300,880 B1 | 10/2001 | Sitnik | |
| 6,314,576 B1 * | 11/2001 | Asamizuya et al. | 725/91 |
| 6,332,163 B1 | 12/2001 | Bowman-Amuah | |
| 6,356,936 B1 | 3/2002 | Donoho et al. | |
| 6,363,488 B1 | 3/2002 | Ginter et al. | |
| 6,366,914 B1 | 4/2002 | Stern | |
| 6,389,402 B1 | 5/2002 | Ginter et al. | |
| 6,421,651 B1 | 7/2002 | Tedesco et al. | |
| 6,427,140 B1 | 7/2002 | Ginter et al. | |
| 6,430,537 B1 | 8/2002 | Tedesco et al. | |
| 6,434,621 B1 | 8/2002 | Pezzillo et al. | |
| 6,434,628 B1 | 8/2002 | Bowman-Amuah | |
| 6,438,450 B1 | 8/2002 | DiLorenzo | |
| 6,438,630 B1 | 8/2002 | DeMoney | |
| 6,441,832 B1 | 8/2002 | Tao et al. | |
| 6,446,080 B1 | 9/2002 | Van Ryzin et al. | |
| 6,446,125 B1 | 9/2002 | Huang et al. | |
| 6,446,126 B1 | 9/2002 | Huang et al. | |
| 6,449,367 B2 | 9/2002 | Van Wie et al. | |
| 6,453,316 B1 | 9/2002 | Karibe et al. | |
| 6,477,541 B1 * | 11/2002 | Korst et al. | 707/104.1 |
| 6,477,707 B1 * | 11/2002 | King et al. | 725/97 |
| 6,492,469 B2 * | 12/2002 | Willis et al. | 525/366 |
| 6,496,744 B1 | 12/2002 | Cook | |
| 6,502,194 B1 | 12/2002 | Berman et al. | |
| 6,505,160 B1 | 1/2003 | Levy et al. | |
| 6,519,648 B1 | 2/2003 | Eyal | |
| 6,526,411 B1 | 2/2003 | Ward | |
| 6,529,586 B1 | 3/2003 | Elvins et al. | |
| 6,536,037 B1 | 3/2003 | Guheen et al. | |
| 6,542,445 B2 | 4/2003 | Ijichi et al. | |
| 6,546,397 B1 | 4/2003 | Rempell | |
| 6,550,057 B1 | 4/2003 | Bowman-Amuah | |
| 6,601,041 B1 | 7/2003 | Brown et al. | |
| 6,609,097 B2 | 8/2003 | Costello et al. | |
| 6,618,424 B1 | 9/2003 | Van Wie et al. | |
| 6,658,568 B1 | 12/2003 | Ginter et al. | |
| 6,668,325 B1 | 12/2003 | Collberg et al. | |
| 6,772,340 B1 | 8/2004 | Peinado et al. | |
| 6,772,435 B1 * | 8/2004 | Thexton et al. | 725/91 |
| 6,910,220 B2 * | 6/2005 | Hickey et al. | 725/39 |
| 6,950,623 B2 * | 9/2005 | Brown et al. | 455/3.01 |
| 7,020,710 B2 * | 3/2006 | Weber et al. | 709/232 |
| 7,020,893 B2 * | 3/2006 | Connelly | 725/97 |
| 7,024,485 B2 | 4/2006 | Dunning et al. | |
| 7,136,906 B2 * | 11/2006 | Giacalone, Jr. | 709/218 |
| 7,185,352 B2 * | 2/2007 | Hallford et al. | 725/28 |
| 2001/0003828 A1 | 6/2001 | Peterson et al. | |
| 2001/0030660 A1 | 10/2001 | Zainouline | |
| 2002/0032907 A1 * | 3/2002 | Daniels | 725/51 |
| 2002/0059237 A1 | 5/2002 | Kumagai et al. | |
| 2002/0059624 A1 * | 5/2002 | Machida et al. | 725/91 |
| 2002/0068525 A1 * | 6/2002 | Brown et al. | 455/3.01 |
| 2002/0078056 A1 | 6/2002 | Hunt et al. | |
| 2002/0082914 A1 | 6/2002 | Beyda et al. | |
| 2002/0091761 A1 | 7/2002 | Lambert | |
| 2002/0095510 A1 * | 7/2002 | Sie et al. | 709/231 |
| 2002/0104099 A1 * | 8/2002 | Novak | 725/136 |
| 2002/0108395 A1 | 8/2002 | Fujita et al. | |
| 2002/0152876 A1 | 10/2002 | Hughes et al. | |
| 2002/0152878 A1 | 10/2002 | Akashi | |
| 2002/0198846 A1 | 12/2002 | Lao | |
| 2003/0014436 A1 | 1/2003 | Spencer et al. | |
| 2003/0018797 A1 | 1/2003 | Dunning et al. | |
| 2003/0023973 A1 * | 1/2003 | Monson et al. | 725/34 |
| 2003/0023975 A1 * | 1/2003 | Schrader et al. | 725/51 |
| 2003/0028659 A1 | 2/2003 | Mesarina et al. | |
| 2003/0028893 A1 | 2/2003 | Addington | |
| 2003/0048418 A1 | 3/2003 | Hose et al. | |
| 2003/0069768 A1 | 4/2003 | Hoffman et al. | |
| 2003/0121050 A1 | 6/2003 | Kalva et al. | |
| 2003/0126275 A1 | 7/2003 | Mungavan et al. | |
| 2003/0135605 A1 | 7/2003 | Pendakun | |
| 2003/0195974 A1 | 10/2003 | Ronning et al. | |
| 2003/0236906 A1 | 12/2003 | Klemets et al. | |
| 2004/0064507 A1 | 4/2004 | Sakata | |

| | | | |
|---|---|---|---|
| 2005/0114757 | A1 | 5/2005 | Sahota et al. |
| 2005/0159104 | A1* | 7/2005 | Valley et al. ............... 455/3.01 |

FOREIGN PATENT DOCUMENTS

| | | | |
|---|---|---|---|
| EP | 0831608 | A2 | 3/1998 |
| EP | 0875846 | A2 | 11/1998 |
| EP | 0986046 | A1 | 3/2000 |
| EP | 1178487 | A1 | 2/2002 |
| EP | 1187423 | A2 | 3/2002 |
| EP | 1229476 | A2 | 8/2002 |
| EP | 1244021 | A1 | 9/2002 |
| EP | 1267247 | A2 | 12/2002 |
| EP | 1286351 | A2 | 2/2003 |
| EP | 1187485 | B1 | 4/2003 |
| JP | 2002108395 | | 4/2002 |
| JP | 2002318587 | | 10/2002 |
| JP | 2003068968 | | 3/2003 |
| TW | 497055 | | 8/2002 |
| WO | WO 01/10496 | A2 | 2/2001 |
| WO | WO 02/063414 | | 8/2002 |

OTHER PUBLICATIONS

Ramakrishnan, K.K. et al; "Operating system Support for a video-on-demand file service"; Multimedia Systems; vol. 3, No. 2, p. 53-65, 1995 West Germany.

Nwosu, K.C. et al "Data Allocation and Spatio-Temporal Implications for Video-on-Demand Systems"; Proceedings of 1995 14th Annual Phoenix Conference on Computers and Communications: (Cat. No. 95CH35751), p. 629-35; IEEE; 1995 USA.

Eun, S,: et al. "Nonpreemptive scheduling algorithims for multimedia communication in local area networks"; Proceedings 1995 Int'l Conf on Network Protocols (Cat. No. 95TB8122) p. 356-IEEE Comput. Soc. Press; 1995 Los Alamitos, CA USA 1996.

Nakajima, T.; "A Dynamic QoS control based Optimistic processor reservation"; Proceedings of the Intn'l onf. on Multimedia Computing and Systems (Cat. No. 96TB100057) p. 95-103 IEEE Comp. Soc. 1996, Los Alamitos, CA.

Orji, C.U. et al; "Spatio-temporal effects of multimedia objects storage delivery on video-on-demand systems"; Multimedia Sytems; vol. 5, No. 1, p. 39-52, Springer-Verlag; Jan. 1997, Germany.

Kenchammana-Hosekote, D.R., et al.; "I/O scheduling for digital continuous media"; Multimedia Systems, vol. 5, No. 4, p. 213-37, Springer-Verlag, Jul. 1997 Germany.

Matsui, Y et al.; "VoR: a network system framework for VBRT over reserved bandwidth"; Interactive Distributed Multimedia Systems and Telecommunications Services, 4th Int'l Workshop, IDMS '97 Proceedings: p. 189-98, Springer-Verlag: 1997.

Luling, R. et al.; "Communication Scheduling in a Distributed memory parallel interactive continuous media server system"; Proceedings of 1998 ICPP Workshop on Architectural Systems and OS Support for Multimedia Applications Flexible.

Seongbae, E., et al; A real-time scheduling algorithim for multimedia communication in samll dedicated multimedia systems; KISS(A) (Computer Systems and Theory) vol. 25, No. 5, p. 492-502; Korea Inf. Sci. Soc. May 1998, South Korea, 1999.

Garofalakis, M.N., et al. "Resource scheduling in enhanced pay-per-view continuous media databases"; Proceedings of 23rd Int'l Conf. on Very Large Databases; p. 516-25; Morgan, Kaufman Publishers, 1997, San Francisco, CA USA.

Mostefaoui, A.; "Exploiting data structures in a high performance video server for TV archives"; Proceedings of the Int'l Symposium on Digital Media information Base, p. 516-25, World Scientific, 1998, Singapore.

Garofalakis, M.N., On periodic resource scheduling for continuous media databases: VLDB Journal, vol. 7, No. 4, p. 206-25; 1998 Springer Verlag, germany 1999.

Hwee-Hwa, P., et al; "Resource scheduling in high performance multimedia server", IEEE, Mar.-Apr. 1999, USA.

Young-Uhg, L. et al,"Performance analysis and evaluation of allocating subbanded video dta block on MZR disk arrays"; Proceedings of teh High Performance Computing (HPC'98) p. 335-40, Soc. for Comp. Simulation Intn'l 1998, San Diego, CA, USA.

Feng, C. et al.; "An architecture of distributed media servers for supporting guaranteed QoS and media indexing", IEEE Intn'l Conf on Multimedia Computing and Systems, Part vol. 2 IEEE Comp. Soc. 2 vol. 1999 Los Alamitos, CA 1999.

To, T.-P.J. et al "Dynamic optimization of readsize in hypermedia servers"; IEEE Intn'l Conf on Multimedia Computing and Systems; Part vol. 2, p. 486-91, Pub. IEEE Comput. Soc, 2 vol. 1999 Los Alamitos, CA USA.

Pang, H. et al. "Resource scheduling in a high performance media server": IEEE Transactions on Knowledge and Data Engineering, v11n2, p. 303-320, 1999.

Lee, W. et al., "QoS-adaptive bandwidth scheduling in continuous media streaming"; Information and Software Technology; v.44n, Jun. 2002, p. 551-563.

Waddington, D.G., "Resource partitioning in general purpose operating systems; experimental results in Windows NT"; Operating Systems Review, vol. 33, No. 4, p. 52-74; ACM, Oct. 1999, USA.

Ditze, M. et al. "A method for real-time scheduling and admission control of MPE 2 streams; PART 2000; 7th Australian Conference on Parallel and Real-Time Systems", Nov. 2000, Sydney, NSW, Australia, Pub; Springer-Verlag, Hong Kong, China 2001.

Garofalakis, M., et al, "Competitive Online scheduling of continuous media streams", Journal of Computer and Systems Sciences; vol. 64, No. 2 p. 219-48, Academic Press, Mar. 2002, USA.

Wonjon, L. et al. ; "QoS-adaptive bandwidth scheduling in continuos media streaming" Dept of Computer Sci and Engr, Korea University, Seoul, South Korea; Information and Software Technology, vol. 44, No. 9, p. 551-53, Seoul, Korea, date unknown.

Mourlas, C.; "Deterministic scheduling of CBR and VBR media flows on parallel media servers", Euro-Par 2002 Parallel Processing 8th Intn'l Euro-Par Conference Proceedings; vol. 2400, p. 807-15, Aug. 2002, Paderborn, Germany 2003.

Buford, J.F.; "Storage server requirements for delivery of hypermedia documents", Proceedings of the SPIE—The International Society for Optical Engineering Conference, Int. Soc. Opt. Eng. vol. 2417, p. 346-55, 1995.

A Network Flow Model for Play list Generation; Department of Electronical Engineering, University of Minnesota.

Learning a Gaussian Process Prior for Automatically Generating Music Play lists; Microsoft Corporation.

EasyLiving: Technologies for Intelligent Environments; Microsoft Research.

Intelligent Multicast Internet Radio; University of Dublin.

Flytrap: Intelligent Group Music Recommendation; IUI 02, 2002 International Conference on Intelligent User Interfaces.

Virtual Jukebox; reviewing a classic; Proceedings of the 35th Annual Hawaii International Conference on System Sciences, P. 887-893.

The MP3 Revolution; IEE Intelligent Systems vol. 14, No. 3, p. 8-9.

The Valid Web: an Infrastructure for Temporal Management of Web Documents; ADVIS 2000; Lecture Notes in Computer Science; vol. 1909, p. 294-303, Izmir, Turkey; pub: Soringer-Verlag; 2000; xvi-460pp.; Germany.

Usability Studies and Designing Navigation Aids for the World Wide Web; 6th Intl World Wide Web Conf.; Santa Clara, CA; USA; Pub: Elsevier Comput. Netw. ISDN Syste; vol. 29, No. 8-13, p. 1489-1496; Sep. 1997; Netherlands.

"Web based Protection and Secure Distribution for Digital Music", Proceedings, International Conference on Internet and Multimedia Systems and Applications pp. 102-107, Hawaii, USA.

Apple's iTunes Music Store - http://www.apple.com/music/store.

Conference Paper: IP Data Over Satelite to Cable Headends and a New Operation Model with Digital Store and Forward Multi-Media System.

Coordinated CPU and Event Scheduling for Distributed Multimedia Applications:, ACM Multimedia; Ottawa, Canada.

"Packet Synchronization Recovery Circuit" vol. 16, No. 294, p. 120.

Hodson, O., Perkins, C., Hardman, V., "Skew detection and compensation for Internet audio application" Part vol. 3, p. 1687-90, 2000 IEEE International Conference on Multimedia Proceedings, USA.

Aurrecoechea, C., Campbell, A., Hauw, L., "A Survey of QoS Architectures", Columbia University, New York.

Cen, S., Pu, R., Staehi, R., Walpole, J., "A Distributed Real-Time MPEG Video Audio Player", Dept of Computer Science and Engineerng, Oregon Graduate Institute of Science and Technology.

Manouselis, N., Karampiperis, P., Vardiambasis, I.O., Maras, A., "Digital Audio Broadcasting Systems under a QoS Perspective", Telecommunications Laboratory, Dept. of Electronics & Computer Engineering, Technical University of Crete, Greecce.

Helix Universal Gateway Configuration Guide, RealNetworks Technical Blueprint Series.

Sion, R., Elmagarmid, A., Prabhakar, S., Rezgui, A., Challenges in designing a QoS aware Media Repository (working draft) Computer Science, Purdue University, IN.

Chen, Z., Tan, S.-M., Campbell, R., Li, Y., "Real Time Video and Audio in the World Wide Web", Dept. of Computer Science, Univ. of Illinois, Champagne - Urbana.

Contest Networking with the Helix Platform, RealNetworks White Paper Series, Jul. 2002.

Hess. C., Media Streaming Protocol; An Adaptive Protocol for the Delivery of Audio and Video Over the Internet, 1998, Univ. of Illinois, Champagne-Urbana.

Koster, R., "Design of a Multimedia Player with Advanced QoS Control", Jan. 1997, Oregon Graduate Institute of Science and Technology.

* cited by examiner

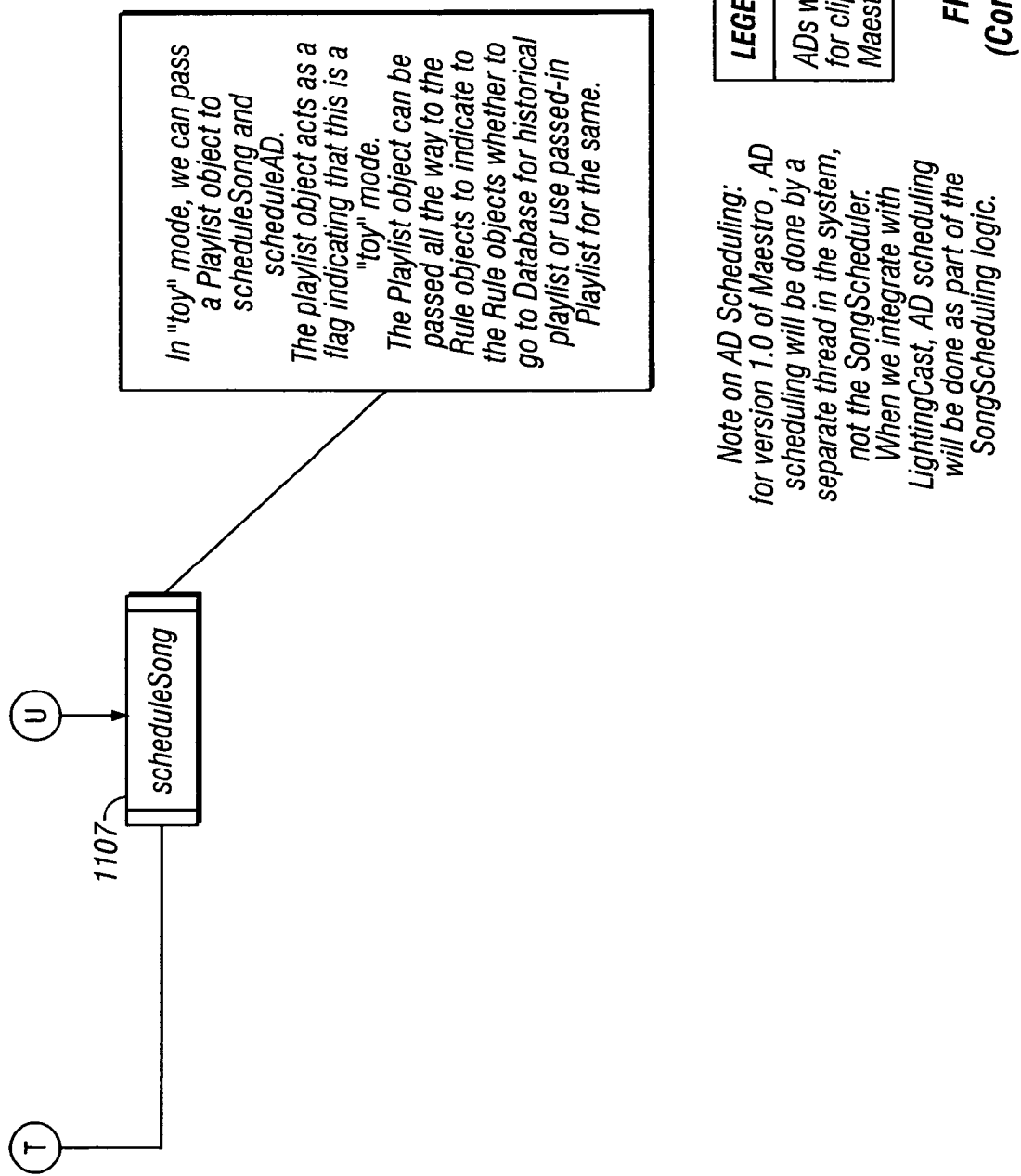

MULTIMEDIA SCHEDULER

CROSS REFERENCE TO RELATED APPLICATION

This application claims priority to prior U.S. provisional patent application No. 60/433,734, filed Dec. 13, 2002, titled Music Net, which is incorporated herein in its entirety by this reference made thereto.

BACKGROUND OF THE INVENTION

1. Field of the Invention

The invention generally relates to distribution of multimedia content in a networked environment. More particularly, the invention relates to a system and methods for scheduling multimedia content for broadcast.

2. Description of Related Technology

The Internet comprises a web of computers and networks widely spread throughout the world. The Internet currently comprises millions of network connections, and is used by millions of people for business, education, entertainment, and/or basic communication purposes.

Digital content, such as sound recordings, songs, for example, are often transferred across the Internet. In addition to the basic transfer of song files, numerous network enabled radio stations have been introduced, which provide content to listeners at computers across the Internet. Network enabled radio has significantly increased the magnitude and variety of content to recipients, as compared to conventional over-the-air radio broadcasts. One of the most important technologies underlying Internet radio is streaming technology, some times called streaming media, which allows a user to view and hear digitized content—audio, as well as video and animation—as it downloads. The client receives the media in real time without having to wait for clips to be downloaded.

Streaming technology allows delivery of content in a variety of ways:

On-demand, wherein a pre-recorded clip is available to a user whenever he or she is interested;

Live—for example, live broadcasts of concerts or sporting events, wherein the user tunes in to whatever programming is being offered at a given time; and Simulated live, wherein prerecorded clips are broadcast in the same manner that live content is.

Streaming technology is based on the real-time streaming protocol (RTSP), a protocol for providing streaming multimedia, usually in one-to-many applications over unicast or multicast. RTSP employs the technique of streaming, which breaks data into packets sized according to the available bandwidth between client and server. When the client has received a sufficient number of packets, a practice known as buffering, the user's software can be playing one packet, decompressing another, and downloading yet another, thus enabling a user to listen to the real-time file almost immediately, as the media file downloads. Live data feeds, as well as stored clips are handled in this manner.

Just as over-the-air radio stations do, network-enabled radio stations program content for broadcast in advance. Thus, there exists a need for tools to create and manage program schedules for Internet audio broadcasts. Various methods and means have been proposed to meet this need. M. Day, L. Yeung, Method of delivering seamless and continuous presentation of multimedia data files to a target device by assembling and concatenating multimedia segments in memory, U.S. Pat. No. 5,996,105 (Nov. 30, 1999) describes generation of playlists, wherein a playlist constitutes a listing of segments selected for presentation. The reference is silent, however, as to how this is to be done.

V. Krishnan and G. Chang, Customized Internet radio, Proc. 9th International World Wide Web Conference, Amsterdam, Netherlands, (May 2000) describes a framework for managing and customizing audio broadcast content on the Internet. The described framework includes an Internet radio station that makes it possible to create and manage program schedules for Internet audio broadcasts. It allows specific radio stations or genre to be scheduled in time slots, and provides alerts and dynamic changes based on the availability of specified content according to a previously defined user profile. Thus, while a schedule is generated, the schedule only specifies time slots to be allocated to one radio station or another. There is no teaching or suggestion of rule-based scheduling of media objects such as songs and ads. Furthermore, while the scheduler can service more than one profile, the scheduler cannot schedule the actual media for several different channels or radio stations.

W. Sequeira, System and method for a master scheduler, U.S. Pat. No. 6,222,530 (Apr. 24, 2001) describes a scheduler wherein a programmer enters a programming schedule into a master scheduler's data models, whereupon the master scheduler processes the schedule and creates a number of tasks based on the schedule. Each task is then distributed to a slave task scheduler on the relevant media server for execution at the proper time. The slave task scheduler is adapted to track the tasks given to it, and to prepare a media device to send the scheduled information at the appropriate time. While the scheduler is capable of creating a list of tasks based on a schedule manually created by a programmer, there is no teaching or suggestion of a scheduler that actually creates the schedule, using rotation codes and patterns determined by a programmer and programming rules as inputs.

Y. Brown, M. Walker, Method of providing targeted advertisements to a computer mediated communications network, U.S. Pat. No. 6,601,041 (Jul. 29, 2003) describes a targeting system and method that is both intelligent and interactive. A queue builder generates priority queues according to predetermined rules and profile definitions. A queue manager receives the priority queues output from the queue builder and provides them to a computer-mediated communications network. While a queue builder assembles content segments into a queue according to a user profile and a set of rules, there is no description of a scheduler that monitors and updates a plurality of media streams using producer threads that generate tasks, and worker threads that consume the tasks from a queue and execute them.

M. Bookspan, S. Parasnis, P. Warrin, P. Poon, P. Patel, Scheduling presentation broadcasts in an integrated network environment, U.S. Pat. No. 6,636,888 (Oct. 21, 2003) describes a system that partially automates scheduling of a presentation broadcast over a network. The approach described, however, doesn't relate to streaming technology. The presentation is created using a computer program such as POWERPOINT (MICROSOFT CORPORATION, Redmond Wash.). Broadcast of the resulting file to specified recipients is facilitated through use of the calendaring capabilities of such products as MEETINGMAKER or OUTLOOK (both MICROSOFT CORPORATION).

It would thus be a significant advance in the art to provide a multimedia scheduler for streaming multimedia capable of scheduling and maintaining streams for a plurality of channels. It would be advantageous to provide music directors the capability of assigning rotation codes to the media items on their playlists. It would be a further advantage to provide the capability of scheduling actual items such as songs and ads based on the rotation codes, and a series of broadcast rules. It would also be beneficial for the scheduler to be able to service multiple channels or radio stations at the same time. Furthermore, it would also advance the art to provide a scheduler that periodically monitors and updates media streams of a predetermined length, adding media items as needed to maintain the predetermined length by means of producer and consumer threads and a task queue.

SUMMARY OF THE INVENTION

A song and ad scheduler supporting clip-based and stream-based scheduling of songs and ads, capable of generating, for example, six hours of song/ad schedule ahead of time. Having multiple channel capability, the scheduler uses as input:
  The channel for which the schedule is to be generated:
  And predefined criteria for the channel that include;
    The channel playlist;
    The rotation pattern associated with the channel; and
    The rules associated with a channel;
to produce a schedule of songs for the channel. Initially, the scheduler produces a seven hour schedule, for example, for each channel and then it periodically revisits the channel to add more songs to keep the schedule to the desired length. Length of the initial play list is configurable.

The scheduler is based on a producer-consumer model for distributing work. Producer threads periodically scan the system for work that needs to be done. When a producer thread encounters work to be done, such as adding to the schedule of a channel, the producer thread places a work request into a queue. Worker threads, aka consumers, consume the work requests by fulfilling the requested work.

The producer consumer model is embodied in a work manager that includes:
  One or more work producer threads;
  A work queue to hold work objects;
  One or more worker threads;
  An optional monitoring thread; and
  An optional refresh thread.

The work manager component is deliberately independent of the song and ad scheduling logic, so that it can function as a job scheduler in other applications.

Additional components of the system include:
  the main application thread that initializes all other components, and waits for a termination request;
  a property manager that provides access to all application properties;
  a database connection manager;
  a communication module that manages commands/requests;
  utility threads for general housekeeping functions;
  song and ad schedulers; and
  a rules factory.

DETAILED DESCRIPTION

The invention provides a multimedia scheduler for a network-based multimedia broadcast service. The invention is particularly useful in scheduling multimedia items such as songs and ads in an Internet broadband radio setting; however as will be described in greater detail below, the scheduling system incorporates a work management component that is deployable, independent of the scheduling logic, as a task scheduler for other applications. The multimedia scheduler uses the following as input:
  the channel for which a schedule is to be generated;
  the playlists associated with the channel;
  the rotation pattern associated with channel; and
  programming rules associated with the channel
to produce a schedule of songs and ads for that channel. The invention enables media directors, for example, music directors or DJ's for Internet-based broadcast radio stations, to define frequency and relative times of media plays. The invention then applies the programming rules and previous programming history to develop a schedule for the future. Advantageously, the invention provides an interface that allows use by several DJ's simultaneously, creating playlists for several different channels at one time. Additionally, the invention creates schedules for several distinct services, even where the services are broadcast at different bit rates.

Figure 1:
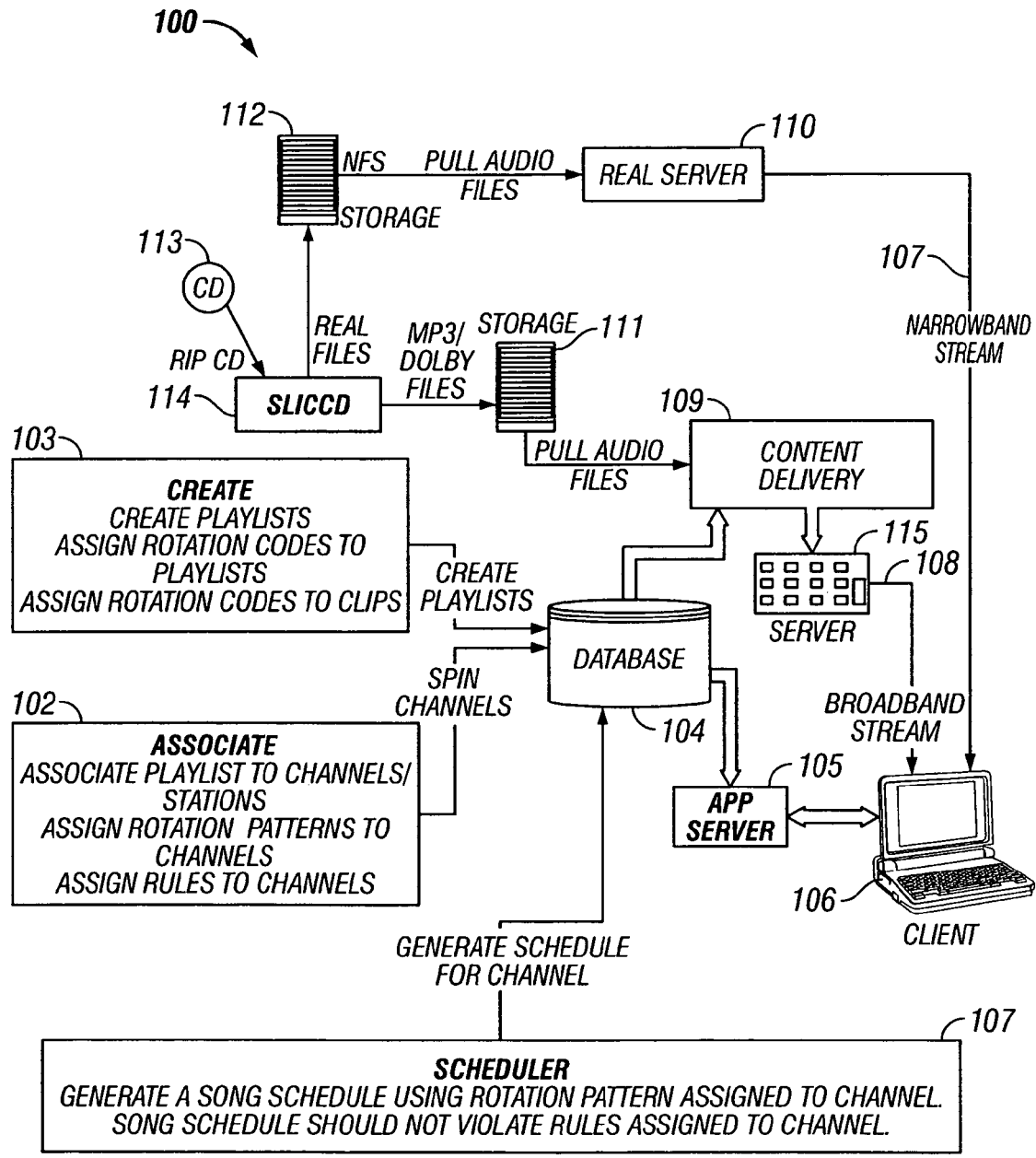
FIG. 1 provides a block diagram of a network based system for multimedia broadcast incorporating a scheduler according to the invention.

Referring now to FIG. 1, a block diagram is provided showing the functional components of an Internet-based radio service 100 wherein the invention is deployed. A scheduler 101 generates a song schedule for each of the channels of the radio service based on the rotation pattern created for the channel and the channel programming rules. While, for the sake of description, the invention is often described herein with respect to a single channel, or a single DJ, such description is not intended to limit the invention to servicing a single user or a single channel. In fact, a particularly advantageous feature of the invention is its capacity of servicing multiple users, multiple channels and multiple services, thus lending it exceptional scalability.

As shown, the songs, or media items, originally are obtained from storage media 113 such as CD's (compact disks). A CD is first "ripped" and "sliced" 114; that is, the songs, or other media are extracted from the CD and separated into individual tracks, whereupon they are encoded to one or more file formats suitable for streaming. As shown here, the media items are translated to the REAL media format (REAL NETWORKS, INC., Seattle Wash.), and/or the MP3 (MOTION PICTURE EXPERTS GROUP) format. The encoded files are saved to a storage component 111, 112, such as a disk array. Additionally, metadata for each media file is saved to the database 104.

Using a first tool 103 to retrieve the song metadata from the database 104, the music director or DJ for the channel creates a playlist, and assigns rotation codes to the individual media items of the playlist. In the preferred embodiment, a rotation code is a single, alphanumeric character, wherein the DJ defines the characteristics associated with the rotation code. For example, one DJ might use "H" for "Hot Hits" he wants to play the most, and the number "1" for holiday songs he does not want to schedule except during the appropriate time of year. In another embodiment of the invention, the rotation codes are predefined frequency codes. Alternatively, the DJ can create multiple playlists, and instead of assigning rotation codes to each song individually, he assigns a rotation code to each playlist.

The rotation codes having been assigned, the DJ uses a second tool, 102, to create a rotation clock to schedule songs in the desired order based on the song rotation codes. The rotation preferably consists of a linear set of rotation codes previously assigned by the DJ, thus indicating the sequence of play for the various music types corresponding to the rotation codes defined by the DJ, as described above. Thus, the DJ schedules a series of rotation codes in a linear fashion for each rotation clock. A rotation clock may have a variable set of rotation codes assigned per channel; thus a rotation clock may take the form: A, D, B, C, A, E, A, F, D, B, 1, Z, and so on. Following the rotation clock, the scheduler assembles a schedule for a media stream, choosing a song having a rotation code that corresponds to the rotation code given in the rotation clock. Using the example rotation clock given above, the first code listed is 'A;' thus the scheduler schedules a song having 'A' as its rotation code, followed by a 'D' song, and then a 'B' song, and so on. In the case where multiple playlists have been created, with each playlist assigned a rotation code, the scheduler chooses the next song on the playlist having the rotation code that corresponds to the code in the rotation clock. During play, the rotation clock loops, repeating after each loop is complete. The second tool is additionally used to associate playlists to stations or channels, and to assign programming rules to channels. As the playlists, rotation codes, and rotation codes are created, and the associations to the channels made, the resulting information is saved to the database 104. In the current embodiment of the invention, the database is a relational database, including a plurality of tables. Any database model capable of accommodating one-to-many and many-to-many entity relationships is suitable for use in the system as described.

The media scheduler 101, retrieving the song metadata, the rotation codes, and the rotation clock from the database 104, generates a schedule that conforms to the programming rules for the channel, whereupon the schedule is saved to the database 104.

A stream sourcing content delivery system 109, housed on a server 115, goes to the database 104 and builds a physical stream, based on the schedule. The stream source content delivery system finds the order of delivery of content for the station, or channel, based on the schedule, and downloads a plurality of music files, for example 6 hours of music, to its hard drive to enable play back. The system then concatenates the files to create a stream, and awaits the request of one or more stream recipients. The stream source content delivery system provides flexibility and scalability for a large number of stations, e.g. up to one hundred stations, and/or listeners. Upon request from a client 106, a broadband stream 108 is delivered to the client. A server 110 serves the function of content delivery for the narrowband stream 107. Alternatively, the multimedia scheduler provides scheduling for clip-based broadcasts as well.

By means of application logic housed on an application server 105, the client 106 enables a user to view song metadata and scheduling information.

Multimedia Scheduler Overview

The scheduler has the capability of generating several hours worth of song and/or ad schedule in advance. The exact length of the schedule is configurable, for example six hours. Thus, it is primarily an off-line system, in which real-time and online availability are relatively unimportant. Although real-time performance and real-time response times are not a major requirement for the invention, the ability to scale and handle a large number of channels has great priority. The multimedia scheduler initially creates a schedule of a configurable length for each channel. In one embodiment of the invention, the preferred schedule length is seven hours. With the object of maintaining a schedule that is at least six hours long at any given time, the scheduler revisits the channel after approximately an hour to add more songs, thus restoring it to the starting length. To achieve this goal, the scheduler includes one or more work managers based on a producer-consumer design.

Major Components

It is here noted that the following description is expressed in the terminology of the object-oriented programming paradigm, which employs programming languages such as JAVA (SUN MICROSYSTEMS, INC., Santa Clara Calif.). Practitioners skilled in other programming languages, structured languages or modular languages for example, will be enabled to implement a system consistent with the scope and spirit of the invention using the principles that are taught herein.

Figure 2:
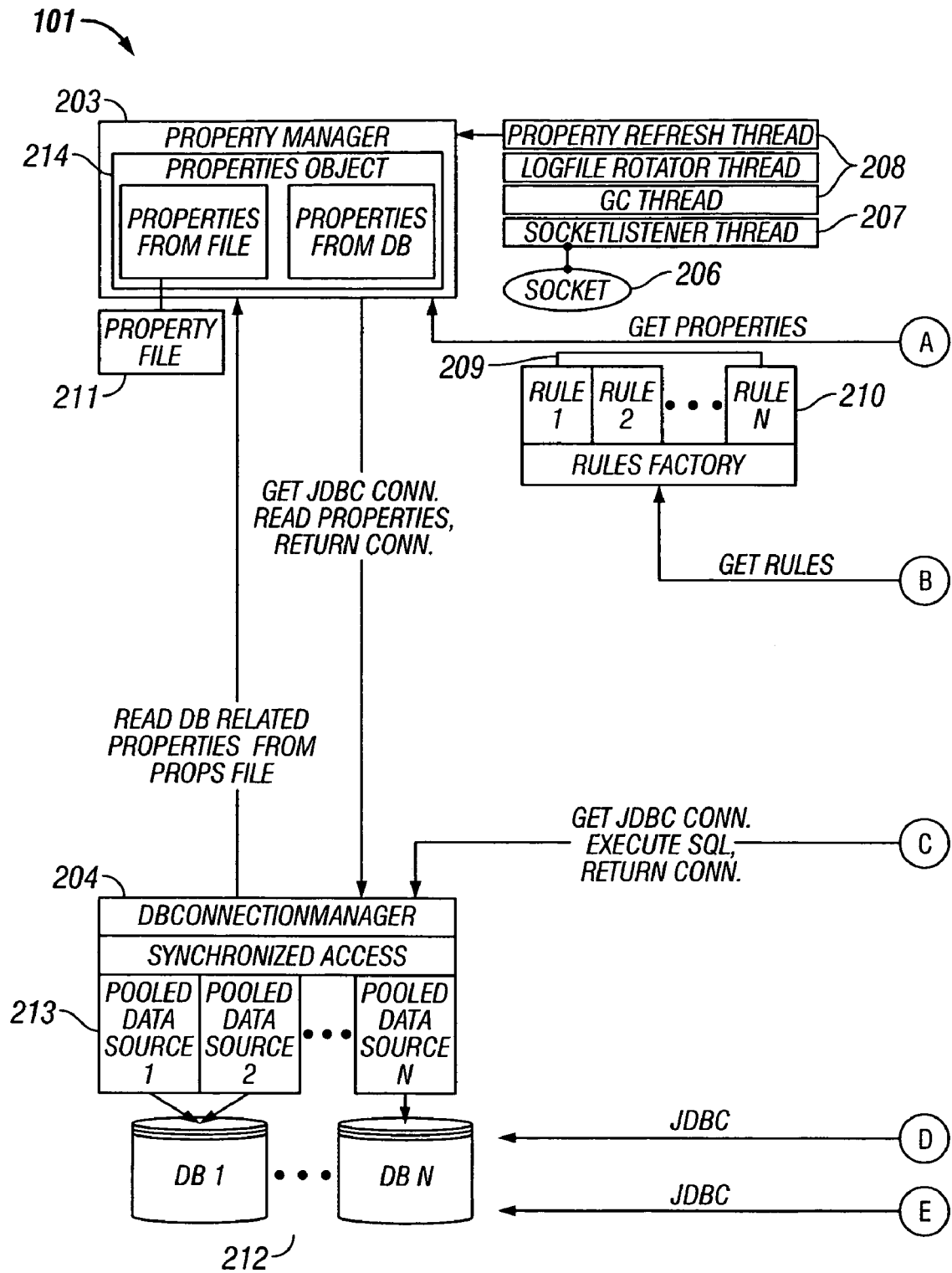
FIG. 2 provides a block diagram of a the scheduler from the system of FIG. 1 according to the invention.
Figure 2:
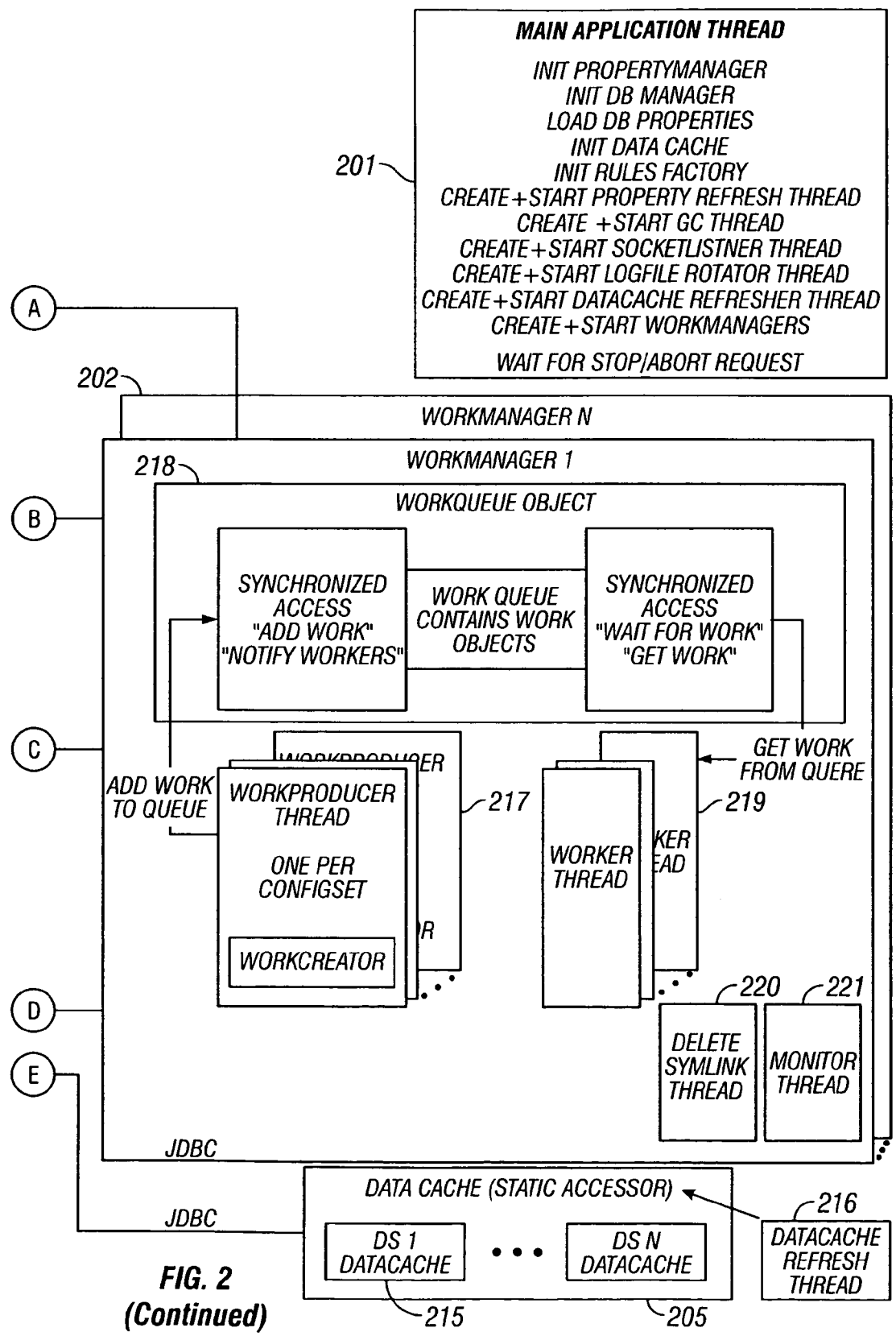

Referring now to FIG. 2, the multimedia scheduler includes the following components:

the main application thread 201;
  one or more work managers 202;
  a property manager 203;
  a database connection manager 204
  a data cache 205;
  a communication module 206;
  utility threads 207
  song and ad schedulers FIGS. 8-15; and
  a rules factory 210.

The main application thread 201 initializes all the other components and waits for a termination request. The work manager 202, implemented according to a producer—consumer design, includes one or more producer threads, a work queue and one or more worker, or consumer, threads. The work manager also optionally contains a monitoring thread that reports on the work manager and a thread to delete symlinks (symbolic links) created during clip-based scheduling. In clip-based broadcast environments, because song and ad scheduling are done independently of each other, there are provided separate work managers dedicated to song scheduling and ad scheduling.

A property manager 203 provides access to all application properties, typically contained in one or both of a properties file 211 and a configuration database 212. Application properties are preferably loaded when the property manager is initialized by the main application thread 201.

A database connection manager 204, having a primary function of managing connection pooling, manages access to data sources 213.

A data cache 205 is provided for caching data common to all schedulers and data that does not change often. A static data cache object contains a concrete data cache instance for each data source defined in the system. Clients of the data cache 205 should first get a reference to the data source specific Cache and then access the cached data.

A communication module 207 accepts commands/requests on a server socket 206 and calls the appropriate routines to fulfill the requests.

Utility threads 208 do general house keeping functions such as periodically refreshing application properties and requesting GC (garbage collection).

Song and Ad schedulers encapsulate the logic (FIGS. 8-15) of scheduling songs and ads respectively for a channel.

Each Rule 209 is an object that implements a rules interface and is served by a rules factory 210. Each rule represents a constraint on the song selection. It should be appreciated that within the JAVA language, an "interface" represents a collection of method definitions and constant values. It is later implemented by classes that define the interface with the "implements" keyword.

A fuller description of each of the above components is provided in the sections below.

Logging System

To record transactions and activities, the multimedia scheduler further includes a logging system. In a preferred embodiment, the invention employs the Log4j logging subsystem, a freely available software package made available under the terms of the Apache Software License.

Significant advantages of Log4j include:

With log4j it is possible to enable logging at runtime without modifying the application binary;

The log4j package is designed so that logging statements can remain in shipped code without incurring a heavy performance cost;

Logging behavior is controlled by editing a configuration file without touching the application binary;

It is possible to control which log statements are output at arbitrarily fine granularity.

The target of the log output can be a file, an output stream, a java.io.Writer, a remote log4j server, a remote Unix Syslog daemon, or even an NT Event logger.

While Log4j is the preferred logging system, other logging systems are entirely consistent with the spirit and scope of the invention.

System Design Detail

The Application Class (201)

Figure 3:
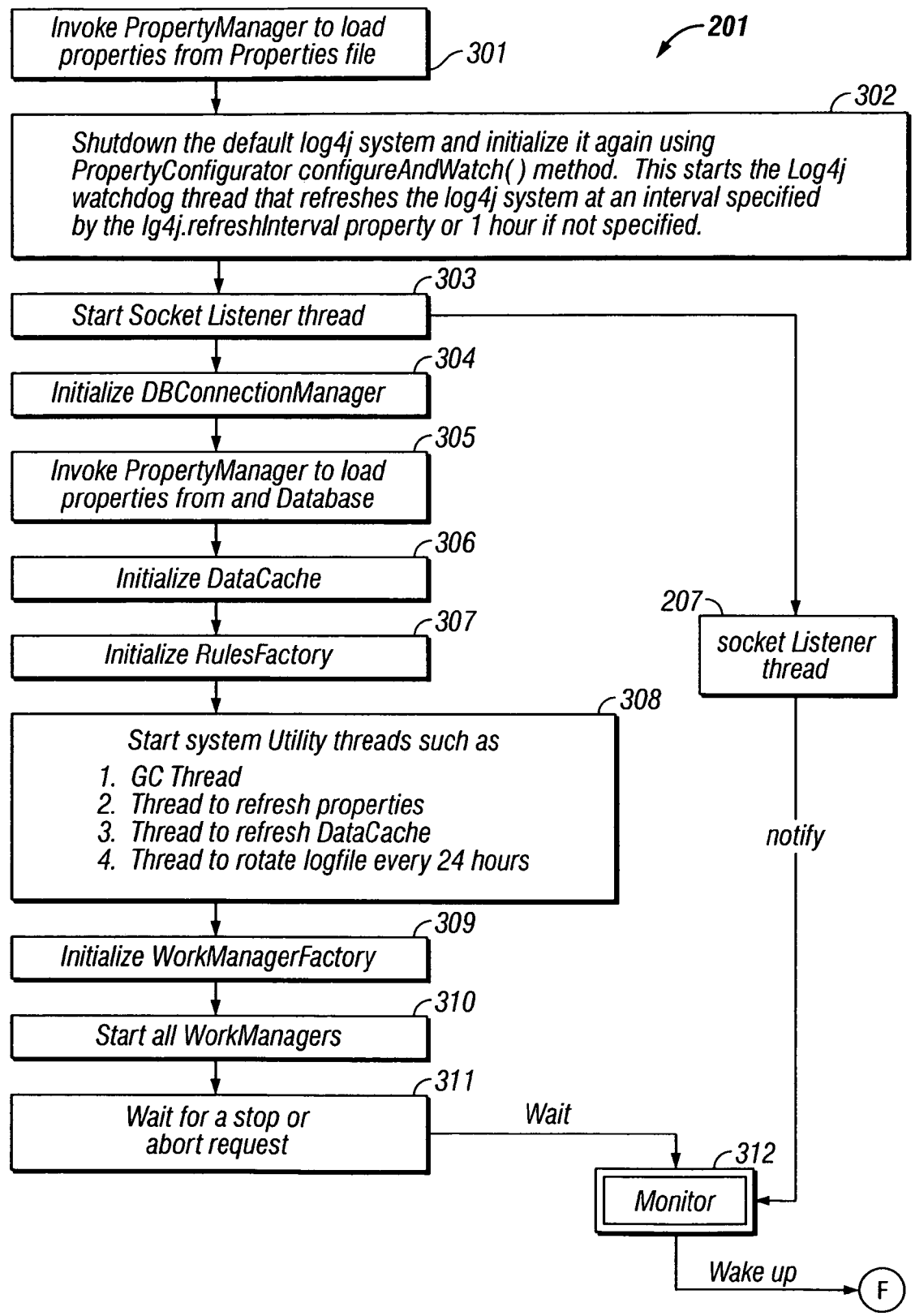
FIG. 3 provides a flow diagram of a main application thread from the scheduler of FIG. 2 according to the invention.
Figure 3:
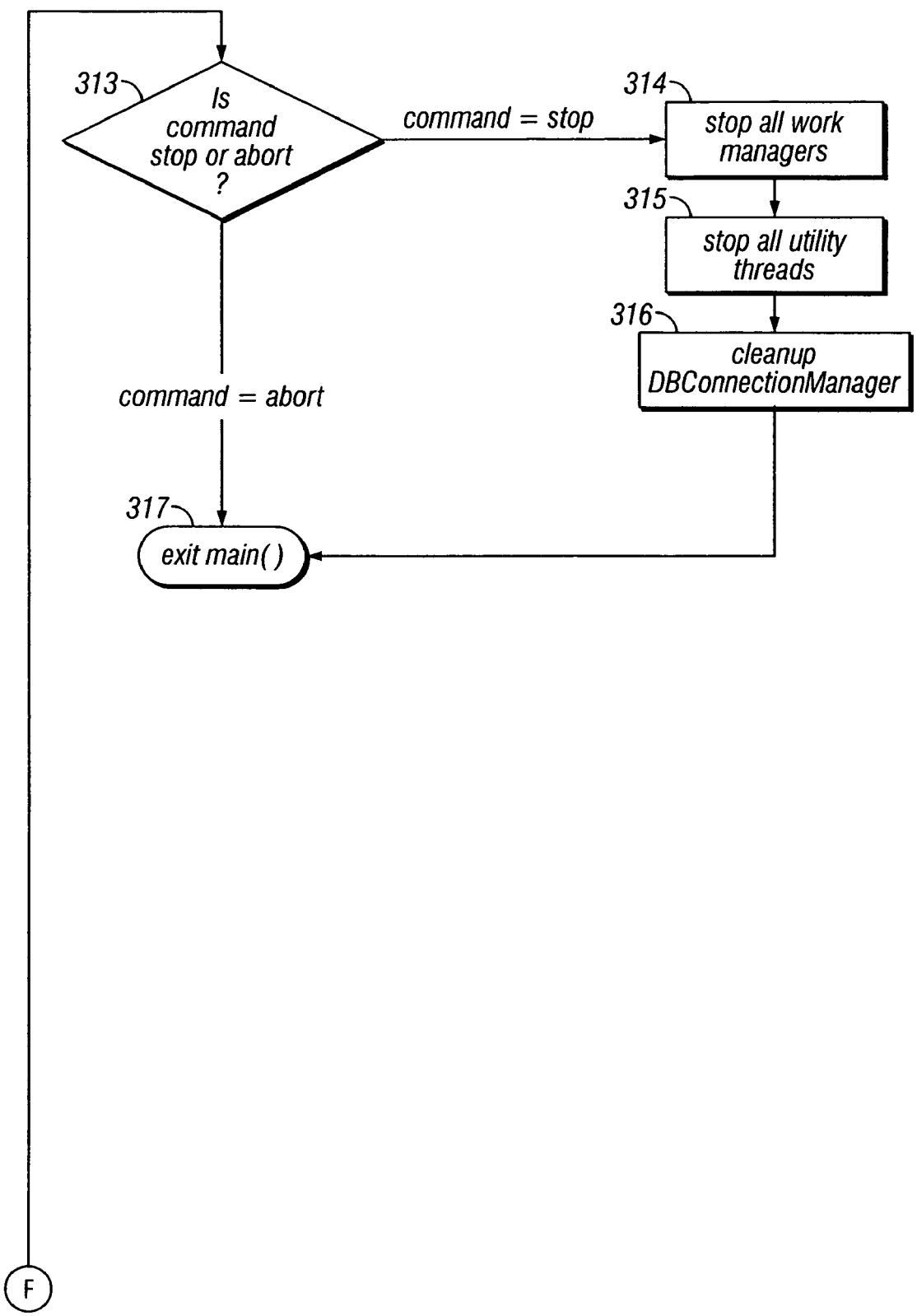

The main Application thread 201 constitutes an Application class. The main Application thread 201 is the main starting point of the multimedia scheduler. Its function is to initialize each of the individual components within the scheduler. After initializing each of the components, the Application thread 201 awaits a 'stop' or 'abort' signal. Each component initializes itself with properties accessible via the property manager 203. The flowchart provided in FIG. 3 illustrates the function performed by the Application class in greater detail. The system components are initialized by the main Application thread in the following sequence:

the property manager 203 is invoked to load properties from the property file (211) 301;

the logging system is initialized 302;

the socket listener thread is started 303;

the database connection manager 204 is initialized;

the property manager is invoked to load properties from the configuration database (212) 305;

the datacache is initialized 306;

the rules factory is initialized 307;

system utility threads 208 are initialized 308;

the work manager factory 202 is initialized 309; and all work managers are started 310.

Each of the above processes is described in greater detail below. After each of the system components is initialized, the main Application thread waits for a 'stop' or 'abort' request 311. When a request is transmitted via socket 206, the socket listener thread 207 notifies monitor 312. The main Application evaluates 313 the request. In the case of an 'abort,' the Application is stopped immediately 317. In the case of a 'stop,' the application is stopped gracefully, allowing the scheduler to complete jobs that are currently underway. Work managers are stopped 315, utility threads are stopped 315, a cleanup of the database connection manager 203 is performed 316, and the program is exited 317.

In addition to initializing the Application, the main Application thread also contains public static methods to control and report on the application. Thus, methods to stop/and/or abort the scheduler, to create a status report, refresh the system and rotate the main log file are implemented in the Application class. More will be said about these methods below.

Property Manager (214)

The property manager acts as the access point for all application properties. Application properties are found in two places:

1. The property file 211, and

2. A configuration database table. The CONFIG_KEY column holds acts as the property name and the CONFIG_VALUE column acts as the property value.

All properties are loaded when the main application thread initializes the property manager. Subsequently, the property refresher utility thread 208 calls a method in the property manager 203 to refresh the properties at regular intervals.

Figure 4:
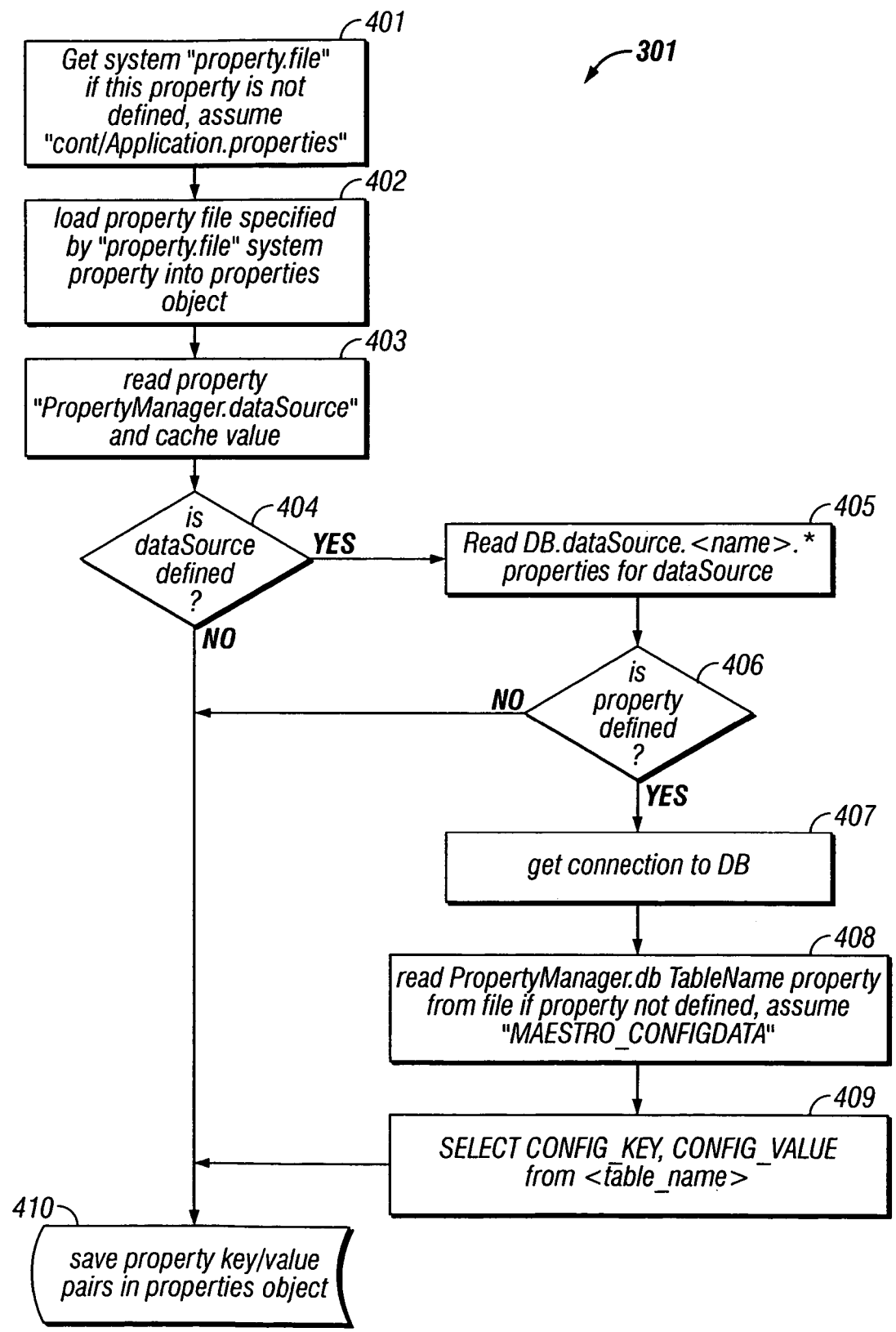
FIG. 4 provides a flow diagram of a process for initializing a property manager object from the application thread of FIG. 3 according to the invention.

FIG. 4 provides a flow diagram of a process 301 for initializing the property manager 203:

read the system property 'property.file.' 401 load the file 211 specified by 'property.file' into the properties object (214) 402;

read the system property 'PropertyManager.dataSource' and cache value;

evaluate whether a dataSource is defined;

if 'yes,' read DB.dataSource.<name>.*properties for dataSource 405 if 'no'; evaluate if the property is defined 406;

if 'yes,' get a connection to the database 407;

if 'no'; read PropertyManager.dbTableName property from property file 408;

select configuration property key/value pairs from the indicated table 409; and save configuration property key/value pairs to the properties object (214) 410.

Database Connection Manager (204)

The database connection manager 204 acts as the access point to get connections to a database, providing pooling of database connections. As well, the database connection manager maintains a thread-local cache of connections for each thread. The main public interface to the database connection manager includes at least the following methods:

getConnection(dataSourceName);
returnConnection(connectionObject, dataSourceName)
flushThreadConnections().

Any component that gets a connection from the database connection manager has to return it by calling returnConnection() when it is done using the connection. When a component gets a connection by calling getConnection(), the database connection manager checks to see if a thread-local cache of connections for the thread, i.e. the component, exists and returns a connection from this cache if one is available. If a connection is not available in the thread-local cache, then the database connection manager must "check out" a connection from one of the 'pooled data source' pools 213. However it is preferable that get the connection from the thread-local cache; getting a connection from 'pooled data source' is a synchronized action and thus avoiding this activity makes it possible to avoid thread contention. The component receiving the connection has to return it by calling DBConnectionManager.returnConnection(), thus putting the connection back into the thread-local cache.

When a thread is finished with its work, preferably it flushes connections from this thread-local cache by calling DBConnectionManager.flushThreadConnections(). The flushThreadConnections() method "checks in" the connection back into the correct 'pooled data source' connection pool.

The 'pooled data source' connection pool does a sanity check on each connection requested from the pool. It creates a dummy prepared statement on the connection. Those skilled in the art will recognize that a "prepared statement" is an object containing a precompiled SQL (structured query language) statement. This object can then be used to efficiently execute this statement multiple times. Subsequently, the connection pool checks to see if an exception is thrown. If a thin JDBC (JAVA database connectivity) driver is being used, creation of the statement is enough to cause an exception on database unavailability. For an OCI (Oracle call interface, ORACLE CORPORATION, Foster City Calif.) driver, the executeQuery() method has to be invoked for an exception to be generated.

The connection pool discards the connection if an exception with any of the following messages is thrown:

"broken pipe"
"no more data to read from socket"
"not connected to ORACLE"
"ORACLE not available"
"end-of-file on communication channel;" and
"maximum open cursors exceeded."

The list of error messages is specified in Application.properties file and more error messages can be added as needed.

The first five errors indicate a fatal problem with the database, such as the database being down or the network being down, that makes the database inaccessible. The last error is to prevent service stoppage due to any bugs in scheduler application that cause cursor leakages. Any error message means that the connection is bad and cannot be reused. The connection pool discards such connection after trying to close it.

If the database pool does not have any free connections when a database connection is requested by a client, the PooledDataSource opens a new connection to the database, as long as the pool size does not exceed a maximum pool size set in the Application.properties files. If a new connection cannot be opened, the current work is interrupted. Additionally, a message is logged in the logfile and syslog (system log). Accordingly, this mechanism discards stale connections and opens new connections dynamically and allows us to gracefully handle database shutdowns.

Multiple data sources can be configured in the Application.properties. For each data Source, the database connection manger creates a PooledDataSource object that is responsible for maintaining a Connection pool to the DataSource and for ensuring re-entrancy. The database connection manger itself simply maintains a list of PooledDataSource objects and acts as the public interface to access the connection pools.

Figure 5:
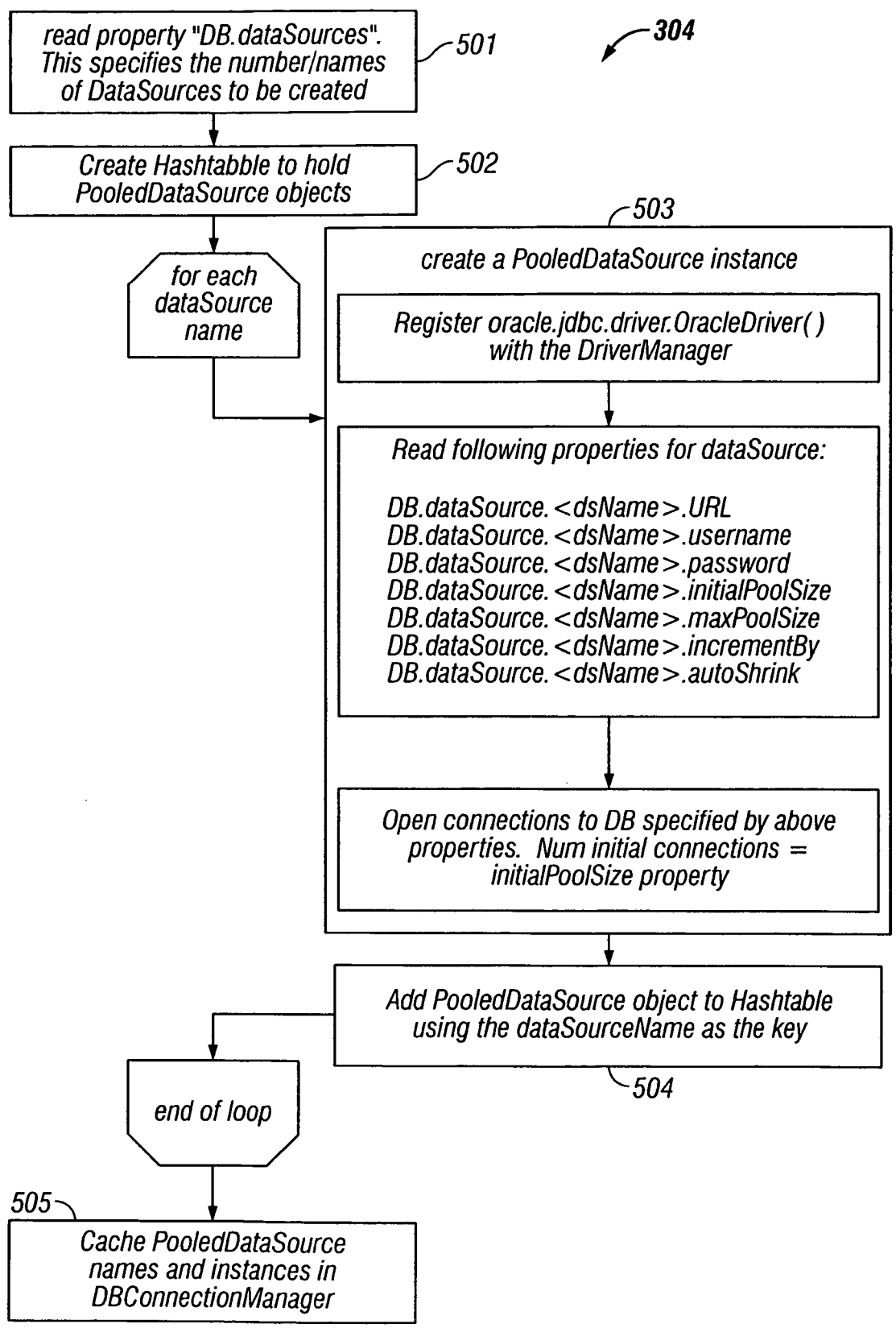
FIG. 5 provides a flow diagram of a process for initializing a database connection manager object from the application thread of FIG. 3 according to the invention.

FIG. 5 shows a flow diagram of a process for initializing a database connections:

read property 'DB.dataSources,' which specifies the number and the names of the dataSources to be created 501;
create a hash table to hold pooledDataSource objects 502;
for each dataSource name, create a PooledDataSource instance 503;
add each PooledDataSource object to the hashTable using the dataSourceName as the key 504; and
cache the pooled dataSource names and instances in DBConnection manager (204) 505.

DataCache (205)

One DataCache instance 215 per DataSource is defined by the DB.dataSources property. The DataCache 205 is used to cache some data that is fairly global and is not updated very frequently. Preferably the following data is cached:

The AUDIO_DIRECTORY: used by the clip-based scheduler to search for files and create symlinks;
The AD_CODES table: this gives a mapping between ad_codes and ad Id's supplied by a third party advertising provider;
The BANNER_SIZES table: used by StreamBasedSongScheduler to lookup banner sizes during calls to advertising from the third party provider; and
The FLAVOR_BANNERS table: used by StreamBasedSongScheduler to lookup banner sizes for a given flavor during calls to advertising from the third party provider.

There is a DataCacheRefresher thread 216 that reloads this data from the database. Since this data is fairly static, a refresh interval (which can be specified by the "DataCache.refreshinterval" property in the Application.properties file) of twenty-four hours is preferred.

Work Manager (202)

The Work Manager component (202) is the core piece of the server architecture for multimedia scheduler. It is the job scheduling system used to perform song and ad scheduling activities. As mentioned above, a Work Manager includes at least the following parts:

one or more WorkProducer threads 217;
one WorkQueue to hold work objects 218;
one or more Worker threads 219;
a DeleteSymlink thread 220; and
an optional monitoring thread 221.

Figure 6:
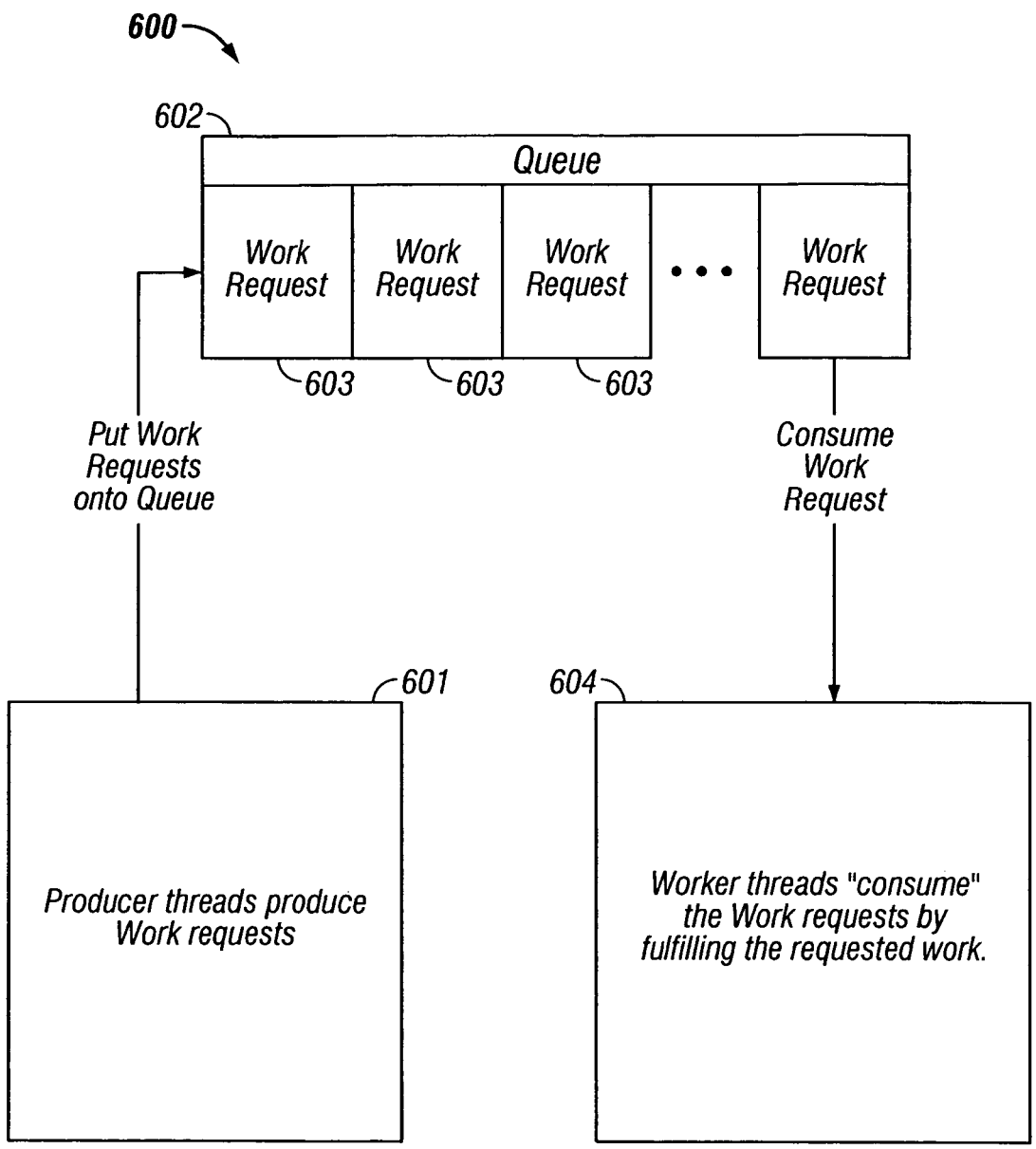
FIG. 6 provides a schematic template of a producer-consumer design.

As mentioned above, the scheduler has to perform some work every hour for each channel. In order to model this behavior in a scalable fashion the invention employs a producer—consumer model of work management. FIG. 6 provides a schematic diagram of a generalized producer-consumer arrangement 600. As in the current implementation of this model, there are a few producer threads 601 that periodically, every hour for example, check the system for work that needs to be done. When a producer thread encounters some work that needs to be done, a channel that has a schedule that is less than seven hours long, for example, it generates a work request 603 and puts it onto a queue 602. The producer threads thus produce work requests. To execute the work requests, the system has worker threads 604 (also called consumers, since they consume the requests put onto the queue).

The Producer-Consumer design pattern is well suited for implementation of the scheduling logic, which requires that schedules are generated and incremented on a periodic basis. Additionally, the producer-consumer model also offers excellent scalability characteristics.

The work manager component 202 is designed to be independent of the scheduling logic. It is fairly generic in design and finds use in other applications that require a job scheduling system. (The work Manager module does depend on the property manager and database connection manager). Also, some level of indirection is employed in the work producers to keep them independent of the song/ad scheduling logic. This is achieved by having the work producer thread wrap another work creator object that actually creates the work objects 603. The work objects represent the work that needs to be done. The work creator object also decides the time interval after which it will create another batch of work objects 603. Each work producer thread contains one work creator object. The work manager creates work creator objects by invoking WorkCreatorFactories configured in the Application.properties file.

Each work manager 202 optionally has a refresh thread. The refresh interval is set in the properties file. The refresh thread periodically polls the WorkCreatorFactories to get new work creator objects. This functionality is needed to schedule ads for newly added channels. This refresh thread is also useful for detecting new configuration sets added to the Application.properties file at runtime.

Figure 7:
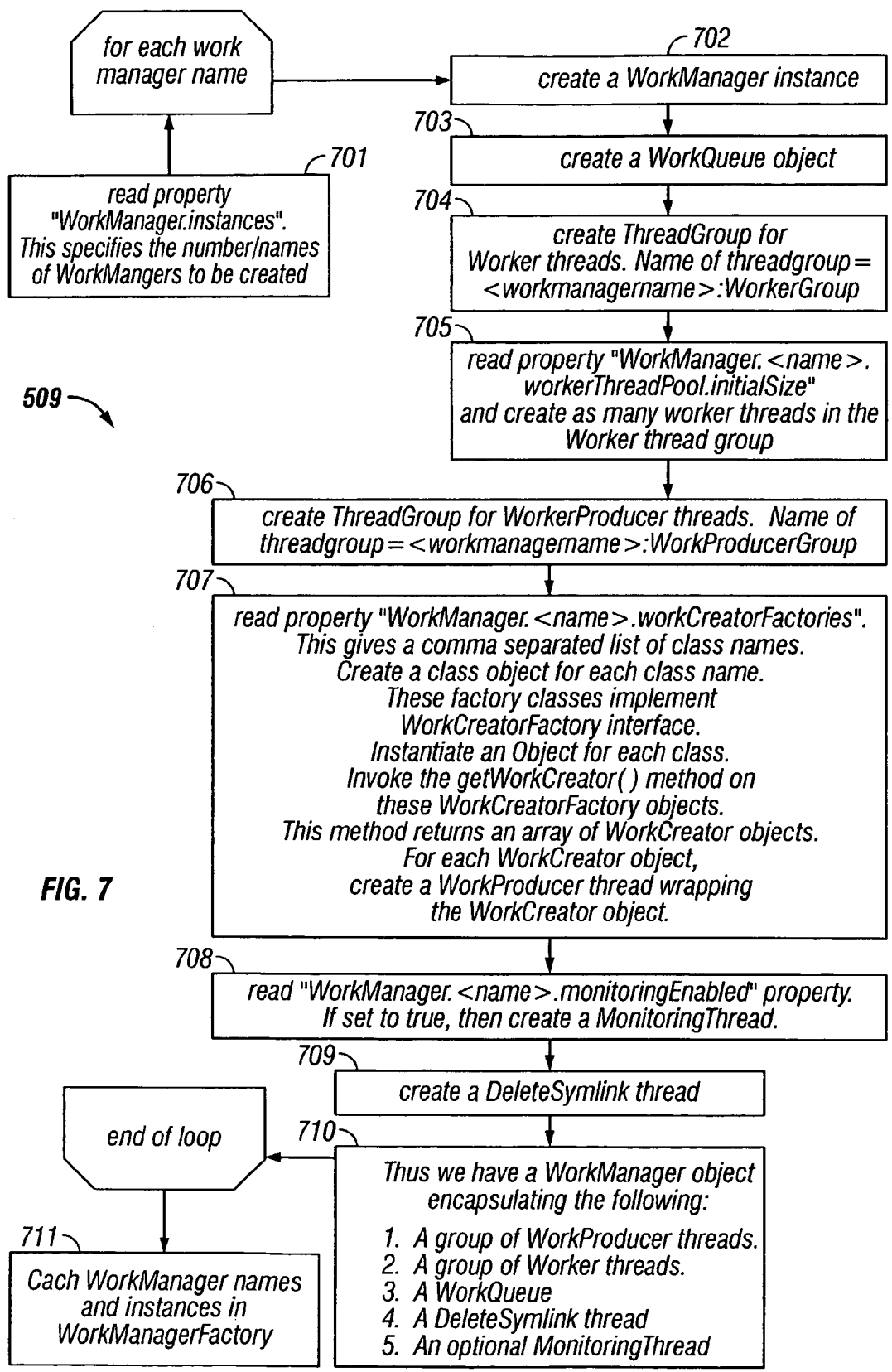
FIG. 7 provides a flow diagram of a process for initializing a work manager object from the application thread of FIG. 3 according to the invention.

FIG. 7 provides a flow diagram of a work manager initialization procedure 309:
read property 'WorkManager.instances' to determine the number and the names of work managers to be created 701;
for each work manager name,
  create a WorkManager instance 702;
  create a WorkQueue object 703;
  create a thread group for worker threads 704;
  create as many worker threads in the thread group as specified in properties 705;
  create a thread group for worker-producer threads 706;
  create as many work creator factories as specified by properties, create an array of work creator objects, wrap each work creator with a work producer thread 707;
  create a monitoring thread if specified in property file 708;
  create a delete symlink thread 709;
  each resulting WorkManager object encapsulates (1) a group of work producer threads, (2) a group of worker threads,(3) a work queue (4) a delete symlink thread, and (5) an optional monitoring thread 710; and
cache the work manger names and instances in the WorkManagerFactory 711.

A preferred embodiment of the invention provides separate work manager for song scheduling and ad scheduling. The song scheduling work manager creates a DeleteSymlink thread which is not created by the other work manager. The ad scheduling work manager schedules ads for Clip-based channels. Having a distinct Work Manager for ad scheduling, with its own work queue and worker threads, ensures that as scheduling jobs do not get backed up in the case of a sudden surge in the number of song scheduling jobs.

All parameters relating to the work manager, such as the number of work managers, and the assignment of work creators to work managers are configured via the Application.properties file, thus allowing great control over configuration of the scheduler application without requiring changes to the code. WorkManager properties are picked up at Application initialization time only. Hence any changes to the WorkManager properties are picked up only after a restart.

Communication Module

The scheduler is capable of receiving requests over a socket 206. The port number for the socket is configured in the Application.properties file by setting the property name Application.port.

To send a request to the scheduler, a client program, which can be in any language, opens a socket connection to the scheduler at the specified port and sends a request. Advantageously, the requests are in the form of XML (extensible markup language) strings, which readily enable the transmission, validation, and interpretation of data between applications.

Upon receiving a request, the scheduler returns an XML response.

The scheduler supports at least the following requests:
stop;
abort;
channel_schedule;
status;
ping;
rotate_logfile; and
refresh.

The tables below describe each request and its corresponding response:

TABLE 1

| Request name | Stop |
|---|---|
| Request Response | <command name="stop" client="admin"/> |

TABLE 2

| Request name | Abort |
|---|---|
| Request Response | <command name="abort" client="admin"/> |

TABLE 3

| | |
|---|---|
| Request name | channel_schedule |
| Request | `<command name="channel_schedule"` |
| | `        channel_id="2504"` |
| | `        length="len_of_schedule_in_milliseconds"` |
| | `        client="tools">` |
| | `    <pattern name="some name"` |
| | `            duration="milliseconds">` |
| | `        A,B,C` |
| | `    </pattern>` |
| | `</command>` |
| Response | `<response name="sample_schedule">` |
| | `<channel id="4508" playlists="1234,345">` |
| | `    <name><![CDATA[All Blues-aol]]></name>` |
| | `    <schedule>` |
| | `        <clip id="127400"` |
| | `                track="1"` |
| | `                start_time="1038264876852"` |
| | `                length="236408">` |
| | `            <name><![CDATA[Leave A Tender Moment Alone]]></name>` |
| | `            <rotation_code><![CDATA[A]]></ rotation_code >` |
| | `        <artist id="140">` |
| | `            <name><![CDATA[Billy Joel]]></name>` |
| | `        </artist>` |
| | `        <album id="11481">` |
| | `            <name><![CDATA[An Innocent Man]]></name>` |
| | `        </album>` |
| | `            <violation state="N" type="N/A">` |
| | `            </violation>` |
| | `        </clip>` |
| | `    <clip>` |
| | `        . . .` |
| | `    </clip> rotation_code` |
| | `    </schedule>` |
| | `</channel>` |
| | `</response>` |
| Different violation types | Rule |
| | File |
| | JavaException (Clip for a rotation code will not be scheduled) |
| | NoClipsForRotationCode |
| | LightningCastInteractionError |

TABLE 4

| | |
|---|---|
| Request name | Status |
| Request | `<command name="status" client="admin"/>` |
| Response | `<response name="status">` |
| | `<Scheduler start_time="03/07/03 21:57:34,651" cvs_tag="$Name: QADROP2f_2003_03_07 $">` |
| | `    <UtilityThreads>` |
| | `        <Thread name="PropertyRefresher" priority="5" is_alive="true" is_daemon="false" wait_interval_ms="3600000"></Thread>` |
| | `        <Thread name="GCThread" priority="5" is_alive="true" is_daemon="false" wait_interval_ms="300000"></Thread>` |
| | `        <Thread name="DataCacheRefresher" priority="5" is_alive="true" is_daemon="false" wait_interval_ms="86400000"></Thread>` |
| | `        <Thread name="LogfileRoller" priority="5" is_alive="true" is_daemon="false" wait_interval_ms="3199917"></Thread>` |
| | `    </UtilityThreads>` |
| | `    <SocketListener priority="5" is_alive="true" is_daemon="false" port="8087"></SocketListener>` |
| | `    <DBConnectionManager>` |
| | `        <PooledDataSource name="DEFAULT" schema="mangesh2" url="jdbc:oracle:thin:@db-perpetua.spinner.com:1521:devdb1">` |
| | `            <OpenConnections>40</OpenConnections>` |
| | `            <FreeConnections>40</FreeConnections>` |

TABLE 4-continued

```
            </PooledDataSource>
        </DBConnectionManager>
        <WorkManagers>
            <WorkManager name="SongSchedulerWM">
                <WorkProducerGroup>
                    <Thread name="SongSchedulerWM:WorkProducer_0"
 priority="5" is_alive="true" is_daemon="false"
wait_interval_ms="3600000"></Thread>
                </WorkProducerGroup>
                <WorkerGroup active="30"></WorkerGroup>
                <WorkQueue name="WorkQueue" pending="0"
in_progress="0"></WorkQueue>
                <Thread name="SongSchedulerWM:MonitoringThread"
 priority="5" is_alive="true" is_daemon="false"
wait_interval_ms="60000"></Thread>
                <Thread name="SongSchedulerWM:DeleteSymlinkThread"
 priority="5" is_alive="true" is_daemon="false"
wait_interval_ms="300000"></Thread>
            </WorkManager>
            <WorkManager name="AdSchedulerWM">
                <WorkProducerGroup>
                    <Thread name="AdSchedulerWM:WorkProducer_0"
 priority="5" is_alive="true" is_daemon="false"
wait_interval_ms="60000"></Thread>
                    <Thread name="AdSchedulerWM:WorkProducer_1"
 priority="5" is_alive="true" is_daemon="false"
wait_interval_ms="60000"></Thread>
                </WorkProducerGroup>
                <WorkerGroup active="10"></WorkerGroup>
                <WorkQueue name="WorkQueue" pending="0"
in_progress="0"></WorkQueue>
                <Thread name="AdSchedulerWM:MonitoringThread"
 priority="5" is_alive="true" is_daemon="false"
wait_interval_ms="60000"></Thread>
            </WorkManager>
        </WorkManagers>
    </Scheduler>
</response>
```

TABLE 5

| | |
|---|---|
| Request name | Ping |
| Response | <response name="ping">Alive</response> |

TABLE 6

| | |
|---|---|
| Request name | rotate_logfile |
| Request | <command name="rotate_logfile" client="admin"/> |
| Response | <response name="rotate_logfile">OK</response> |

TABLE 7

| | |
|---|---|
| Request name | refresh |
| Request | <command name="refresh" client="admin"/> |
| Response | <response name="refresh">OK</response> |
| What does it do? | Wakes up all utility threads and work managers Thus: Properties will be reloaded GC will be invoked DataCache will get refreshed Logfile will get rotated All WorkManagers will start scheduling songs and Ads. This command is most useful if a new channel has been spun |

TABLE 7-continued and needs to be picked up immediately instead of waiting for the WorkManagers to automatically pick it up after the interval specified by the SongSchedulerWM.configSet.<csid>.waitInterval property.

The above scripts are provided for the sake of illustration only. Other methods and approaches to the sending of requests from a client to a server are also suited to the practice of the invention.

Utility Threads (208)

The main application thread also initializes each of several general house-keeping threads. These utility threads include at least:

a property refresher thread: this thread invokes PropertyManager.loadProperties() periodically;

a GC (garbage collection) thread: This thread invokes System.GC() periodically; and a DataCacheRefresher thread: This invokes DataCache.refreshDataCache() at an interval specified by the DataCache.refreshInterval property.

The sleep interval for each thread is configured via Application.properties. If these property values are changed, they are picked up at runtime when the PropertyRefresher next refreshes the application properties in memory.

Song and Ad Scheduler

Song Scheduler

Figure 8:
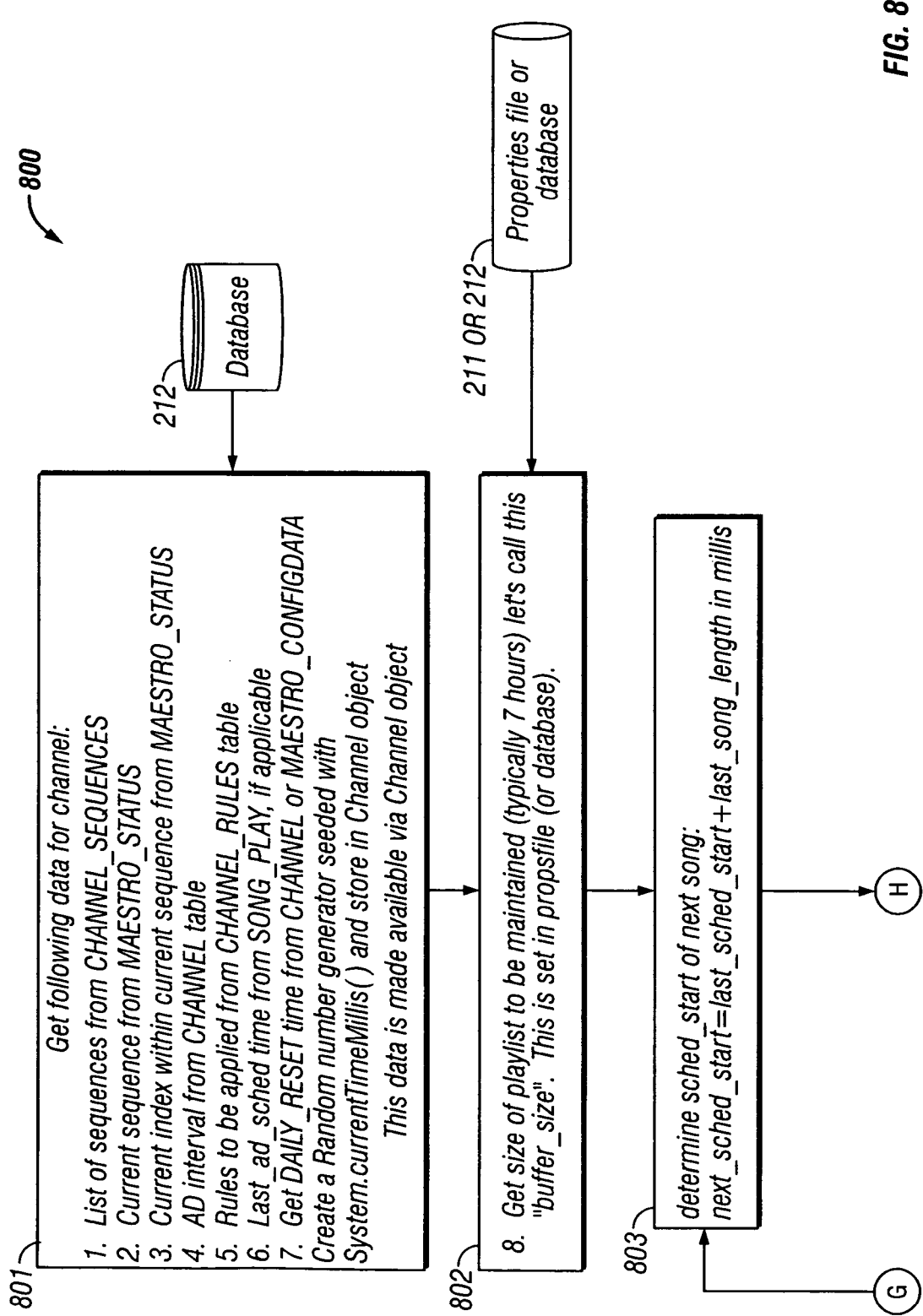
FIGS. 8-10 provide a flow diagram of [the logic of] a process for stream-based scheduling of media objects from the scheduler of FIG. 2 according to the invention.
Figure 8:
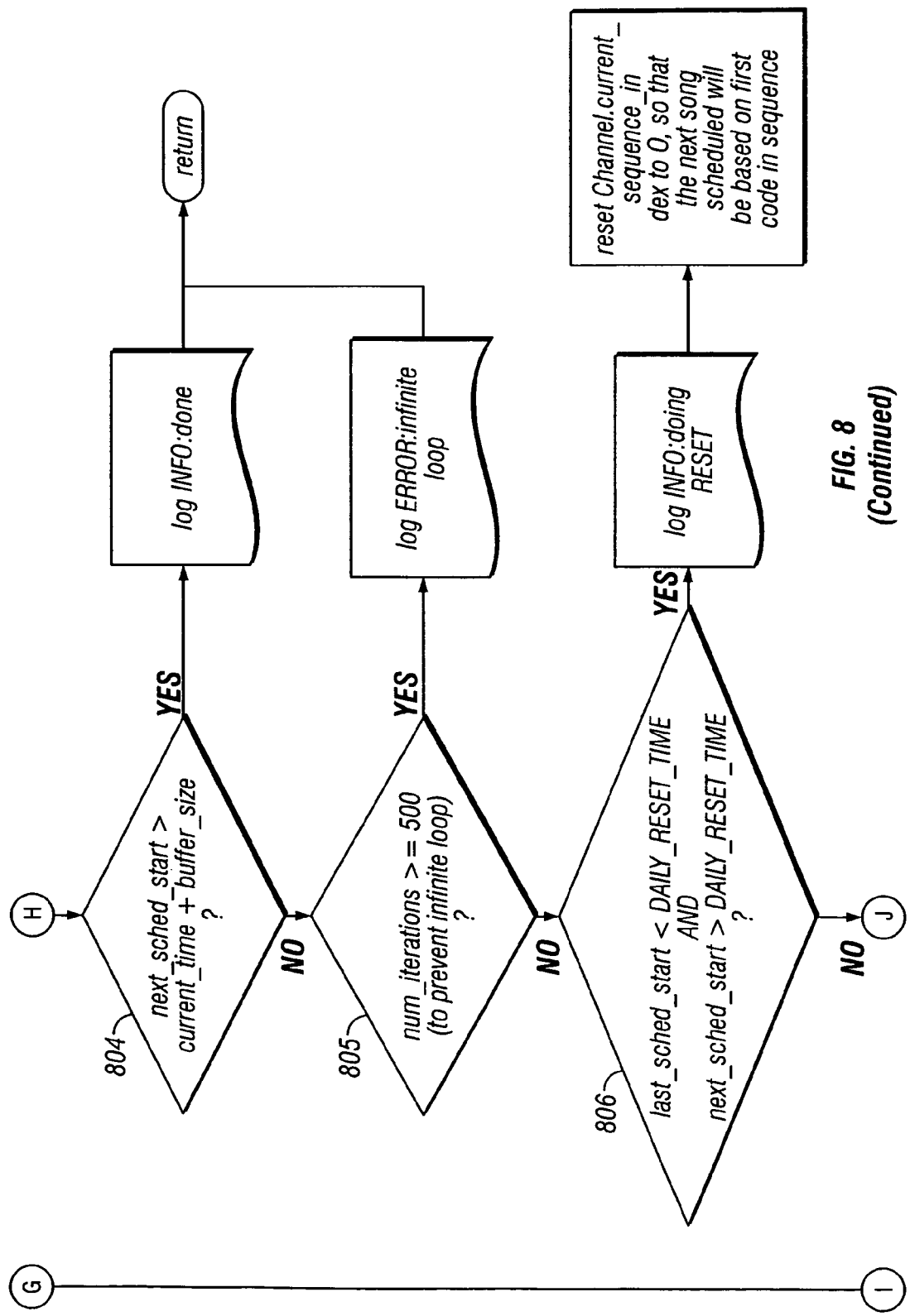
Figure 8:
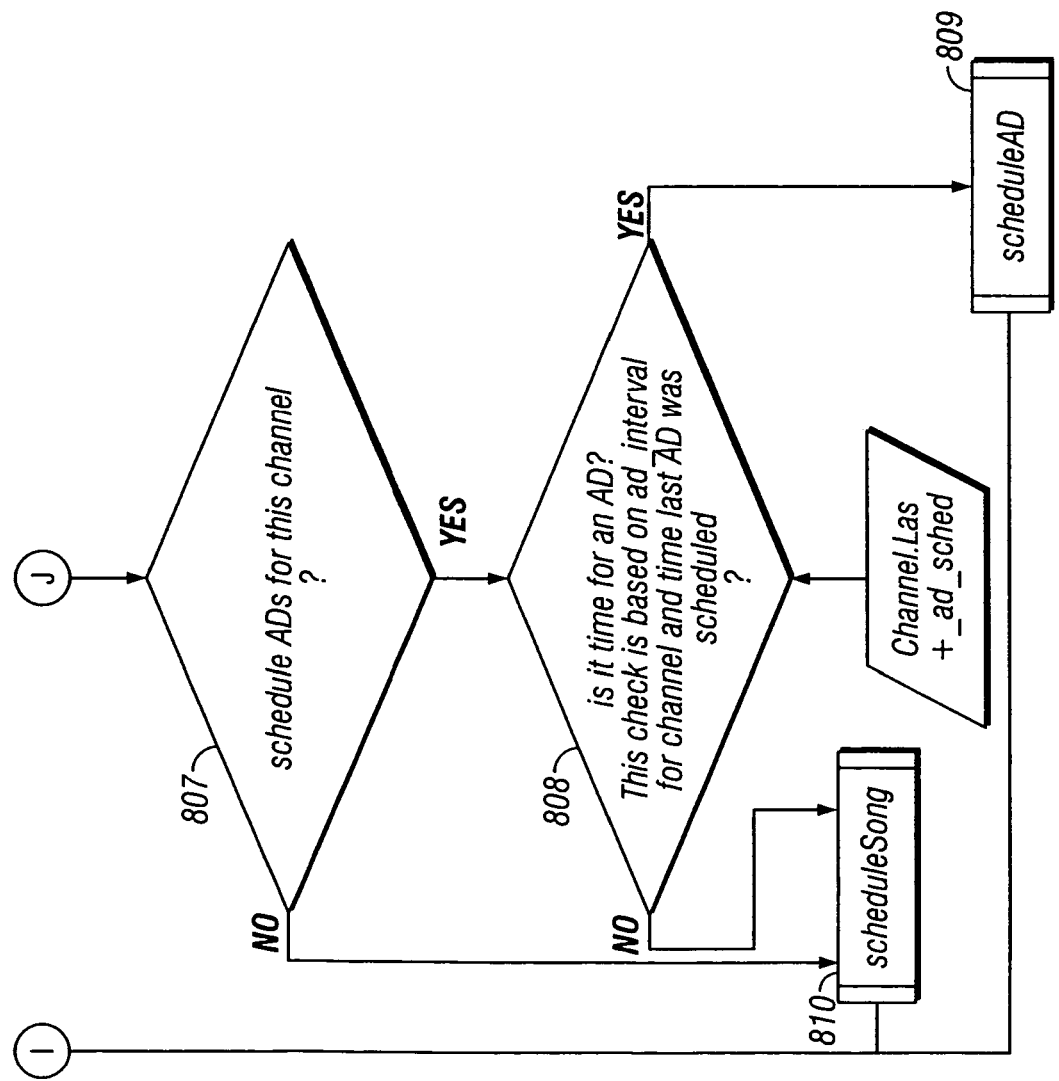
Figure 9:
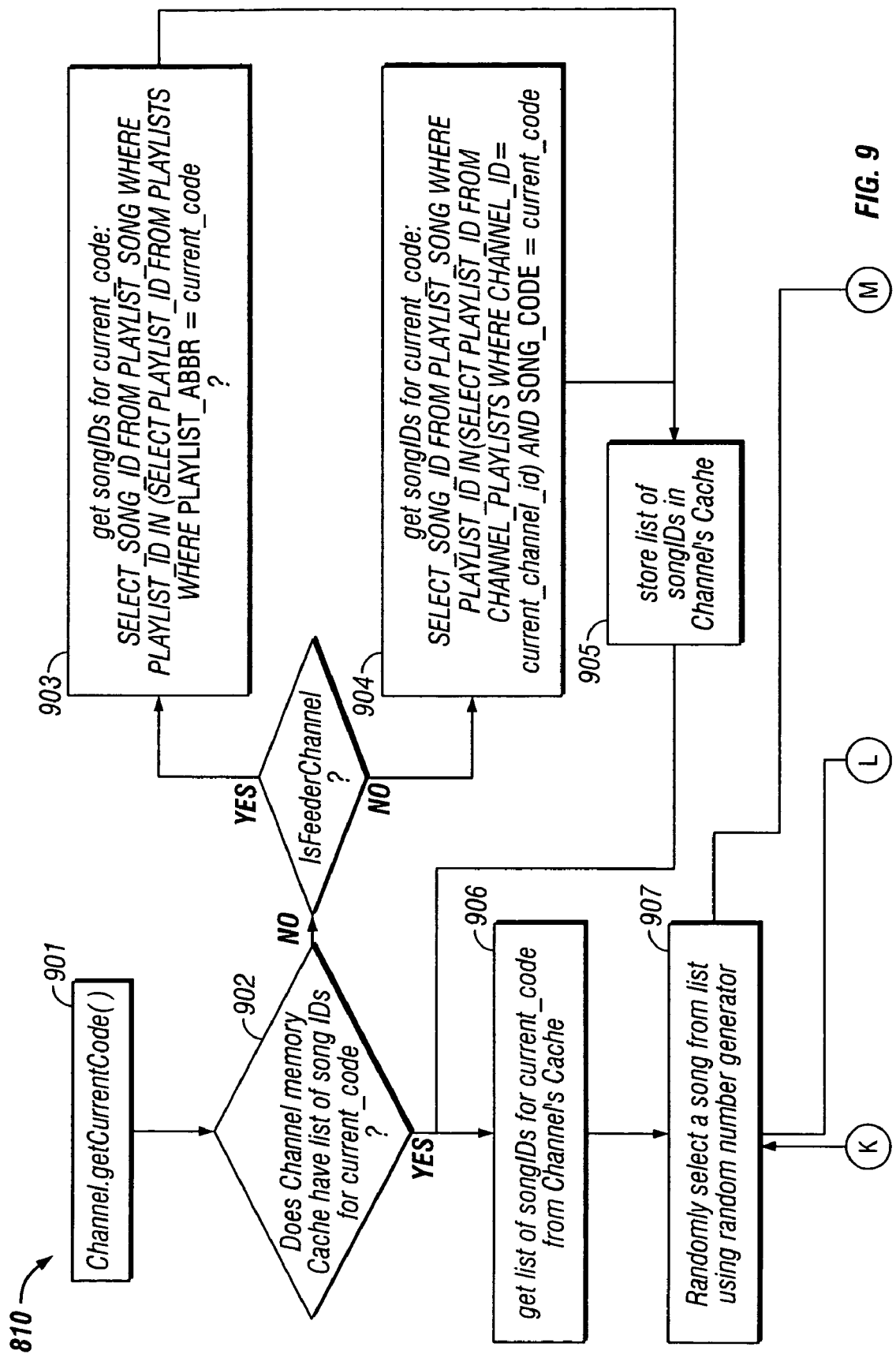
Figure 9:
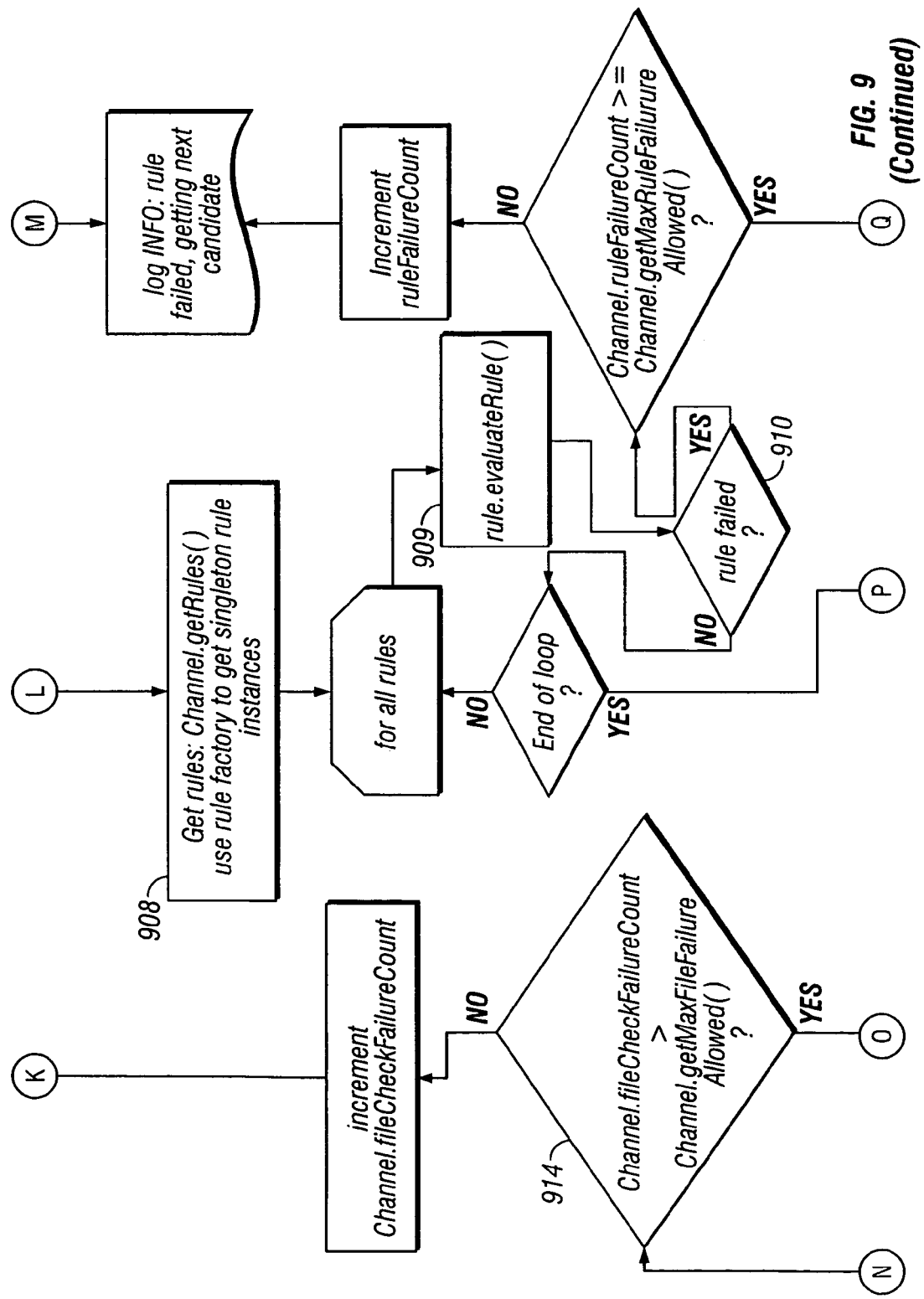
Figure 9:
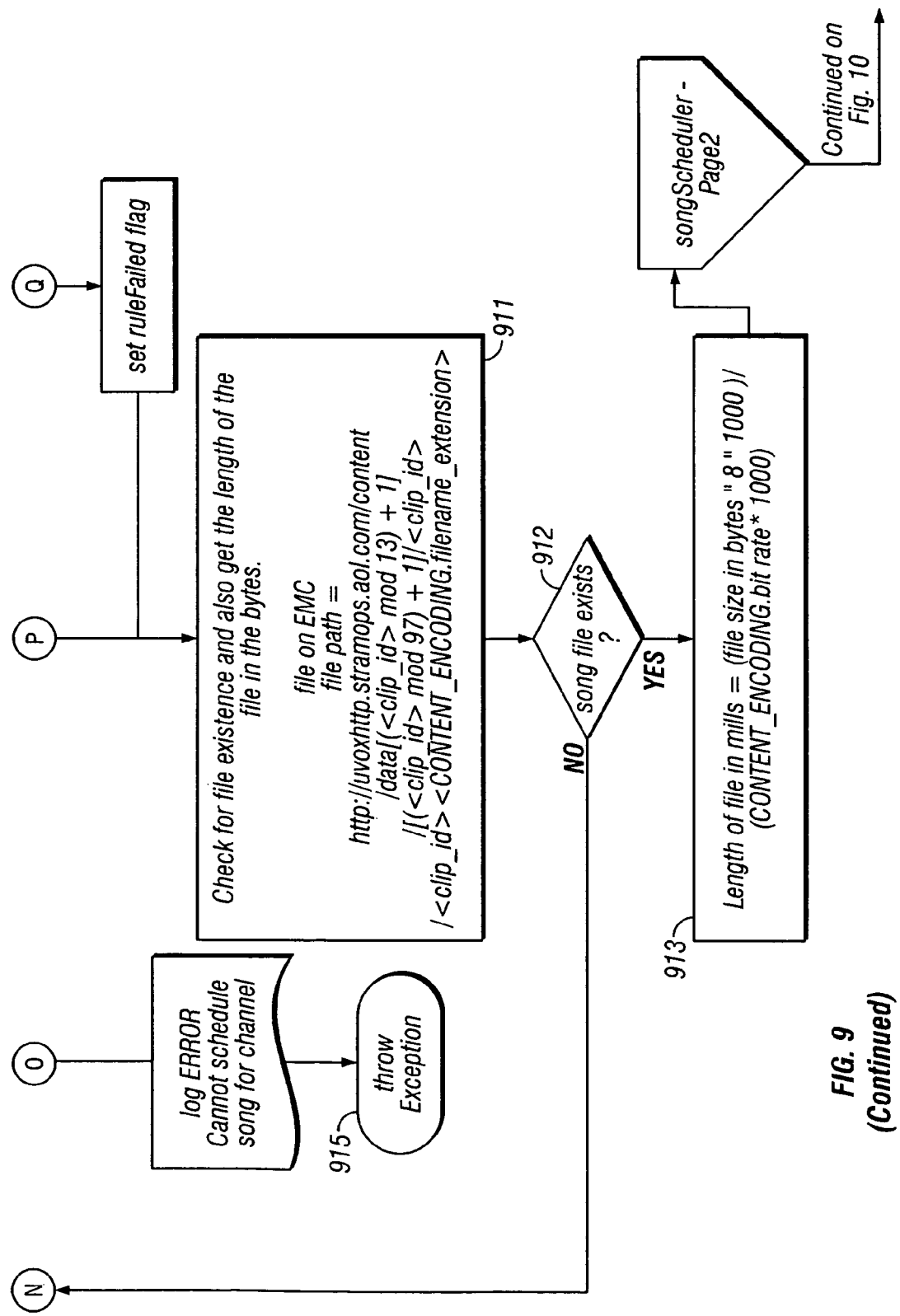
Figure 10:
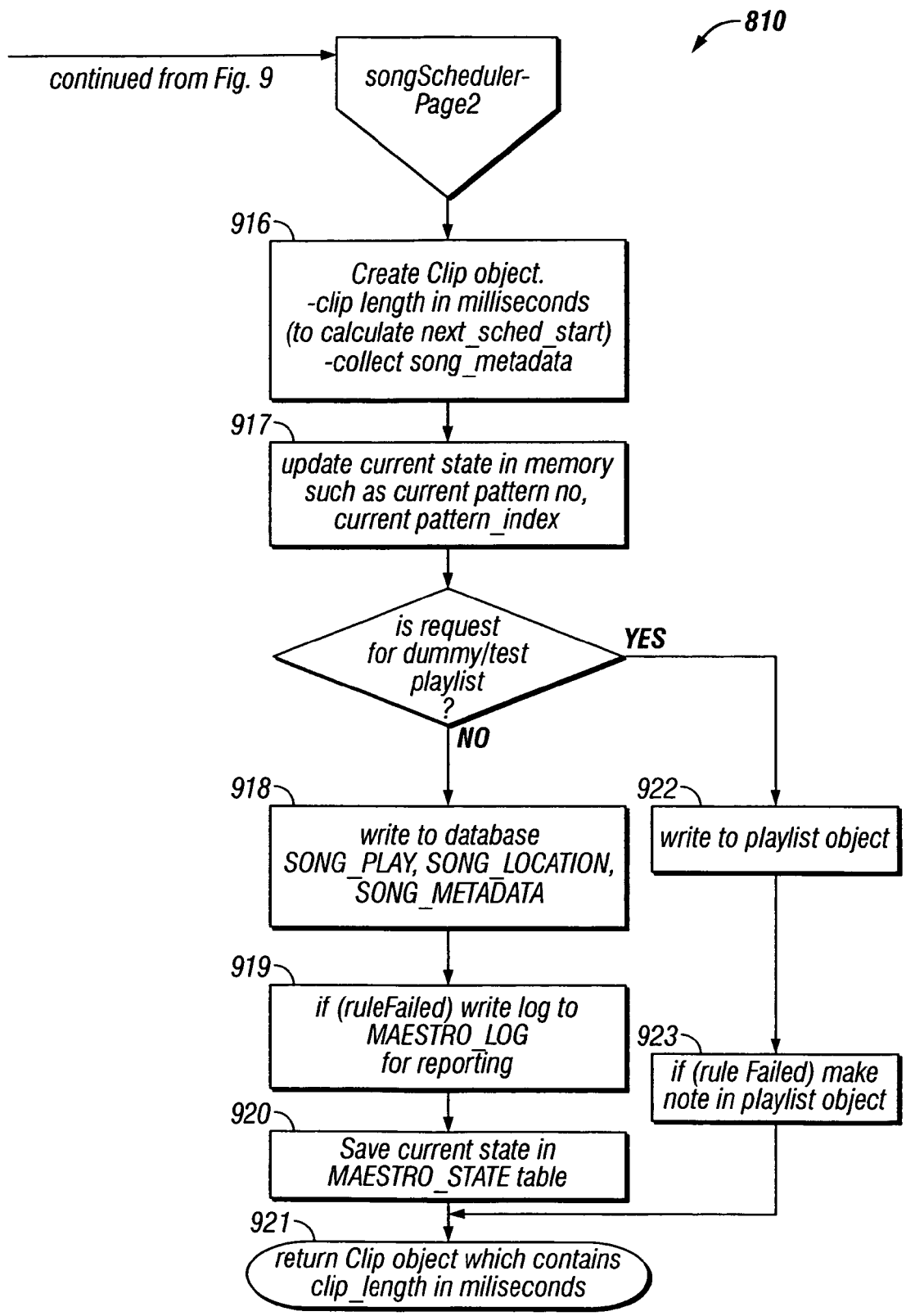

The multimedia scheduler supports both clip-based and stream-based channels. FIGS. 8-10 provide flow diagrams of a song scheduling process for stream-based channels. Turning now to FIG. 8:

get channel-related data from database 801:
    list of sequences;
    current sequence;
    current index within sequence;
    ad interval;
    rules to be applied; and
    daily reset time.
      Create random number generator seeded with current time: data is made available in channel object;
  get size of playlist to be maintained (buffer size) from property file or database 802;
  determine scheduled start of next song 803;
  if next start exceeds the buffer size, return 804; if not
  iterations less than a preset number? (e.g. 500) 805,
  is the next scheduled start after the daily reset time? 806. If not;
  is channel one for which ads are scheduled 807?
  if ads are to be scheduled, determine if it is time for an ad 808;
  if time for an ad, schedule ad 809;
  if not time for an ad, schedule song 810;
  if channel doesn't get ads, schedule song 810.

FIG. 9 provides a flow diagram of step 810 from FIG. 8, 'schedule song':

get current rotation code for the channel 901;
  is a list of song ID's for the channel cached 902?
  If 'no,' get list of song ID's for the current code 903 or 904, and store to channel cache 905;
  get list of song ID's from channel cache 906;
  randomly select a song from list 907;
  get an instance of the rules for the channel 908;
  evaluate each rule iteratively 909;
  if the song fails the rule 910, does the failure exceed a configurable maximum number of failures? If so, select another song at random 907. If not, check to see if the file exists for that song ID 911.

If the file exists 912, determine the file length 913. If not, check to see if the file check failure exceeds a configurable maximum 914. If not, select another song 907. If it does, throw exception 915. The flow diagram for step 810 continues in FIG. 10.

create a clip object, populate it with clip length in milliseconds and collect song metadata 916;
  update current state in memory such as current pattern number and current pattern index 917;
  if the request is for a dummy or test playlist, write the clip object to the playlist object 922 and if the song failed any rules, make a note in the playlist object; 923;
  if an actual schedule is being updated, write the clip object to database tables song_play, song_location and song_metadata 918;
  if the song failed any rules, write the log to the scheduler log 919;
  Save the current in the database in scheduler_state table 920; and
  Return a clip object that contains clip length in milliseconds.

As indicated above, writing the scheduled song to the database involves writing to three database tables:
  SONG_PLAY
  SONG_LOCATION
  SONG_METADATA.

The following columns in SONG_PLAY are populated by the scheduler:

TABLE 8

| COLUMN name | VALUE inserted |
| --- | --- |
| SERIAL_NUM | Next sequence from SONG_PLAY_SERIAL |
| PLAYLIST_ID | CHANNEL.CHANNEL_ID |
| SONG_ID | CLIP_ID of the song |
| SCHED_START | Scheduled start time expressed in SQL DATE format |
| ALBUM_ID | ALBUM_ID from CLIPS table |
| SONG_LENGTH | In seconds. The song length in millisecond precision is divided by 1000 and rounded as specified by BigDecimal.ROUND_HALF_EVEN |
| SONG_ARTIST_ID | ARTIST_ID from CLIPS |
| ALBUM_ARTIST_ID | ?? Don't know how this differs from song_artist_id |
| SCHED_TIMESTAMP | Scheduled start time expressed in milliseconds since midnight Jan. 1, 1970 |
| ACCURATE_SONG_LENGTH | Song length in milliseconds. This is calculated by Scheduler |
| ROTATION_CODE | The ROTATION_CODE value that was used to schedule this song |
| CLIP_TYPE | 0 if the clip is a song<br>1 if the clip is an advertisement |

The following columns in SONG_LOCATION are populated by the scheduler:

TABLE 9

| COLUMN name | VALUE inserted |
| --- | --- |
| SERIAL_NUM | Corresponds to serial_num in SONG_PLAY table |
| STREAM_ID | Stream id from STREAM table such that STREAM.CHANNEL_ID = channel_id |
| AUDIO_LOCATION | File path name starting at the docroot. Eg. /content/data1/ . . . mp3 |

The following columns in SONG_METADATA are populated by the scheduler:

TABLE 10

| COLUMN name | VALUE inserted |
| --- | --- |
| SERIAL_NUM | From SONG_PLAY table |
| METADATA | XML String that has the following format:<br><SongMetaData><br>    <SongName>ABC Song</SongName><br>    <AlbumName>ABC Album</AlbumName><br>    <ArtistName>Super-Duper Singer</ArtistName><br>    <SongLength>in seconds</SongLength><br>    <Soon>coming soon song name ?? </Soon><br>    <AlbumArt>data9/69/20535/20535_75_75_72_front.jpg</AlbumArt><br>    <Serial>SONG_PLAY.SERIAL</Serial><br>    <SongId>CLIP_ID</SongId><br></SongMetaData> |

Figure 11:
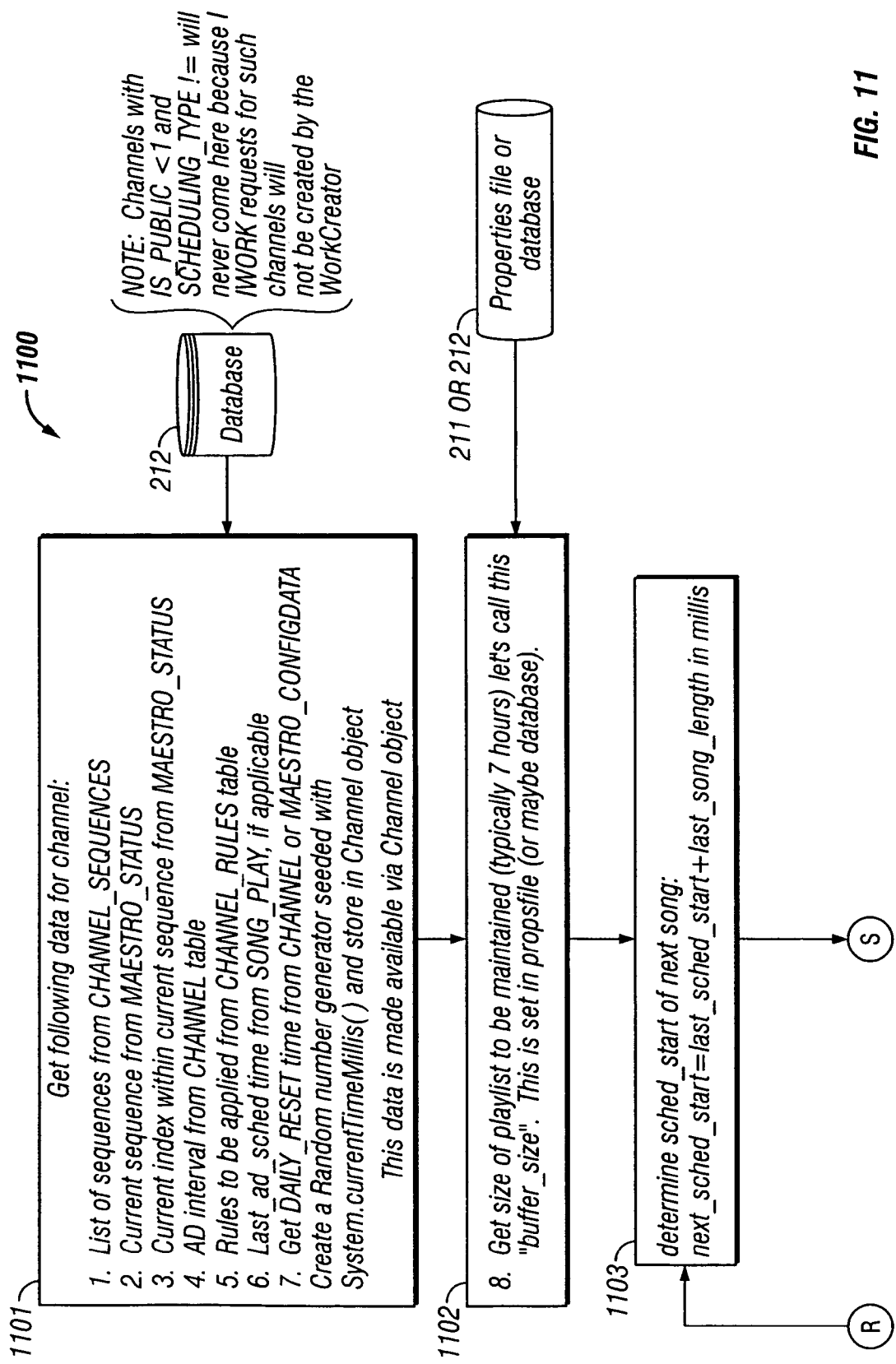
FIGS. 11-13 provide a flow diagram of [the logic for] a process for clip-based scheduling of media objects from the scheduler of FIG. 2 according to the invention.
Figure 11:
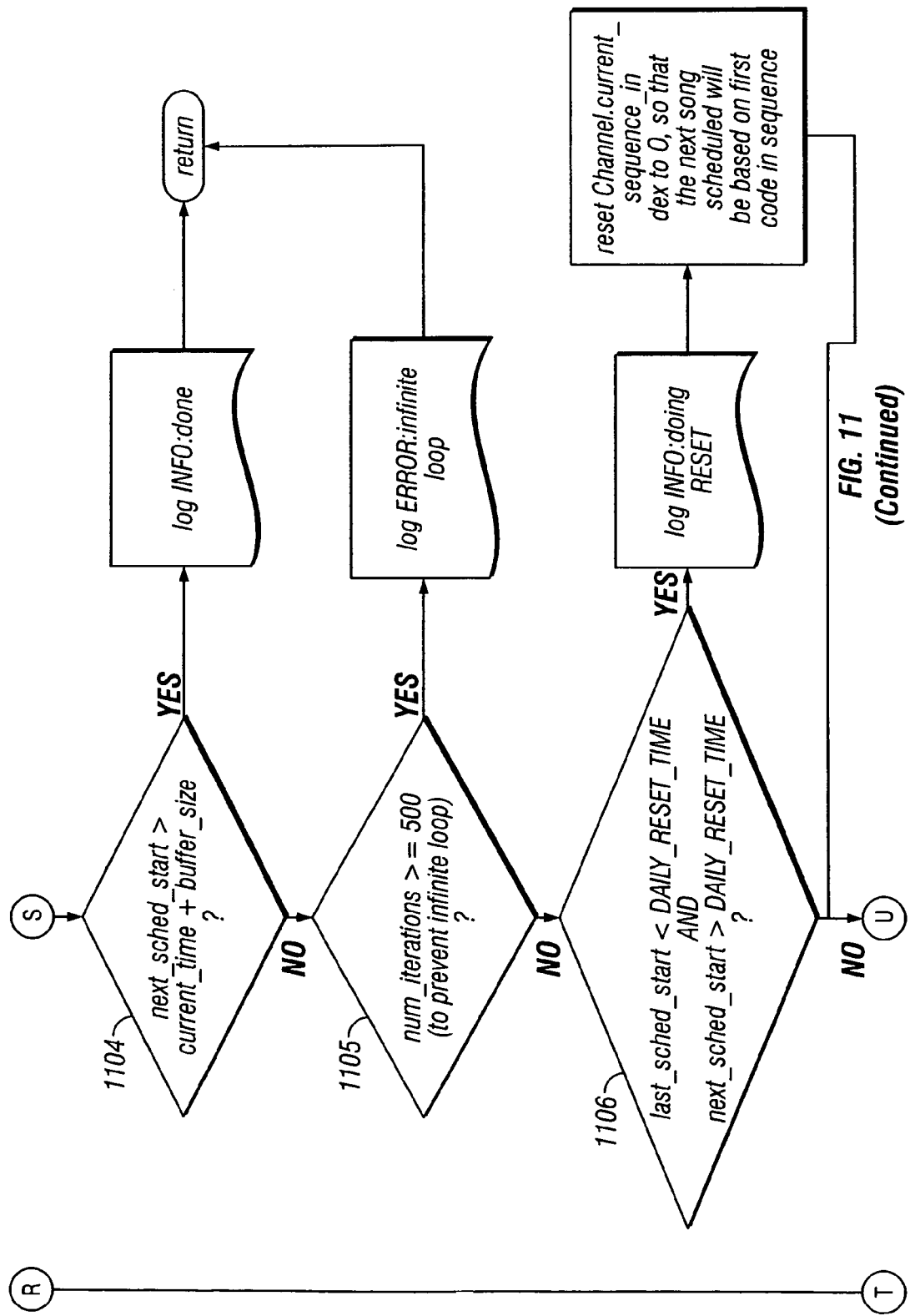
Figure 12:
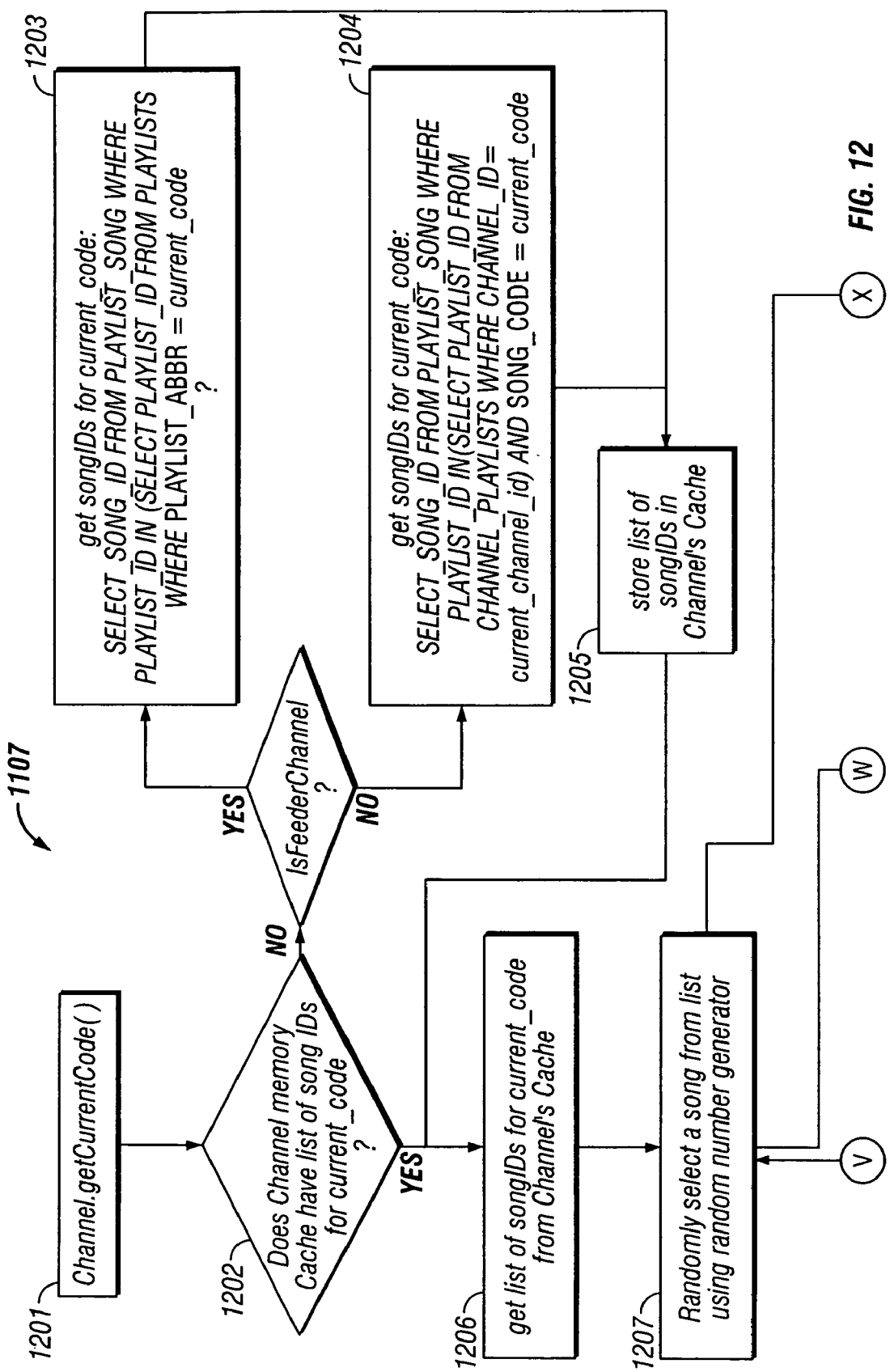
Figure 12:
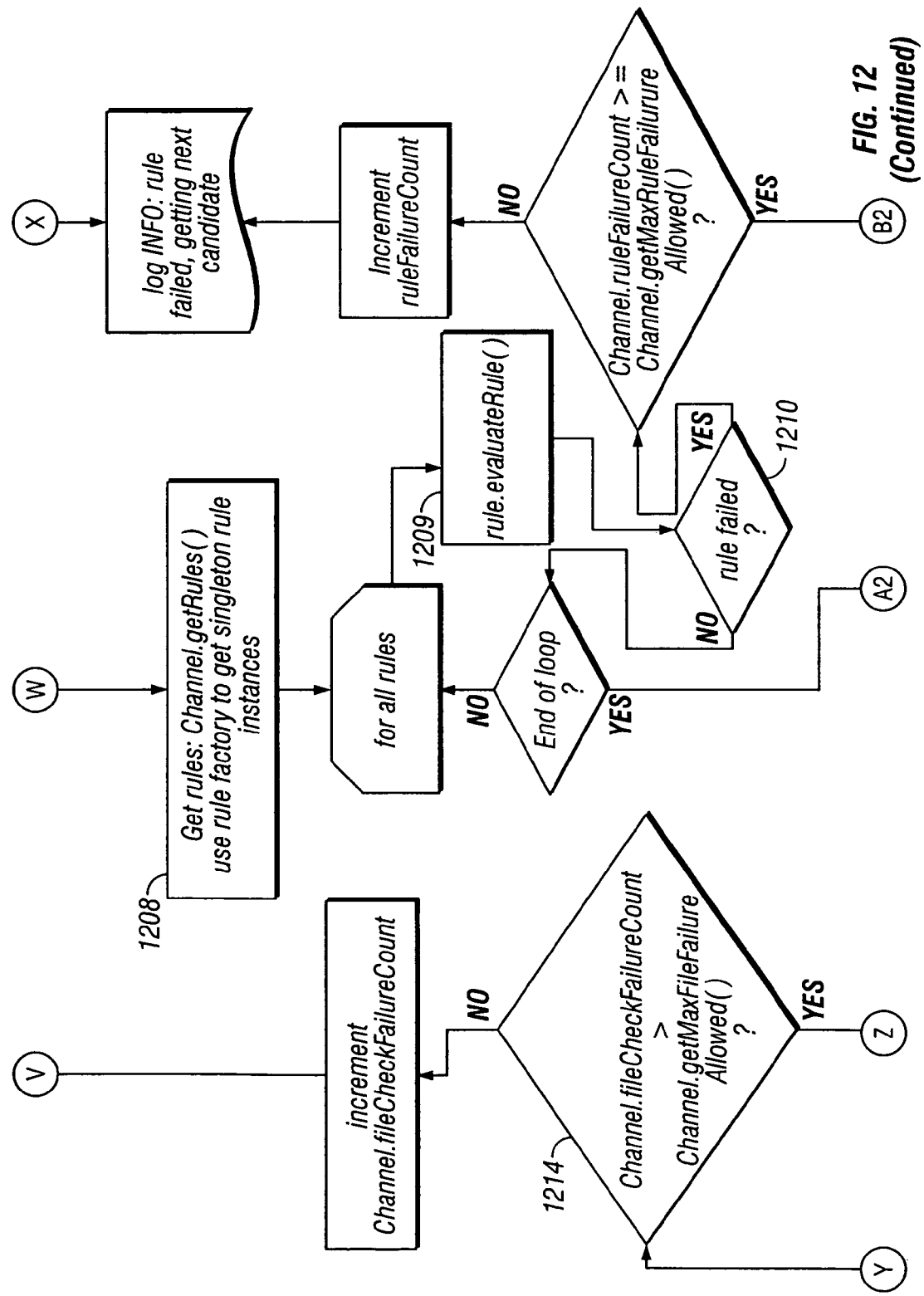
Figure 12:
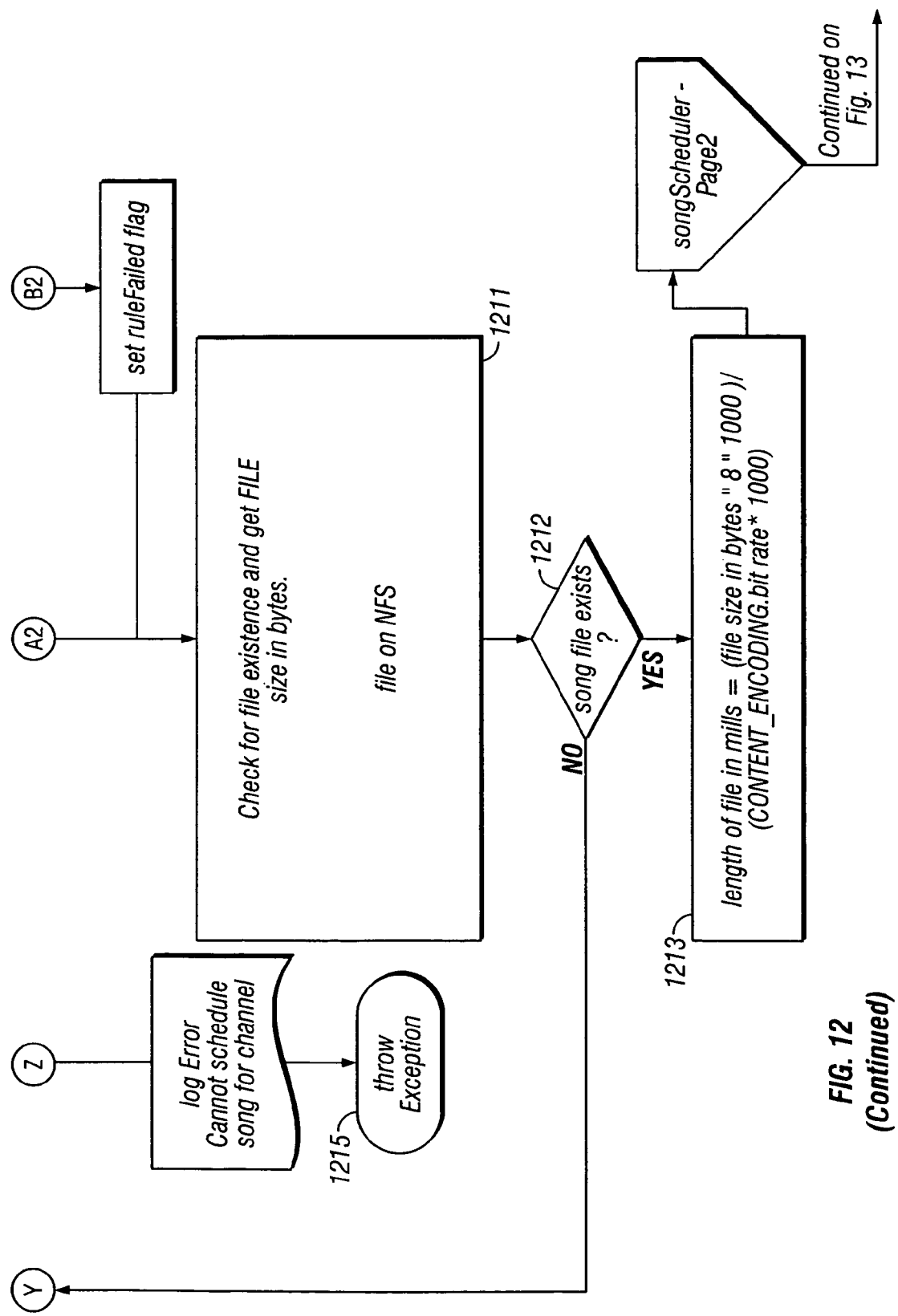
Figure 13:
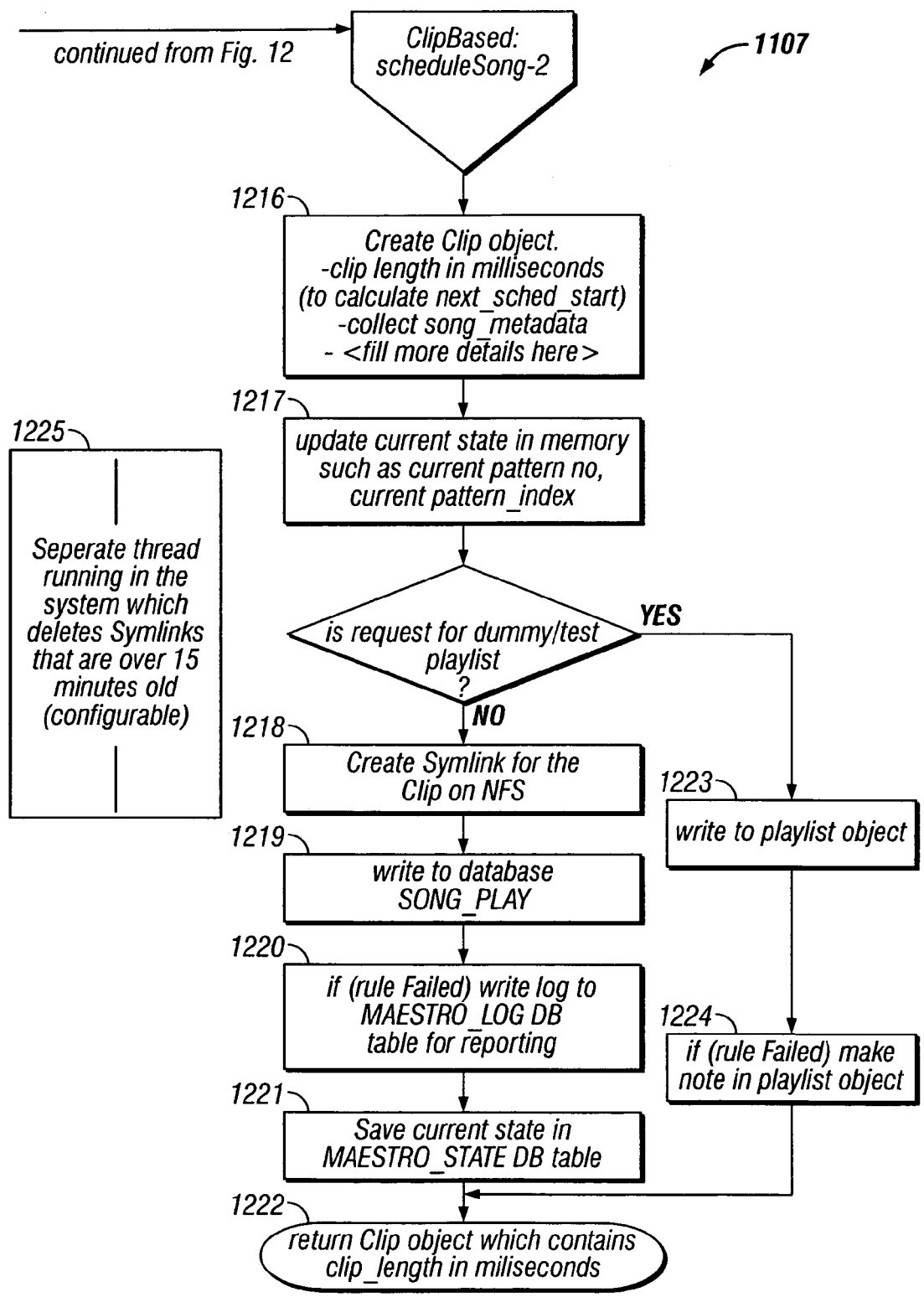

FIGS. 11-13 provide flow diagrams of song scheduling logic for clip-based channels. Turning now to FIG. 11, the process of scheduling a song is approximately analogous to that shown in FIG. 8 for stream based channels. However, for clip-based channels, ad scheduling is performed by a separate work manager, and thus the process includes none of the steps relating to scheduling of ads. The process of scheduling for clip-based channels is as follows:

get channel-related data from database 1101:
list of sequences;
current sequence;
current index within sequence;
ad interval;
rules to be applied; and
daily reset time.
Create random number generator seeded with current time: data is made available in channel object;
get size of playlist to be maintained (buffer size) from property file or database 1102;
determine scheduled start of next song 1103;
if next start exceeds the buffer size, return 1104; if not iterations less than a preset number? (e.g. 500) 1105,
is the next scheduled start after the daily reset time? 1106. If not;
Schedule song 1107.

While the current embodiment of the invention employs separate threads for scheduling songs and ads for clip-based channels, an alternate embodiment of the invention uses a single thread for both songs and ads, as previously described for stream-based channels. In such embodiment, the logic is substantially identical to that shown in FIG. 8 for stream-based channels.

FIG. 12 provides a flow diagram of step 1107 from FIG. 11, 'schedule song':

get current rotation code for the channel 1201;
is a list of song ID's for the channel cached 1202?
If 'no,' get list of song ID's for the current code 1203 or 1204, and store to channel cache 1205;
get list of song ID's from channel cache 1206;
randomly select a song from list 1207;
get an instance of the rules for the channel 1208;
evaluate each rule iteratively 1209;
if the song fails the rule 1210, does the failure exceed a configurable maximum number of failures? If so, select another song at random 1207. If not, check to see if a file exists for that song ID 1211.
If the file exists 1212, determine the file length 1213. If the file does not exist, check to see if the file check failure exceeds a configurable maximum 1214. If not, select another song 1207. If it does, throw exception 1215. The flow diagram for step 1107 continues in FIG. 13.
create a clip object, populate it with clip length in milliseconds and collect song metadata 1216;
update current state in memory such as current pattern number and current pattern index 1217;
if the request is for a dummy or test playlist, write the clip object to the playlist object 1223 and if the song failed any rules, make a note in the playlist object; 1224;
if an actual schedule is being updated, create a symlink (symbolic link) for the clip stored on the network file server (NFS) 1218;
write the symlink to the database table song_play 1219;
if the song failed any rules, write the log to the scheduler log 1220;
Save the current state in the database in scheduler_state table 1221; and
Return a clip object that contains clip length in milliseconds 1222.

Additionally, a separate thread 1225 runs that deletes symlinks exceed a configurable age, fifteen minutes for example. Thus the application logic for stream-based and clip-based channels is similar, except that in the clip-based scheduler, logic is included that creates a symbolic links to the actual clip.

Ad Scheduler

Figure 14:
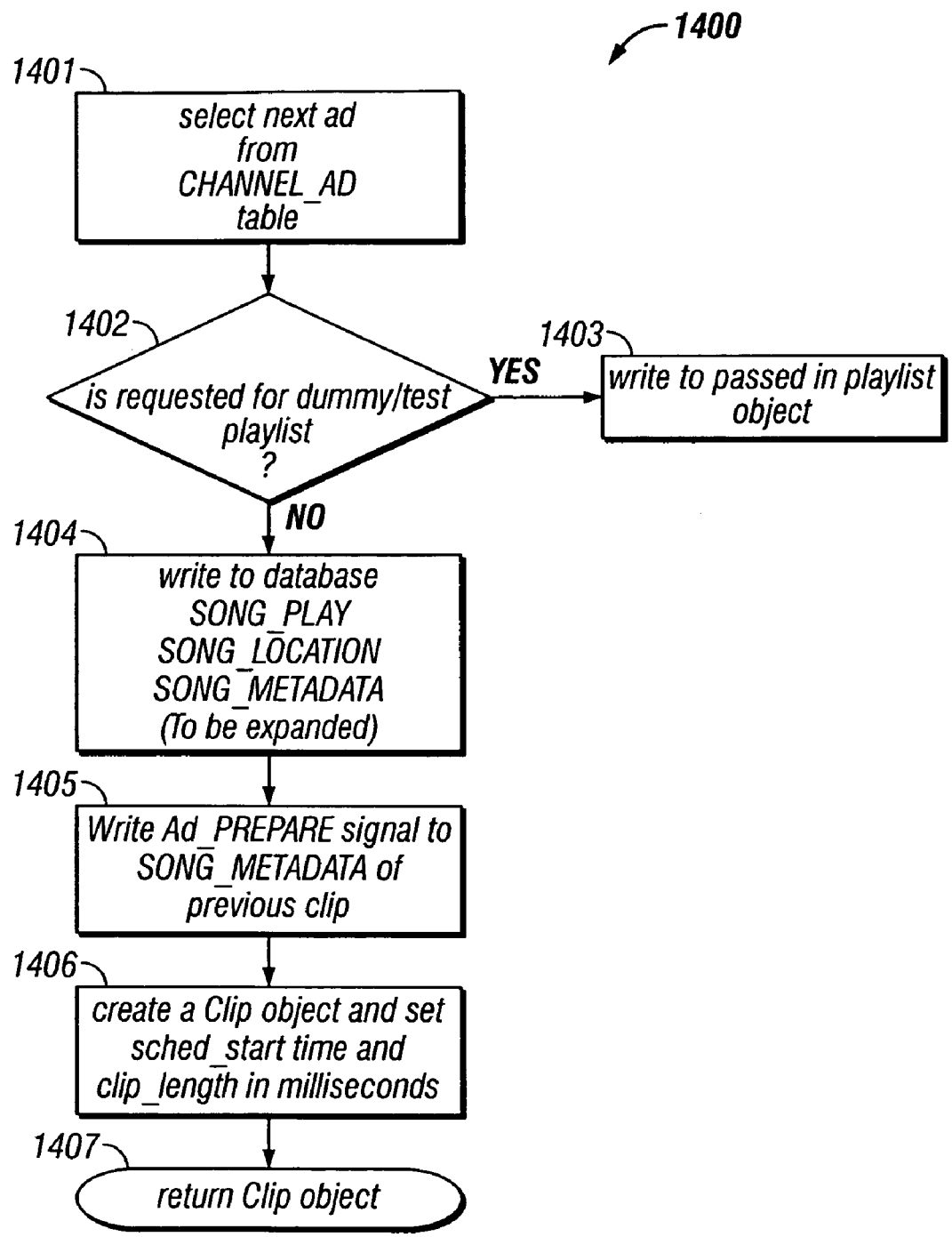
FIG. 14 provides a flow diagram of a first process for scheduling ads in a multimedia broadcast from the scheduler of FIG. 2 according to the invention.

FIG. 14 shows a flow diagram of a process for scheduling ads 1400 that originate from a third party advertising provider.

select next ad from channel_ad table 1401;
is request for a test playlist 1402. If yes, write to a passed in playlist object 1403. If no, write to database tables song_play, song_location, song_metada and song_metadata 1404;
write an ad_prepare signal to song_metadata of the previous clip 1405;
create a clip object for the ad, set schedule_startTime and clip_length in milliseconds 1406; and
return the clip object.

Figure 15:
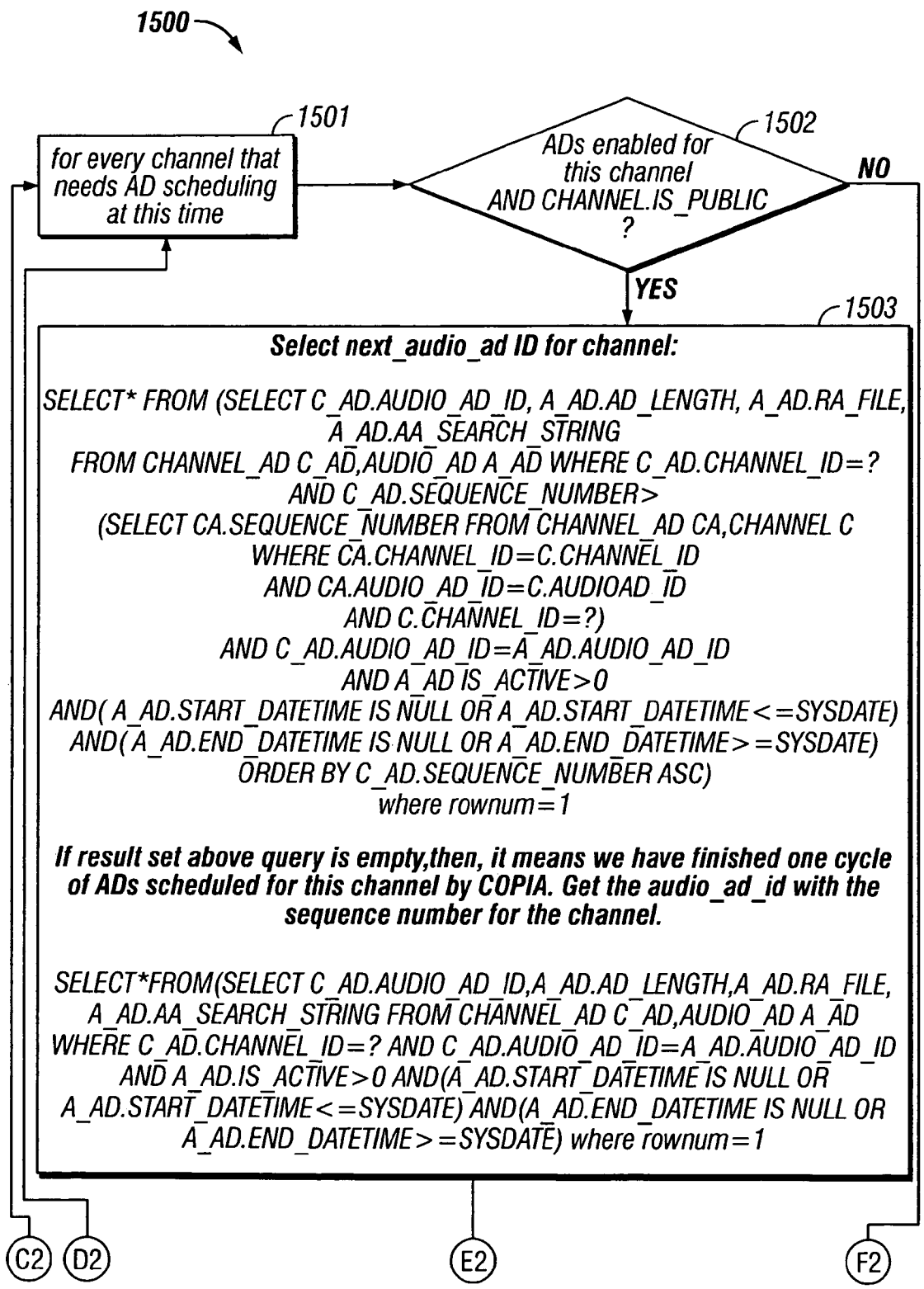
FIG. 15 provides a flow diagram of a second process for scheduling ads in a multimedia broadcast from the scheduler of FIG. 2 according to the invention.
Figure 15:
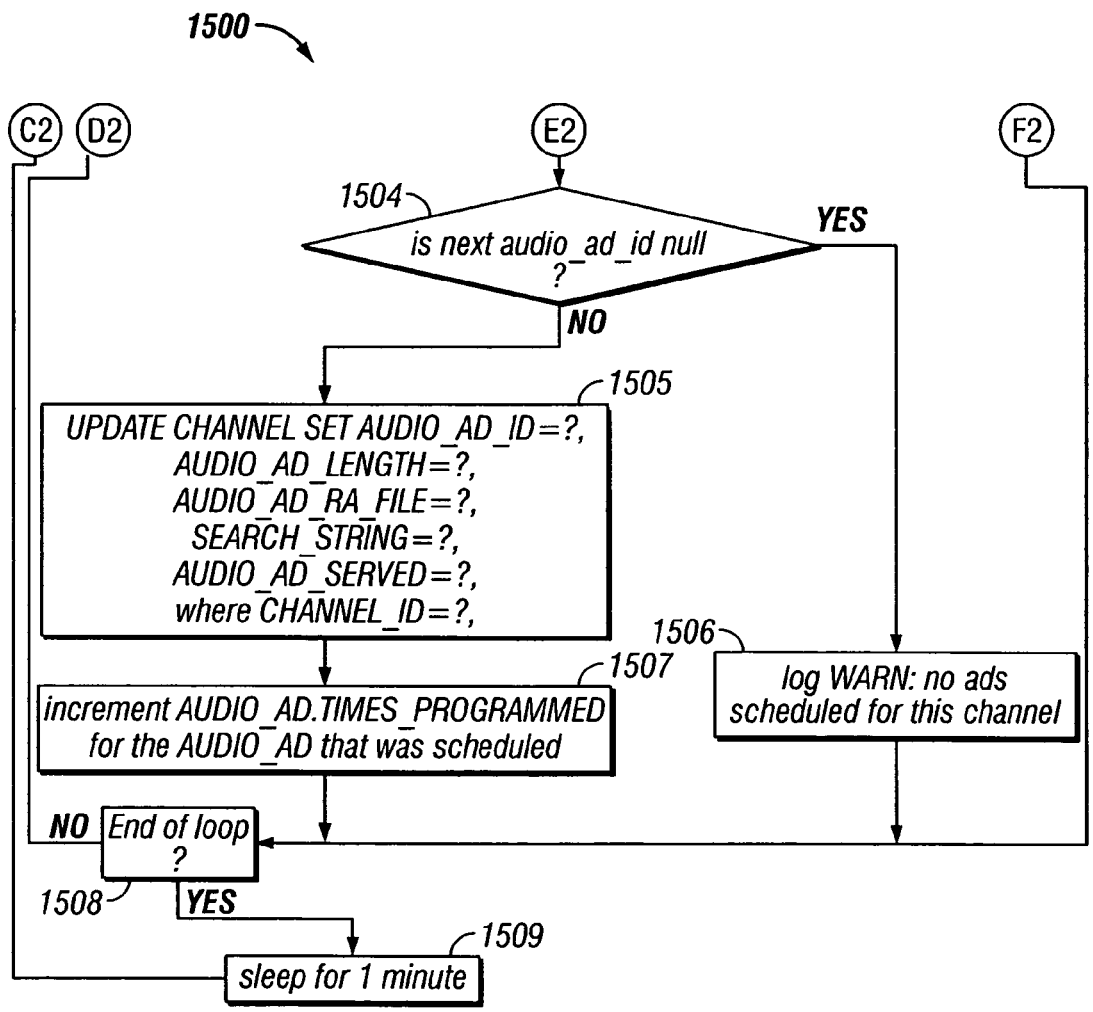

FIG. 15 shows a flow diagram of a process for scheduling ads 1500 that employs an in-house tool to schedule advertisements by a music director for a channel by associating a numerical identifier that represents a bucket of with a channel.

for each channel requiring ad scheduling 1501, are ads enabled for the channel, and is the channel public 1502, if no go to end of loop 1508. If yes;

get the next audio ad ID for the channel. If the resulting search set in empty, it means the current cycle of ad's for the channel has finished. Get the audio ad ID having the lowest sequence number for the channel 1503;

if no audio_ad_id is found, 1504,1506, it means that no ads are scheduled for the channel; go to end of loop 1508. If an audio ad ID is found 1504, 1505, update database for the channel increment the number of times the ad has been programmed 1507;

go to end of loop 1508;

sleep for one minute 1509; and repeat loop 1501.

Rules

Rules Factory

Figure 16:
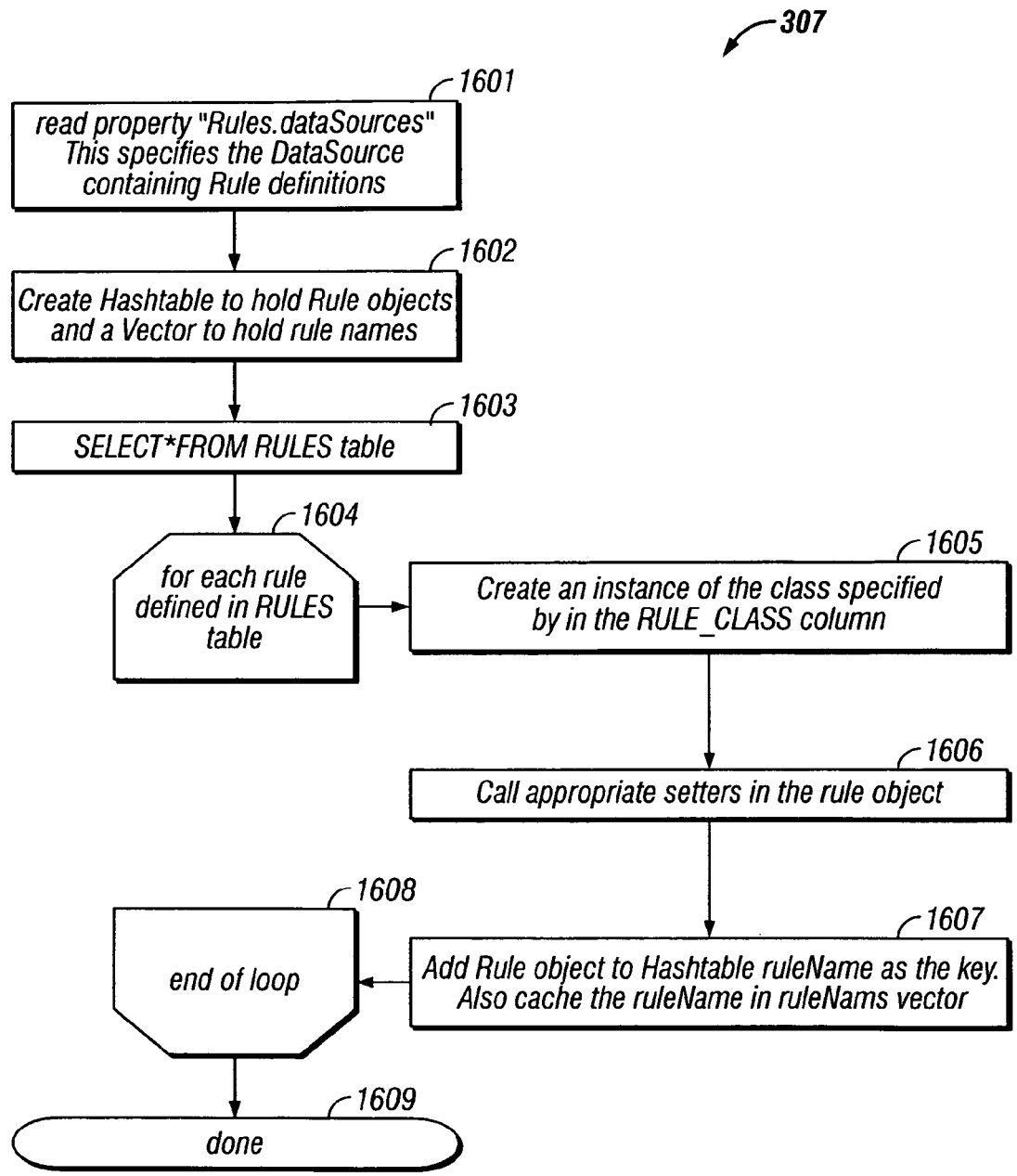
FIG. 16 provides a flow diagram of a process for initializing a rules factory object from the application thread of FIG. 3 according to the invention.

The Rules Factory 210 maintains a cache of rule objects 209 in memory. There is one instance of a rule object per row in the RULES database table, described in greater detail below. Rule objects implement a Rules interface. FIG. 16 shows the Rules Factory 307 initialization process flow:

read property 'rules.dataSources' that specifies the dataSource containing the rule definitions 1601;

create a hashTable to hold the rule objects and a vector to hold the rule names 1602;

select * from the RULES table;

for each rule defined in the RULES table 1604;

create an instance of the class specified in the RULE_CLASS column 1605;

call appropriate setters in the rule object 1606;

add the rule object to the hashTable, using the ruleName as the key.

Also cache the ruleName in the ruleNames vector 1607;

end of loop 1608; and done 1609.

Adding New Rules

New Rules to be created and added to the system "on the fly", according to the following procedure:

Write a class that implements the Rules interface. After testing it, put the compiled class file in a directory that is in scheduler application's CLASSPATH. For example, if the fully qualified class name for a new rule is com-.myrules.NewRule, then the class can be stored in a scheduler/lib directory as follows: scheduler/lib/com/myrules/NewRule.class. In the case of a developer, the new rule should be created under scheduler/src/com/*/radio/rules/directory as part of the .scheduler.rules package. The compiled class file should be packaged as part of scheduler.jar;

Insert a row in RULES table for the rule just created;

Insert appropriate rows in RULE_ATTRIBUTES table for attributes that the rule uses. These attributes can be assigned values per channel via tools;

Assign the rule to channels by creating rows in CHANNEL_RULES table. This should be possible using GUI TOOLS; and Insert rows in CHANNEL_RULE_ATTRIBUTES table and assign values to the rule attributes for each channel. This should be possible using GUI TOOLS.

The next round of scheduling performed by the scheduler will enforce the rule for all channels that have been associated with the new rule.

Application Data

Database Tables and Their Relationships

Figure 17:
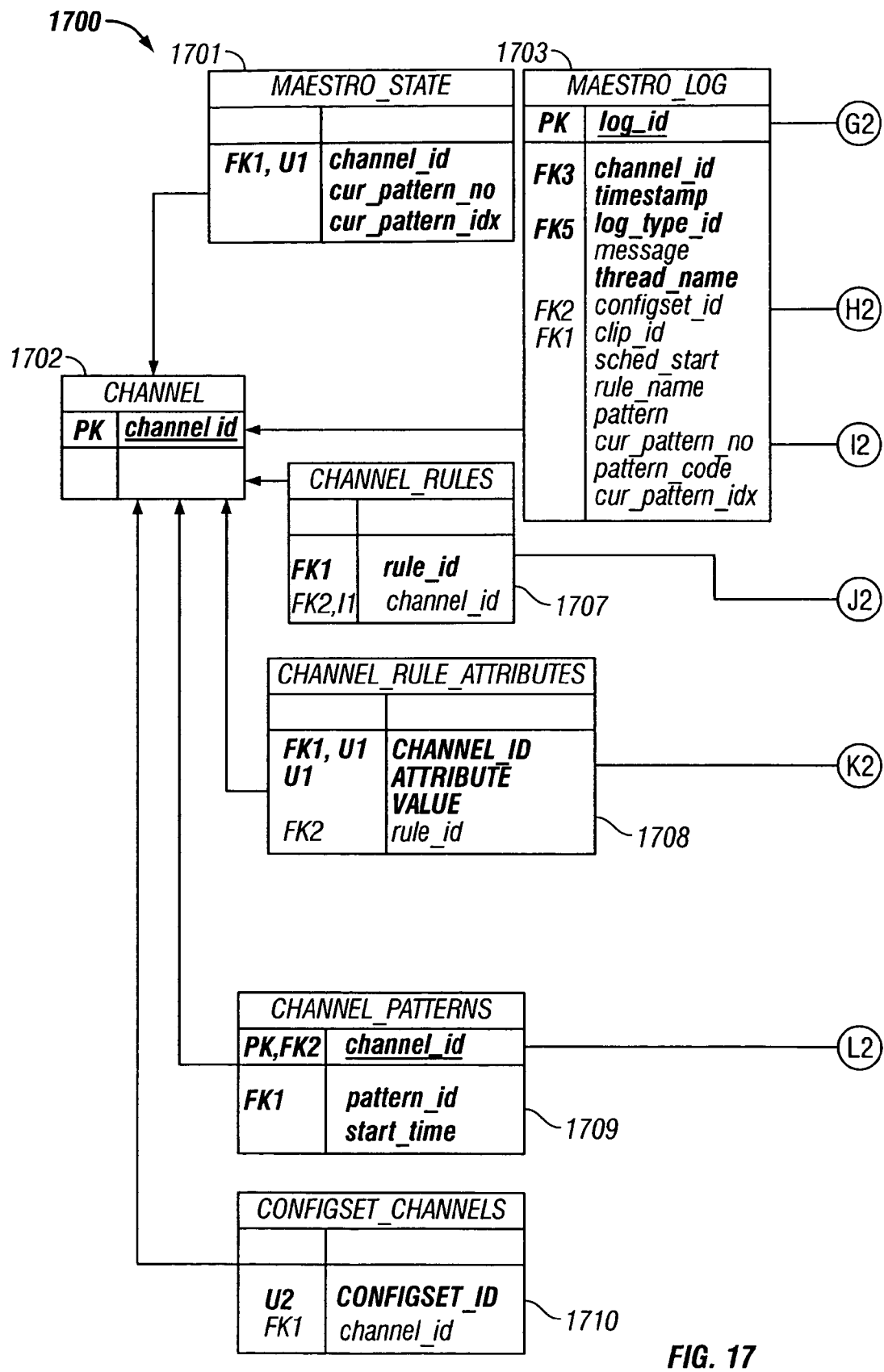
FIG. 17 provides an entity relationship diagram for a database from the scheduler of FIG. 2 according to the invention.
Figure 17:
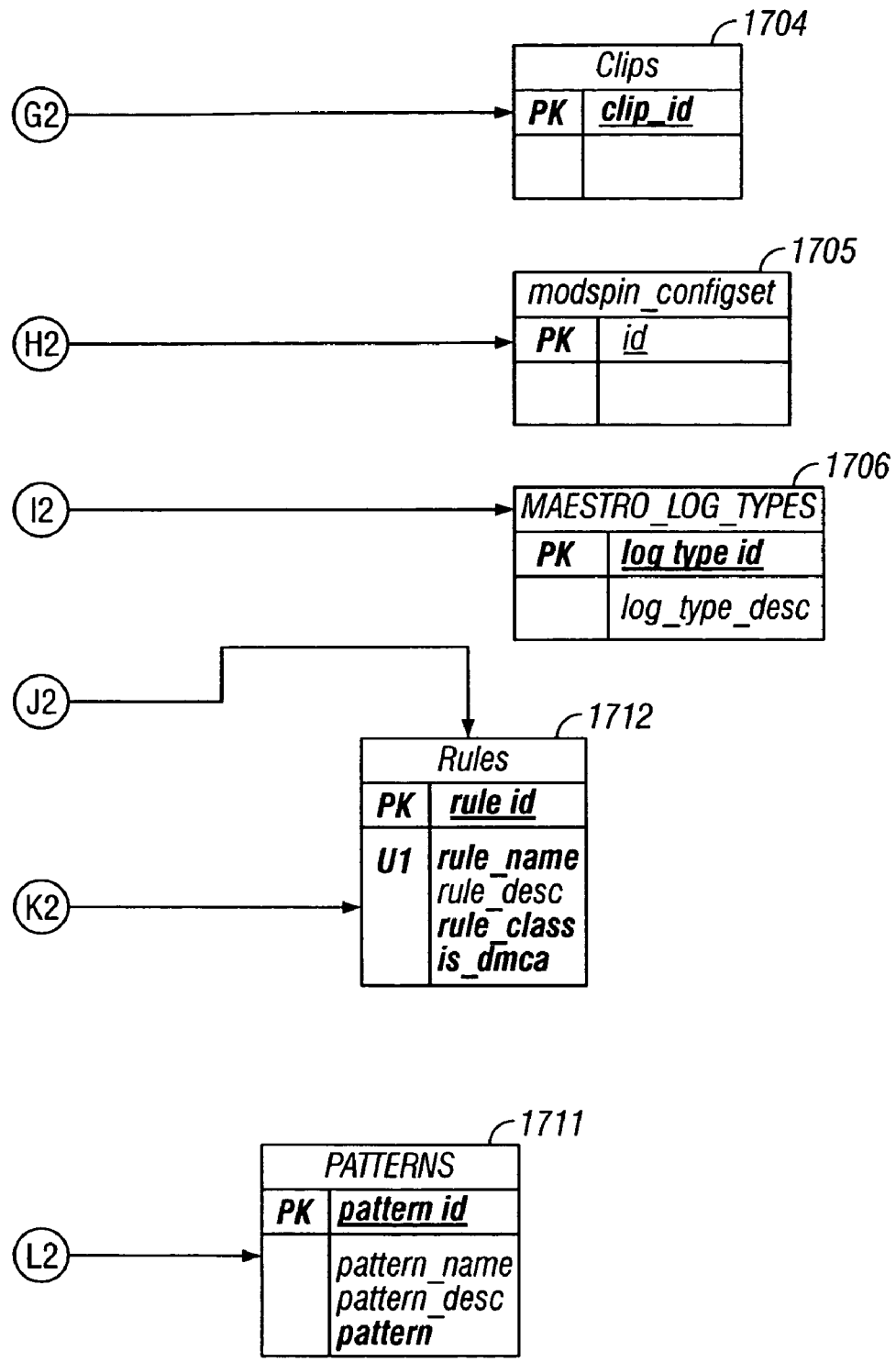

FIG. 17 illustrates the data model for an exemplary embodiment of the multimedia scheduler. The data model herein is provided only for descriptive purposes and is not intended to be limiting. Other data models are suitable for accomplishing the purposes and objects of the invention. In creating the database, the following tables are created:

SCHEDULER_STATE—current state saved persistently 1701;

SCHEDULER_LOG—exception log for recording events such as rule violations 1703;

SCHEDULER_LOG_TYPES—enumeration of log message types 1706;

CHANNEL_PATTERNS—associate patterns to a channel 1709;

PATTERNS—Rotation patterns created by the DJs 1711;

RULES—Rule definitions 1712;

CHANNEL_RULES—associate rules to a channel 1707;

CHANNEL_RULE_ATTRIBUTES—to define channel specific rule values 1708; and

CONFIGSET_CHANNELS—specifies the configset that a channel belongs to. A channel can belong to only one configset—this is enforced using a database constraint 1710.

Three existing tables listed below have a new column called ROTATION_CODE (VARCHAR2(40)) to hold the rotation code for the clip.

SONG_PLAY

CHANNEL_PLAYLIST

PLAYLIST_SONG

In addition to the new tables shown in the diagram, Scheduler also accesses the following DB tables:

CHANNEL

CHANNEL_AD

CHANNEL_PLAYLISTS

PLAYLIST

PLAYLIST_CLIPS

CLIPS

ENCODING_FORMATS

SONG_LOCATION

SONG_METADATA

MODSPIN_CONFIGSET

MODSPIN_CONFIGDATA

Properties File

The Application.properties file controls the behavior of the scheduler and can also specify parameters to tune the application.

The table below shows the Application.properties file and a description of each property.

TABLE 11

```
##############################################
# Properties governing the new Song Scheduler

# All time values are in seconds

##############################################
# ---- Properties for the WorkManager: start ---- #
##############################################
# WorkerManager properties

# WorkManager.instances =
#            names of work managers in the system
#            There are no defaults.
#            Application startup will abort if none are specified.
#            ! This property is read at Application init time only.
# WorkManager.<name>.workerThreadPool.initialSize =
#            Initial number of worker threads for this WorkManager
#            Default if not specified, or specified a number less than 1 or non-numeric value.
#            ! This property is read at Application init time only.
# WorkManager.<name>.workCreatorFactories =
#            Factory classes that create WorkCreator objects for this WorkManager
#            There is one WorkProducer thread wrapping each WorkCreator object
#            ! This property is read at Application init time only.
# WorkManager.<name>.monitoringEnabled =
#            Whether or not a MonitoringThread is created for this WorkManager
#            ! This property is read at Application init time only.
# WorkManager.<name>.monitoringInterval =
#            If Monitoring is enabled, then interval, in seconds, that the
#            Monitoring thread should wake
#            * This property is read every PropertyManager.refreshInterval seconds.
# WorkManager.<name>.workerThreadPool.autoGrow =
#            If Monitoring enabled, whether it should attempt to dynamically
#            increase the number of worker threads
#            * This property is read every PropertyManager.refreshInterval seconds.
#            [Not implemented]
# WorkManager.<name>.workerThreadPool.workQueueThreshold =
#            If Monitoring is enabled: If the work queue size exceeds this
#            threshold, and if autoGrow is true, then the MonitoringThread
#            will increase the worker thread pool automatically
#            This is to prevent backlogs.
#            * This property is read every PropertyManager.refreshInterval seconds.
#            [Not implemented]
# WorkManager.<name>.workerThreadPool.autoShrink =
#            If Monitoring enabled: If set to true, MonitoringThread will
#            shrink the thread pool to initialPoolSize if threads are idle
#            * This property is read every PropertyManager.refreshInterval seconds.
#            [Not implemented]

##############################################
# WorkManager.instances = SongSchedulerWM, GeneralWM
WorkManager.instances = SongSchedulerWM, AdSchedulerWM
# WorkManager.instances = SongSchedulerWM
WorkManager.SongSchedulerWM.workerThreadPool.initialSize = 50
WorkManager.SongSchedulerWM.workCreatorFactories         =
com.aol.radio.scheduler.scheduler.SongWorkCreatorFactory
WorkManager.SongSchedulerWM.monitoringEnabled = true
WorkManager.SongSchedulerWM.monitoringInterval = 60
WorkManager.SongSchedulerWM.workerThreadPool.autoGrow = true
WorkManager.SongSchedulerWM.workQueueThreshold = 100
WorkManager.SongSchedulerWM.workerThreadPool.autoShrink = true
# Work Manager for scheduling ADs
WorkManagerAdSchedulerWM.workerThreadPool.initialSize = 10
WorkManager.AdSchedulerWM.workCreatorFactories           =
com.aol.radio.scheduler.scheduler.AdWorkCreatorFactory
WorkManager.AdSchedulerWM.monitoringEnabled = true
WorkManager.AdSchedulerWM.monitoringInterval = 60
# ---- Properties for the WorkManager: end ---- #
##############################################
# Scheduler properties

#   These properties are read by the WorkCreatorFactories specified above for every
WorkManager
# Each WorkCreatorFactory gets a reference to the WorkManager it belongs to and
# hence knows which set of properties to look for.
#   For example the SongWorkCreatorFactory is specified for the SongSchedulerWM
WorkManager above;
# The SongWorkCreatorFactory will thus read properties that start with "SongSchedulerWM."
below.
# Some of the properties are also read by the Song/Ad schedulers themselves.

```

TABLE 11-continued

```
# <WorkManagerName>.configSets =
#          This is a list of configSets that should be handled by this WorkManager.
#          The WorkCreatorFactory will do the necessary initialization for each configSet.
#          ! This property is read at Application init time only.
# <WorkManagerName>.configSet.(default | <configSetID>).class =
#          Specifies the fully qualified class name of the Scheduler that should be used
#          for scheduling songs and/or ads for channels in this configset. The default
#          property is used unless it is overridden by a specific property.
#          An error is logged in the log file if the class is not found at runtime and
#          Scheduling for this configset will not occur. These errors will be reported
#          during Scheduler startup time.
#          ! This property is read at Application init time only.
# <WorkManagerName>.configSet.(default | (configSetID>).scheduleLength = 28800
#          Specifies of the length in seconds of the schedule that needs to be maintained.
#          * This property is read every PropertyManager.refreshInterval seconds.
#<WorkManagerName>.configSet.(default | (configSetID>).waitInterval = 1800
#          Time interval, in seconds, the scheduler sleeps. After this interval, the scheduler
#          Will wake up and schedule enough songs to maintain a schedule that is
"scheduleLength"
#          seconds in length.
#          * This property is read every PropertyManager.refreshInterval seconds.
# <WorkManagerName>.configSet.(default | (configSetID>).dataSource = MANGESH_DEVDB1
#          The dataSource where channels for this configSet are located.
#          Although this property value can be changed at runtime, I do not see a
#          reason why you would want to do that. Please consider your reasons carefully
#          before changing this value at runtime.
#          * This property is read every PropertyManager.refreshInterval seconds.

# The AdSchedulerWM is used only for scheduling COPIA based ADs. Specify configSets of
# channels that need COPIA based ADs for the AdSchedulerWM.configSets property.

#    The SongSchedulerWM is used for schduling songs (both clip-based and stream-based
channels)
# The SongSchedulerWM.configSet.<configSetID>.class property should be set to
#          "com.aol.radio.scheduler.scheduler.StreamBasedSongScheduler"
# for configSets containing Stream-based channels, and
#          "com.aol.radio.scheduler.scheduler.ClipBasedSongScheduler"
# for configSets containing Clip-based channels.
##########################################
# Song Scheduler ###################
# SongSchedulerWM.configSets = 1,3,5,7,201,203,205,207,209,301,303
# SongSchedulerWM.configSets = 901, 902, 905, 906
# SongSchedulerWM.configSets = 901, 906
SongSchedulerWM.configSets = 902, 905
SongSchedulerWM.configSet.default.class         =
com.aol.radio.scheduler.scheduler.BaseSongScheduler
SongSchedulerWM.configSet.default.scheduleLength = 28800
SongSchedulerWM.configSet.default.waitInterval = 1800
SongSchedulerWM.configSet.default.dataSource = MANGESH_DEVDB1
SongSchedulerWM.configSet.902.class             =
com.aol.radio.scheduler.scheduler.StreamBasedSongScheduler
SongSchedulerWM.configSet.905.class             =
com.aol.radio.scheduler.scheduler.StreamBasedSongScheduler
# Above default properties can be overridden for each configset as shown below
SongSchedulerWM.configSet.1.class = com.aol.radio.scheduler.scheduler.BaseSongScheduler
SongSchedulerWM.configSet.1.scheduleLength = 25200
SongSchedulerWM.configSet.1.waitInterval = 1800
SongSchedulerWM.configSet.1.LdataSource = MANGESH_DEVDB1
# AD Scheduler #####################
AdSchedulerWM.configSets = 901, 906
AdSchedulerWM.configSet.default.class           =
com.aol.radio.scheduler.scheduler.CopiaBasedAdScheduler
AdSchedulerWM.configSet.default.waitInterval = 60
AdSchedulerWM.configSet.default.dataSource = MANGESH_DEVDB1
# -------------------------------------- #
# Application wide properties ###################

# These are some of the properties that are used in the Scheduler Application

# Syste.gc =
#          Interval, in seconds, after which to call System.gc( ) in Java
#          * This property is read every PropertyManager.refreshInterval seconds.
# Application.defaultDataSource =
#          dataSource used while generating "sample playlists" for the tools
#          An exception will be reported if this property is not set correctly
#          and the sample playlist will be get generated.
#          * This property is read every PropertyManager.refreshInterval seconds.'
```

TABLE 11-continued

```
# Application.port =
#         port on which Application receives requests.
#         "stop", "abort", "ping", "status", "channel_schedule" are some examples
#         that can be sent to this port. The requests themselves are in XML format.
#         Please see the design document for the format of each request.
#         ! This property is read at Application init time only.
# CONTENT_HTTP_BASE =
#         The Webserver url which hosts the content on the EMC disk arrays
#         (http://uvoxhttp.streamops.aol.com)
#         * This property is read every PropertyManager.refreshInterval seconds.
# CONTENT_HTTP_USERNAME =
#         Username for above website (uvox)
#         * This property is read every PropertyManager.refreshInterval seconds.
# CONTENT_HTTP_PASSWORD =
#         Password for above website (password)
#         * This property is read every PropertyManager.refreshInterval seconds.
# ALBUM_ART_BASE_URL =
#         URL where album art is located (http://broadband-
albumart.streamops.aol.com/scan)
#         * This property is read every PropertyManager.refreshInterval seconds.
# ALBUM_ART_SUFFIX =
#         suffix for album art filenames (_75_75_72_front.jpg)
#         * This property is read every PropertyManager.refreshInterval seconds.
############################################
System.gcInterval = 300
Application.defaultDataSource = MANGESH_DEVDB1
Application.port = 8087
CONTENT_HTTP_BASE = http://uvoxhttp.streamops.aol.com
CONTENT_HTTP_USERNAME = uvox
CONTENT_HTTP_PASSWORD = password
ALBUM_ART_BASE_URL = http://broadband-albumart.streamops.aol.com/scan
ALBUM_ART_SUFFIX = _75_75_72_front.jpg
# http url for AD store
AD_HTTP_BASE = http://blahblah
# ------------------------------------- #
############################################
# Properties for Rules module

# Rules.dataSource =
#         DataSource which hosts Rule related tables
#         Specifically, the RULES table is read from this
#         dataSource and one rule instance for each row
#         is created by the RulesFactory.
#         The actual rule values for each channel are picked
#         up from the dataSource configured for that channels
#         configSet in the Scheduler section above.
#         This gives us the added flexibility of scheduling
#         channels located in different databases using a single
#         instance of Scheduler.
############################################
Rules.dataSource = MANGESH_DEVDB1
############################################
# Properties for PropertyManager

# PropertyManager.refreshInterval =
#         Property file refresh interval in seconds
#         Updates to this proerty file will be picked
#         up by Scheduler after this interval.
# PropertyManager.dataSource =
#         DataSource which hosts table containing properties
#         [Not used]
# PropertyManager.dbTableName =
#         Table in above dataSource that contains additional
#         Scheduler properties.
#         The table should have a column called CONFIG_KEY
#         which contains the property name, and a column called
#         CONFIG_VALUE which holds the property value.
#         [Not used]
############################################
PropertyManager.refreshInterval = 3600
# PropertyManager.dataSource = MANGESH_DEVDB1
# PropertyManager.dbTableName = MODSPIN_CONFIGSET
############################################
# Database connection pool

# DB.dataSources =
#         names of data sources

```

TABLE 11-continued

```
# DB.dataSource.<dsName>.URL =
#           JDBC URL of the type
#           jdbc:oracle:thin:@db-perpetua.spinner.com:1521:SPIN9
# DB.dataSource.<dsName>.username = DB user name
# DB.dataSource.<dsName>.password = DB password
# DB.dataSource.<dsName>.initialPoolSize = initial size of connection pool
# DB.dataSource.<dsName>.maxPoolSize =
#           max size of connection pool. This is a hard limit
#           This size should roughly equal the number of
#              ___concurrent___threads expected to access this datasource
# DB.dataSource.<dsName>.incrementBy =
#           If all connections in the pool are used up, increase pool by
#           this number
#           [Not implemented]
# DB.dataSource.<dsName>.autoShrink =
#           [Not implemented]
##########################################
DB.dataSources = MANGESH_DEVDB1
DB.dataSource.MANGESH_DEVDB1.URL        =        jdbc:oracle:thin:@db-
perpetua.spinner.com:1521:DEVDB1
DB.dataSource.MANGESH_DEVDB1.username = MANGESH2
DB.dataSource.MANGESH_DEVDB1.password = MANGESH2
DB.dataSource.MANGESH_DEVDB1.initialPoolSize = 20
DB.dataSource.MANGESH_DEVDB1.maxPoolSize = 50
DB.dataSource.MANGESH_DEVDB1.incrementBy = 5
DB.dataSource.MANGESH_DEVDB1.autoShrink = true
DB.dataSource.GODWIN.URL = jdbc:oracle:thin:@db-perpetua.spinner.com:1521:DEVDB1
DB.dataSource.GODWIN.username = GODWIN
DB.dataSource.GODWIN.password = GODWIN
DB.dataSource.GODWIN.initialPoolSize = 20
DB.dataSource.GODWIN.maxPoolSize = 50
DB.dataSource.GODWIN.incrementBy = 5
DB.dataSource.GODWIN.autoShrink = true
DB.dataSource.THEDJ.URL = jdbc:oracle:thin:@db-perpetua.spinner.com:1521:SPIN9
DB.dataSource.THEDJ.username = THEDJ
DB.dataSource.THEDJ.password = THEDJ
DB.dataSource.THEDJ.initialPoolSize = 20
DB.dataSource.THEDJ.maxPoolSize = 50
DB.dataSource.THEDJ.incrementBy = 5
DB.dataSource.THEDJ.autoShrink = true
---------------- End of File ----------------- ##
```

Log4j.Properties

The log4j.properties file is used to configure logging parameters. The log4j documentation provides more information about various configuration options.

Below is a sample log4j.properties file

Syslog, Scheduler.Log and Scheduler_Log Table

Scheduler.Log Logfile

Error, Warning, Info and Debug log messages are be printed to a logfile. The name of the logfile is specified in

TABLE 12

```
# base dir
BASE_DIR=/devel/home/serveng/gomangesh/dev/scheduler
LOG_DIR=${BASE_DIR}/logs
# Set root logger
log4j.rootLogger=DEBUG, LOGFILE
Appenders ---------------------
# A1 is set to be a ConsoleAppender.
log4j.appender.CONSOLE=org.apache.log4j.ConsoleAppender
# A1 uses PatternLayout.
log4j.appender.CONSOLE.layout=org.apache.log4j.PatternLayout
log4j.appender.CONSOLE.layout.ConversionPattern=%-4r [%t] %-5p %c %x – %m%n
# Parameters for the main logfile
log4j.appender.LOGFILE=org.apache.log4j.SchedulerRollingFileAppender
log4j.appender.LOGFILE.File=${LOG_DIR}/scheduler.log
#   roll files once a day
log4j.appender.LOGFILE.DatePartern='.'yyyy-MM-dd
log4j.appender.LOGFILE.layout=org.apache.log4j.PatternLayout
log4j.appender.LOGFILE.layout.ConversionPattern=%-4r [%t] %-5p %c{2} %x – %m%n
``` log4j.properties, as shown above. It is expected that this logfile will be under scheduler/logs directory and called scheduler.log.

Scheduler log messages are prioritized into four levels: ERROR, WARN, INFO, DEBUG. Lower priority messages can be turned off by configuring log4j.properties file appropriately, as described above.

Error:

Error messages report problems that need to be acted upon. This could be data integrity problems that affect the scheduling of a channel and have to be reported to the content team. For example, when a rotation code used in the rotation clock for a channel has no clips in the database, the rotation code will be skipped, pointing to a serious programming error that needs to be corrected by the DJ. Alternatively, it is a system-related problem that needs to be addressed by the system operator.

Warn:

Warning messages report messages that should be noted by the system operator, but they have a lesser urgency than error messages. For example, if the physical file for a clip is not found, then the clip is not scheduled for a channel. This is a less critical problem since another clip can be played in its place. Nevertheless, it points to a problem that should be corrected. There could also be system related warnings that the system operator needs to act upon, such as memory usage coming close to the total memory allocated for the JVM (JAVA virtual machine).

Info:

Info messages are trace messages that help to understand the process flow in scheduler and convey an idea of what it is currently doing.

Periodic status messages such as current memory usage, loading of property files, Rule evaluation results are informational messages. Certain messages such as "Property not found" (which may look like a warning, but is not) are also informational messages when a default property value is found instead of a specific property.

Debug:

This is useful for diagnosing problems and should be not turned ON in production unless necessary for debugging problems.

In production, the ERROR level should always be turned ON. Ops may choose to keep WARN level turned on as well if they so wish. INFO level can be turned ON to help in understanding what the scheduler is doing and to get a better feel of the process flow. DEBUG level should be turned ON only while diagnosing problems.

Format of a Log Message

The format of a log message is as follows:

<timestamp> <priority> [<thread name>] <classname> [<optional_data>]-<message>

Where <optional_data> is some data, (such as configSetID or channelID, or clipID, etc), that is pertinent to the message.

Typically, the following optional_data is used while logging messages:

ConfigSetID:channelID
ClipID
RuleID
RequestName of a request sent over Scheduler's communication socket.

Log messages contain all, none, or a combination of this optional data.

An example is provided below:

2002-12-06 00:25:11,139 INFO[SongSchedulerWM:Worker_48] scheduler.BaseSongScheduler [902:4508]-Rule passed. SongID=450828; ruleName=DMCMrtistRule Where:

2002-12-06 00:25:11,139: is the timestamp with millisecond precision

INFO: the priority level of this message

SongSchedulerWM:Worker_48: Name of thread that logged this message. Threads are named based on the functions they perform. This makes it easy to identify the functional area that the log originates from by looking at the thread name. In this example, the thread name reveals that this message came from the 48$^{th}$ worker thread in the SongScheduling WorkManager's Worker thread pool.

scheduler.BaseSongScheduler: Class name that includes the last element of its package name 902:4508: In this case, 902 is the configSetID and 4508 is the channeled. The rest of the log message is the text of the log message printed by the scheduler application.

The tables below lists the error and warning log messages printed by the scheduler (INFO and DEBUG messages are not listed here):

TABLE 13

Error messages

| | |
|---|---|
| Message | Class (<classname>) not found Exception. <stack trace> |
| Cause | CLASSPATH is wrong |
| Remedy | Correct the classpath in scheduler/bin/start.sh |
| Message | Class (<classname>) Initialization Exception. <stack trace> |
| | Linkage Error for class <classname>. <stack trace> |
| | InstantiationException for class <classname>. <stack trace> |
| | IllegalAccessException for class <classname>. <stack trace> |
| | Error creating workObjects array. <stack trace> |
| | Rule could not be created: Class (<ruleClassname>) not found Exception. <stack trace> |
| | Rule could not be created: Class (<ruleClassname>) Initialization Exception. <stack trace> |
| | Rule could not be created: Linkage Error for class <ruleClassName>. <stack trace> |
| | Rule could not be created: InstantiationException for class <ruleClassName>. <stack trace> |
| | Rule could not be created: IllegalAccessException for class <ruleClassName>. <stack trace> |

TABLE 13-continued

Error messages

| | |
|---|---|
| | Rule could not be created: <ruleClassName>. |
| | <stack trace> |
| | Class has private constructor <classname>: <message> |
| | Security Exception <classname>: <message> |
| Cause | Either: |
| | CLASSPATH is wrong, or |
| | The installation is not proper (there are old files in the install), or |
| | There is a bug in scheduler |
| Remedy | Check if the installation is correct. Involve development if necessary. |
| Message | No Channels found for configset ID <configSetID>. Please check the configset ID and ensure there are channels associated with it. |
| Cause | Data error: The configset is the database is wrong, or the configset ID specified for the SongSchedulerWM.configSets or AdSchedulerWM.configSets property in the Application.properties file is wrong. |
| Remedy | Check the Application.properties file and check if there are public and non-live channels for this configset in the database. |
| Message | No Channels found for configset ID <configSetID>. Please check the configset ID and ensure there are channels associated with it. |
| Cause | Data error: The configset is the database is wrong, or the configset ID specified for the SongSchedulerWM.configSets or AdSchedulerWM.configSets property in the Application.properties file is wrong. |
| Remedy | Check the Application.properties file and check if there are public and non-live channels for this configset in the database. |
| Message | No ConfigSets defined <property name> |
| Cause | There were no configsets specified for the specified WorkManager |
| Remedy | Either specify some configsets, or do not specify this WorkManager in the WorkManager.instances property if it is not needed. |
| Message | No songs in playlist for rotationCode = <rotationCode>; channel = <channelID> |
| Cause | Scheduler had to skip the rotation code for the specified channel because there are no songs with this rotation code in the playlist for the channel |
| Remedy | Contact the MDs immediately and ask them to rectify the situation either by removing the rotation_code from the rotation clock for that channel or by ensuring that there are enough encoded songs in the channel's playlist with that rotation code. |
| Message | File failure count exhausted. Cannot schedule song for channel. Rotation code will be skipped: <channelID>; rotationCode = <rotationCode> |
| Cause | The physical file for the clips could not be found. |
| | This can happen when the file exists but an entry for the clip does not exist in the CLIP_ENCODINGS table, or when the file physically does not exist. |
| Remedy | Do a sanity check of the database and the EMC array to ensure that they are both in sync in terms for content. |
| Message | Exception writing Schedulable Clip to DB. Rotation code will be skipped.; |
| | channelID = <channelID>; |
| | clipID = <clipID>; |
| | rotationCode = <rotationCode>; |
| | serialNum = <SONG_PLAY.SERIAL_NUM> |
| Cause | A DB Exception occurred while writing a clip to the database |
| Remedy | Look at the logfile messages to troubleshoot. |
| | Check if Database is up and available. |
| Message | FileNotFoundException. Rotation code will be skipped; |
| | channelID = <channelID>; |
| | clipID = <clipID>; |
| | rotationCode = <rotationCode> |
| Cause | The physical file for the clips could not be found. |
| | This can happen when the file exists but an entry for the clip does not exist in the CLIP_ENCODINGS table, or when the file physically does not exist. |
| Remedy | Do a sanity check of the database and the EMC array to ensure that they are both in sync in terms for content. |
| Message | IOException. Rotation code will be skipped; |
| | channelID = <channelID>; |
| | clipID = <clipID>; |
| | rotationCode = <rotationCode> |
| Cause | NFS may be down or some filesystem error has occurred. |
| Remedy | Check if the NFS mounts are available and accessible |
| | Check if the local file system is running out of space |
| Message | Could not get connection: Cannot get candidate song IDs: <dataSourceName>; |
| | channelID = <channelID> |
| | Could not get connection: <dataSourceName>; |
| | Cannot write to SCHEDULER_STATE>; |
| | curr pattern number = <urrentPatternNumber>; |
| | curr pattern index = <urrentPatternIndex> |
| | Could not log to SCHEDULER_LOG since db connection is NULL. |
| Cause | The DB Connection Pool is running out of connections |
| Remedy | Increase the size of the DB connection pool in Application.properties file. |
| | Check if DB is up and accessible. |
| Message | SQLException: channelID = < channelID>; configSet ID = <configSetID>. |
| | <stack trace> |

TABLE 13-continued

Error messages

| | |
|---|---|
| | SQLException while trying to save to SCHEDULER_STATE table, curr pattern number = <urrentPatternNumber>; curr pattern index = <urrentPatternIndex> <stack trace> SQLException: clipID = <clipID>; channelID = <channelID>. <stack trace> Error executing prepared statement: <the SQL statement> <stack trace> SQLException: pattern ID = <pattern id> <stack trace> SQLException in getPatterns. channelID = <channel id> <stack trace> SQLException loading data cache <stack trace> |
| Cause | An SQLException occurred while accessing the DB. |
| Remedy | Look at the stack trace to toubleshoot. Check if Ddatabase is up and accessible. Involve the DBAs is necessary. |
| Message | Base audit URL in LightningCast response does not start with expected value: <expected value> |
| Cause | 1. Either LightningCast has changed the base of the audit URL sent in the XML, OR 2. There is a typo in the scheduler/conf/Application.properties file |
| Remedy | Verify with LightningCast the audit URL that they send in the XML response to scheduler. If this has indeed changed then: 1. Update the property in scheduler/conf/Application.properties file, and 2. The AppServer radio client code needs to also change to use this new audit URL base. |
| Message | Image URL in LightningCast response does not start with expected value: <expected value> |
| Cause | 1. Either LightningCast has changed the base of the image URL sent in the XML, OR 2. There is a typo in the scheduler/conf/Application.properties file |
| Remedy | Verify with LightningCast the image URL that they send in the XML response to scheduler. If this has indeed changed then: 1. Update the property in scheduler/conf/Application.properties file, and 2. The AppServer radio client code needs to also change to use this new image URL base. |
| Message | ClickThrough URL in LightningCast response does not start with expected value: <expected value> |
| Cause | 1. Either LightningCast has changed the base of the click through URL sent in the XML, OR 2. There is a typo in the scheduler/conf/Application.properties file |
| Remedy | Verify with LightningCast the click through URL that they send in the XML response to scheduler. If this has indeed changed then: 1. Update the property in scheduler/conf/Application.properties file, and 2. The AppServer radio client code needs to also change to use this new click through URL base. |
| Message | Could not create clone. clipID = <clip id>. <stack trace> |
| Cause | Unknown. |
| Remedy | Work with development to diagnose the problem. |
| Message | Exception writing LightningCast audio AD Clip to DB. Rotation code will be skipped.; channelID = <channelID>; clipID = <adClipID>; rotationCode = <rotationCode>; serialNum = <SONG_PLAY.SERIAL_NUM if relevant <stack trace> |
| Cause | Unknown exception while writing LC AD to DB |
| Remedy | Look at the logfile entries and the stack trace to diagnose. |
| Message | IOException while parsing LightningCast response. Ad code will be skipped. <stack trace> ParserConfigurationException while parsing LightningCast response. Ad code will be skipped. <stack trace> SAXException while parsing LightningCast response. Ad code will be skipped. <stack trace> NumberFormatException while parsing LightningCast response. Ad code will be skipped. <stack trace> NullPointerException while parsing LightningCast response. Ad code will be skipped. <stack trace> Exception while parsing LightningCast response. Ad code will be skipped. <stack trace> |
| Cause | 1. LightningCast server may be down, OR 2. There might be a network problem, OR 3. The XML returned by LC may be bad. |

TABLE 13-continued

Error messages

| | |
|---|---|
| Remedy | Check if LC server is available and accessible.<br>Diagnose network issues<br>Look at the LC response if it is printed in the logfile. |
| Message | Bad Data. Unknown rule attribute: <attribute name>. Rule fails. |
| Cause | Bad data in database |
| Remedy | Contact development team about this issue.<br>Someone has added an entry to RULE_ATTRIBUTES table that is not understood by Scheduler. |
| Scheduler | SQLException while evaluating rule. rule fails. <stack trace><br>Exception while evaluating rule. rule fails. <stack trace><br>Error while evaluating rule. rule fails. <stack trace> |
| Cause | Possible problem accessing database |
| Remedy | Look at the log entries to diagnose |
| Message | Could not get album ID for clipID <clip id>. Rule fails.<br>Could not get artist ID for clipID < clip id>. Rule fails.<br>Could not get song name for clipID < clip id>. Rule fails<br>Could not get song name for clipID < clip id>. Rule fails |
| Cause | Unknown |
| Remedy | Look at the log file entries to diagnose.<br>Query the DB to do a sanity check on the specified clip ID |
| Message | Exception loading data cache<br><stack trace> |
| Cause | The DataCache encountered an Exception while refreshing/initializing the memory cache. |
| Remedy | Look at the stack trace to diagnose. |
| Message | Invalid configSetID: <configset id> |
| Cause | A non-numeric configset ID was specified in the Application.properties file |
| Remedy | Correct the configset ID in Application.properties file |
| Message | Looks like a stale DB connection, releasing it. DB may be down. Current job will be abandoned.<br><number> bad connections have been removed from the <dataSourceName> DB pool |
| Cause | The database is down or has been restarted |
| Remedy | Notify the DBAs and monitor the situation.<br>Scheduler will recover and start scheduling when the DB becomes available again. |
| Message | Exception while calling createWork( ). Channel scheduling will not happen for this round: <message><br>Error while calling createWork( ). Channel scheduling will not happen for this round<br>Exception while calling doWork( ): <message><br>Error while calling doWork( ): <message> |
| Cause | An unknown Exception occurred. |
| Remedy | Look at the scheduler.log file and the displayed message to ascertain the cause |

Warning Messages

Syslog

Events that need attention from the system operator are logged to the Syslog.

The table below lists the log messages that are logged to SYSLOG along with tier priority levels:

TABLE 14

| | |
|---|---|
| Message | Exception while calling createWork( ). Channel scheduling will not happen for this round: <message> |
| Priority | WARN |
| Cause | An unknown Exception occurred. |
| Remedy | Look at the scheduler.log file and the displayed message to ascertain the cause |
| Message | Error while calling createWork( ). Channel scheduling will not happen for this round |
| Priority | WARN |
| Cause | An unknown Error occurred. |
| Remedy | Look at the scheduler.log file and the displayed message to ascertain the cause |
| Message | Exception while calling doWork( ): <message> |
| Priority | WARN |
| Cause | An unknown Exception occurred. |
| Remedy | Look at the scheduler.log file and the displayed message to ascertain the cause |
| Message | Error while calling doWork( ): <message> |
| Priority | WARN |
| Cause | An unknown Error occurred. |
| Remedy | Look at the scheduler.log file and the displayed message to ascertain the cause |

TABLE 14-continued

| | |
|---|---|
| Message | URGENT: Less that 3 hours of songs in song_play due to insufficient songs in playlist. bedrock might loop |
| Priority | ERROR |
| Cause | There might not be enough songs in the playlist, or for the rotation clock. |
| Remedy | Contact the MDs to troubleshoot and ask them to troubleshoot.<br>Look at the SCHEDULER_LOG table and see the entries for the Channel exhibiting this problem. |
| Message | Could not schedule even half of required schedule length due to insufficient songs in playlist! |
| Priority | WARN |
| Cause | There might not be enough songs in the playlist, or for the rotation clock. |
| Remedy | Contact the MDs to troubleshoot and ask them to troubleshoot.<br>Look at the SCHEDULER_LOG table and see the entries for the Channel exhibiting this problem. |
| Message | Could not schedule required schedule length due to insufficient songs in playlist |
| Cause | Scheduler could not schedule enough songs to fill the buffer specified by the SongSchedulerWM.configSet.<configSetID>.scheduleLength property.<br>There might not be enough songs in the playlist, or for the rotation clock |
| Remedy | Contact the MDs to troubleshoot and ask them to troubleshoot.<br>Look at the SCHEDULER_LOG table and see the entries for the Channel exhibiting this problem. |
| Message | No songs in playlist for rotationCode = <rotation_code>; channel = <channel_id> |
| Priority | WARN |
| Cause | Scheduler had to skip the rotation code for the specified channel because there are no songs with this rotation code in the playlist for the channel |
| Remedy | Contact the MDs immediately and ask them to rectify the situation either by removing the rotation_code from the rotation clock for that channel or by ensuring that there are enough encoded songs in the channel's playlist with that rotation code. |
| Message | <number> bad connections have been removed from the <dataSourceName> DB pool |
| Priority | ERROR |
| Cause | There is a serious error with the Database.<br>Most likely the database is down or unreachable.<br>The specified number of DB connections were released from the specified DB connection pool. |
| Remedy | Check if the DB is available.<br>Check if there are any network problems while connecting to the DB machine. |
| Message | <dataSourceName> out of DB Connections. Consider increasing max pool size for this DataSource |
| Priority | WARN |
| Cause | One reason for this message is the database being down or unreachable.<br>Other reason is that the connection pool was not configured to cache enough connections. Generally, the number of connections in the connection pool should be:<br>Num_workers + num_configsets + 10 |

Sheduler_Log Database Table

In addition, the scheduler application also records exceptional situations that affect a song/ad schedule to a table called SHEDULER_LOG. Some examples of these exceptional message types are: Rule Violations, skipping a rotation code within a rotation clock for some reason, skipping a candidate song due to rule conflict or if file is not found, etc.

The sheduler_log_types are enumerated in the following table:

TABLE 15

| ID | Type desc |
|---|---|
| 1 | NO_CLIPS_FOR_ROTATION_CODE (rotation code skipped).<br>REMEDY: Fix the rotation clock, or assign correct rotation code to clips and playlists |
| 2 | ROTATION_CODE_SKIPPED (for some reason such as application error): CAUSE: could be due to faulty rotation clock or Java error.<br>REMEDY: Look at log message. |
| 3 | RULE_VIOLATED (song scheduled even though rule violated since max rule violation count exceeded):<br>CAUSE: Not enough Clips for this channel causing rule collisions. |
| 4 | FILE_NOT_FOUND (A candidate clip will not be scheduled since the physical clip cannot be located):<br>CAUSE: bad data or encodinded file missing.<br>REMEDY: Work with engineering/OPs to resolve bad data. |
| 5 | RULE_COLLISION (A candidate clip will not be scheduled since it violates some rule).<br>NOTE: Too many rule collisions is bad and should be addressed by the MDs. |
| 6 | LC_INTERACTION_ERROR (Error while talking to lightningcast. Ad will not be scheduled):<br>REMEDY: work with OPs/engineering to locate cause of problem. |

TABLE 15-continued

| ID | Type desc |
|---|---|
| 7 | NO_COPIA_ADS (No ADs could be found in the CHANNEL_AD table for this chaannel): REMEDY: Check the CHANNEL_AD table or the COPIA tool and ensure that ADs have been programmed for this channel. |

Fatal errors and errors needing immediate attention are sent to the SYSLOG. These include:
- Unable to maintain a song schedule that is <scheduleLength> in length, where <scheduleLength> is configured in Application.properties file. This indicates that a situation could arise in the near future where there are not enough songs to play for the channel.
- Unhandled Exceptions that prevents the scheduling for a channel from being completed. This indicates that a situation could arise in the near future where there are not enough songs to play for the channel.

Maintenance Activities

Starting Scheduling

Run scheduler/bin/start.sh to start Scheduler.

Scheduler will abort at runtime if critical application parameters are not configured correctly.

Stopping Scheduler Gracefully

Run
$ scheduler/bin/stop.pl-host<hostname>-port<port>
script to stop Scheduler gracefully. This allows Scheduler to complete jobs that are currently underway. If a lot of jobs are underway, then stopping in this manner could take a few minutes.

This script sends an XML stop request to Scheduler over a socket.

Aborting Scheduler

Run
$ scheduler/bin/abort.pl-host<hostname>-port<port>
to stop Scheduler immediately. Use this only when necessary.

If for some reason this script fails to abort the process, you can do it from a unix command-line as follows:
$ kill-9 'cat scheduler/bin/scheduler.pid'

Pinging Scheduler

Run
$ scheduler/bin/ping.pl-host<hostname>-port<port>

If Scheduler is alive, <response name=ping>Alive</response>" appears on the console.

If Scheduler is dead something similar to "IO::Socket::INET:Connection refused at ./status.pl line 34

Cannot connect to Scheduler on localhost:8087.Scheduler may be down. at ./status.pl line 40." Appears printed on the console.

This script can be run as part of a cron job to monitor whether Scheduler is alive or not. Since Ping.pl (and other perl scripts) talk to Scheduler over a socket, the cron job could be run on a machine other than the one running Scheduler.

Logfile Rotation

Scheduler logfile is rotated automatically at midnight every day.

Scheduler can also be configured to rotate the logfile when it reaches a certain size. Scheduler can be configured to specify the number of backup logfiles that should be retained by scheduler when logfiles are rotated.

During logfile rotation, the existing logfile is renamed and a new empty logfile is created and made the current logfile.

The above scripts are provided for the sake of example. Other methods of performing maintenance activities are also possible.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A multimedia scheduler for scheduling media items for network broadcast; comprising:
    at least one work manager for each channel serviced, said work manager including at least one producer thread, a task queue and at least one worker thread; and
    one or more scheduler objects associated with each producer thread;
    wherein said work manager and associated scheduler objects create and maintain a broadcast schedule for each channel according to predefined criteria;
    wherein said at least one producer thread checks a channel at configurable intervals and increments said channel's schedule by generating a work request and placing it in said task queue and wherein said worker threads execute said work requests; and
    wherein said multimedia scheduler is scalable to service a plurality of broadcast channels and/or services simultaneously.

2. The multimedia scheduler of claim 1, further comprising: at least one properties file;
    at least one property manager, wherein said property manager provides access to application properties, said application properties stored in any of said property file and a configuration database;
    at least one database;
    at least one database connection manager for managing access to data sources, wherein said database connection manager comprises an access point to connect to said database;
    at least one communication module for accepting requests on a server socket and calling appropriate routines to fulfill the requests;
    at least one rules factory, wherein said rules factory maintains a cache of rule objects in memory;
    at least one utility thread, wherein said at least one utility thread comprises any of: a property refresher thread, a GC (garbage collection) thread for memory management and a logfile rotator thread;
    at least one logging system, wherein said logging system records transactions and activities; and at least one work creator factory, wherein said work creator factory is created during initialization of said work manager;

at least one data cache, wherein said data cache caches data common to all scheduler objects and data that change infrequently, and wherein a static data cache object contains a concrete data cache instance for each data source defined on a system; and at least one main application thread wherein said main application thread comprises a starting point for said multimedia scheduler and wherein said main application thread initializes main components within the multimedia scheduler.

3. The multimedia scheduler of claim 2, wherein said predefined criteria comprise any of programming rules, a rotation pattern for each channel, and rotation codes assigned to individual media items.

4. The multimedia scheduler of claim 3, wherein said media items comprise digital recordings of songs.

5. The multimedia scheduler of claim 2, wherein said rules objects implement a rules interface.

6. The multimedia scheduler of claim 2, wherein properties are loaded into a properties object in said property manager when said property manager is initialized by said main application thread.

7. The multimedia scheduler of claim 2, wherein said property manager includes a method for refreshing properties at regular intervals, wherein said method is called by one of said utility threads.

8. The multimedia scheduler of claim 7, wherein said database connection manager maintains a thread-local cache of connections for each thread.

9. The multimedia scheduler of claim 7, wherein said database connection manager provides a connection pool to each data source.

10. The multimedia scheduler of claim 7, wherein said database connection manager provides a thread-local cache of connections for each thread.

11. The multimedia scheduler of claim 9, wherein said database connection manager includes methods for getting connections; returning connections; and flushing a thread local cache.

12. The multimedia scheduler of claim 9, wherein said connection pool performs a sanity check on each connection requested from said pool by creating a dummy prepared statement, and executing it.

13. The multimedia scheduler of claim 12, wherein said connection pool discards a connection if an exception is thrown.

14. The multimedia scheduler of claim 9, wherein the connection pool opens a new connection if one is unavailable from the pool.

15. The multimedia scheduler of claim 2, wherein a port number for said socket is configured in said property file.

16. The multimedia scheduler of claim 2, wherein said requests comprise XML (extensible markup language) strings.

17. The multimedia scheduler of claim 2, wherein said requests include strings for:
  stop;
  abort;
  channel_schedule;
  status;
  ping;
  rotate_logfile; and
  refresh.

18. The multimedia scheduler of claim 2 wherein a sleep interval for each utility thread is configured in said properly file.

19. The multimedia scheduler of claim 2, wherein logging behavior is configurable by means of a logging properties file.

20. The multimedia scheduler of claim 2, wherein scheduler objects comprise work creator objects and wherein associating a scheduling scheduler object with a producer thread comprises wrapping a work creator object with a producer thread.

21. The multimedia scheduler of claim 20, wherein said work creator objects encapsulate song and/or ad scheduling logic, wherein said work manager is independent of said song and/or ad scheduling logic.

22. The multimedia scheduler of claim 21, wherein said scheduling logic includes processes for any of:
  scheduling songs on stream-based channels;
  scheduling ads on stream-based channels;
  scheduling songs on clip-based channels; and
  scheduling ads on clip-based channels.

23. The multimedia scheduler of claim 22, wherein said ads are provided by a third party.

24. The multimedia scheduler of claim 22, wherein said ads are provided in buckets, wherein a bucket is associated with a channel.

25. The multimedia scheduler of claim 21, wherein said work creator objects create work objects representing tasks to be performed.

26. The multimedia scheduler of claim 21, wherein work creator objects are created by at least one work creator factory.

27. The multimedia scheduler of claim 20, wherein said work manager further comprises at least one delete symlink (symbolic link) thread.

28. The multimedia scheduler of claim 20, wherein said work manager further comprises at least one monitoring thread.

29. The multimedia scheduler of claim 2, wherein a data cache refresher thread reloads cached data, and wherein a refresh interval is specified in said property file.

30. The multimedia scheduler of claim 2, wherein said main application thread waits for a 'stop' or 'abort' request after initializing said main components.

31. The multimedia scheduler of claim 2, wherein said main application thread includes a monitor, wherein a socket listener thread notifies said monitor when a request is received by a server socket.

32. The multimedia scheduler of claim 31, wherein an 'abort' request stops said multimedia scheduler immediately.

33. The multimedia scheduler of claim 31, wherein a 'stop' request allows the multimedia scheduler to stop so that:
  work managers are stopped;
  a cleanup of the database connection manager is performed; and
  the application is exited.

34. The multimedia scheduler of claim 2, wherein said main application thread includes a plurality of public static methods to control and report on the multimedia scheduler.

35. The multimedia scheduler of claim 2, wherein said main application thread constitutes a class.

36. The multimedia scheduler of claim 2, wherein said properties file controls behavior of said multimedia scheduler and specifies parameters to tune said multimedia scheduler.

37. The multimedia scheduler of claim 36, wherein said properties file specifies at least:
  work manager properties;
  scheduler object properties;

scheduler-wide properties;
rules module properties;
property manager properties; and
database connection pool properties.

38. The multimedia scheduler of claim 2, wherein said database comprises a plurality of tables, and wherein said at least one work manager and said property manager access said database.

39. The multimedia scheduler of claim 38, wherein said tables include tables for at least:
- current state of multimedia scheduler wherein said state is persistently saved;
- an exception log for recording events, wherein events include rule violations;
- enumeration of log messages;
- associating rotation patterns to a channel;
- rotation patterns created by DJ's;
- rule definitions;
- associating rules to a channel;
- defining channel specific rule values; and
- channel configset.

40. The multimedia scheduler of claim 39, wherein said tables further include:
- channels;
- channel-specific ads;
- channel-specific playlists;
- playlists;
- playlists of clips;
- clips;
- encoding formats;
- song location; and
- song metadata.

41. The multimedia scheduler of claim 1, wherein said multimedia scheduler creates schedules for clip-based channels.

42. The multimedia scheduler of claim 1, wherein said multimedia scheduler creates schedules for stream-based channels.

43. The multimedia scheduler of claim 1, wherein said services are broadcast at different bit rates.

* * * * *